(12) United States Patent  
Walmsley et al.

(10) Patent No.: US 7,798,607 B2  
(45) Date of Patent: *Sep. 21, 2010

(54) INKJET PRINTHEAD HAVING MULTIPLE PRINTER CONTROLLERS

(75) Inventors: Simon Robert Walmsley, Balmain (AU); John Robert Sheahan, Balmain (AU); Mark Jackson Pulver, Balmain (AU); Kia Silverbrook, Balmain (AU); Michael John Webb, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 268 days.

This patent is subject to a terminal disclaimer.

(21) Appl. No.: 11/961,961

(22) Filed: Dec. 20, 2007

(65) Prior Publication Data

US 2008/0129779 A1  Jun. 5, 2008

Related U.S. Application Data

(63) Continuation of application No. 11/499,803, filed on Aug. 7, 2006, now Pat. No. 7,322,666, which is a continuation of application No. 11/212,823, filed on Aug. 29, 2005, now Pat. No. 7,163,345, which is a continuation of application No. 10/854,496, filed on May 27, 2004, now Pat. No. 7,093,989.

(51) Int. Cl.  
*B41J 2/205* (2006.01)

(52) U.S. Cl. .......................................... 347/49; 347/13  
(58) Field of Classification Search .................... 347/13, 347/15, 42, 49, 12; 358/1.2, 1.9  
See application file for complete search history.

(56) References Cited

U.S. PATENT DOCUMENTS

| 5,272,672 | A | 12/1993 | Ogihara |
| 6,019,457 | A | 2/2000 | Silverbrook |
| 6,145,980 | A | 11/2000 | Wang |
| 6,281,908 | B1 | 8/2001 | Gibson et al. |
| 6,367,903 | B1 | 4/2002 | Gast et al. |
| 6,554,387 | B1 | 4/2003 | Otsuki |
| 7,163,345 | B2 * | 1/2007 | Walmsley et al. .............. 400/62 |
| 2002/0024577 | A1 | 2/2002 | Takeya et al. |
| 2003/0081024 | A1 | 5/2003 | Vives et al. |

FOREIGN PATENT DOCUMENTS

| EP | 0674993 A2 | 10/1995 |
| EP | 1029673 A1 | 8/2000 |
| JP | 10-151741 | 6/1998 |
| WO | WO 00/06386 A | 2/2000 |

* cited by examiner

*Primary Examiner*—Lamson D Nguyen

(57) ABSTRACT

An inkjet printhead is provided having inkjet printhead modules arranged to successively abut one another and controllers for controlling the printhead modules. A first controller is configured to receive and process print data to generate first ink dot data and a second controller is configured to receive and process print data and at least some of the first dot data to generate second ink dot data. The first controller is arranged to output the first dot data to at least a first printhead module and the second controller. The second controller is arranged to output the second dot data to at least a second printhead module.

8 Claims, 43 Drawing Sheets

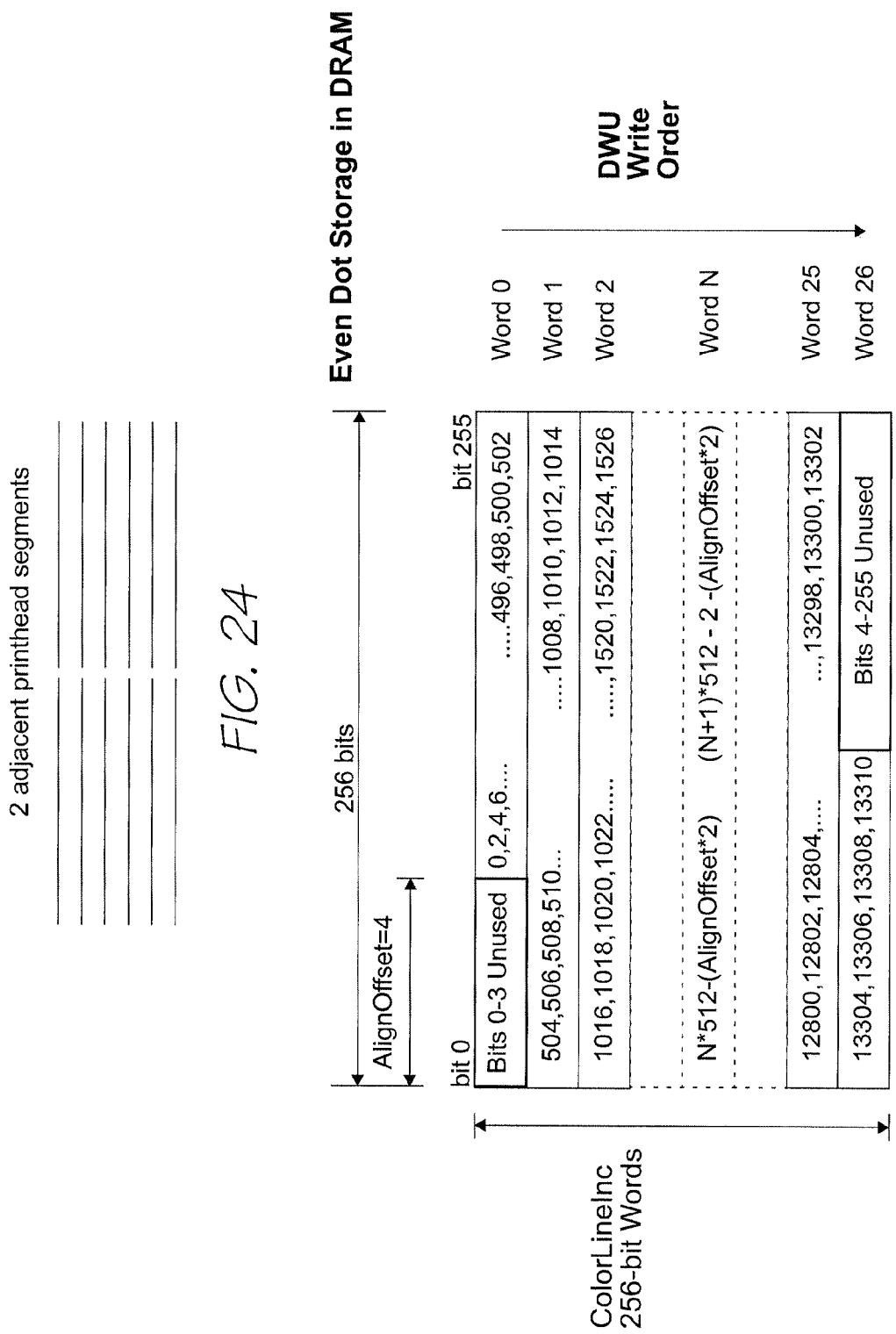

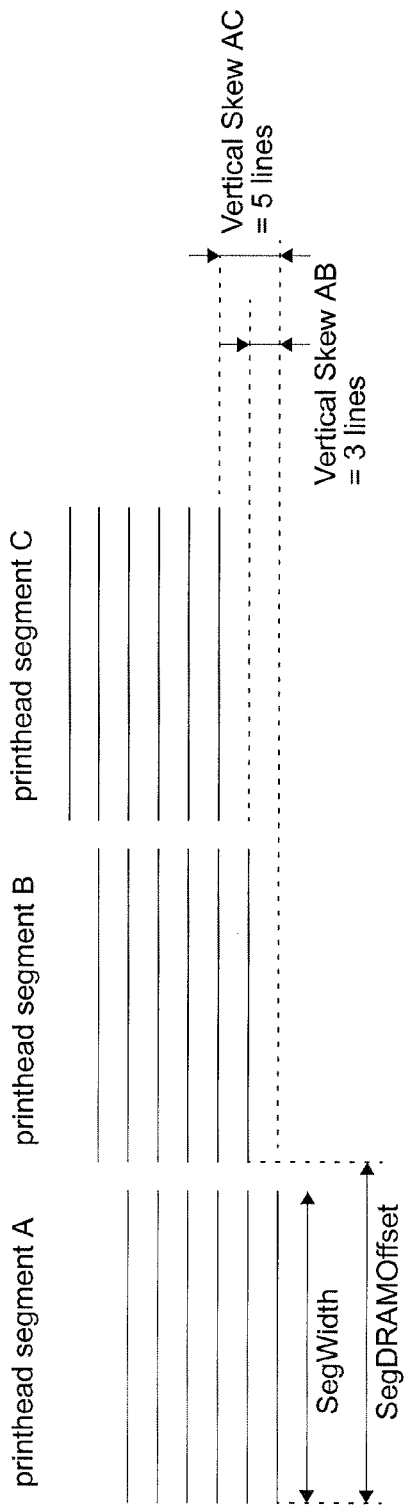
FIG. 28
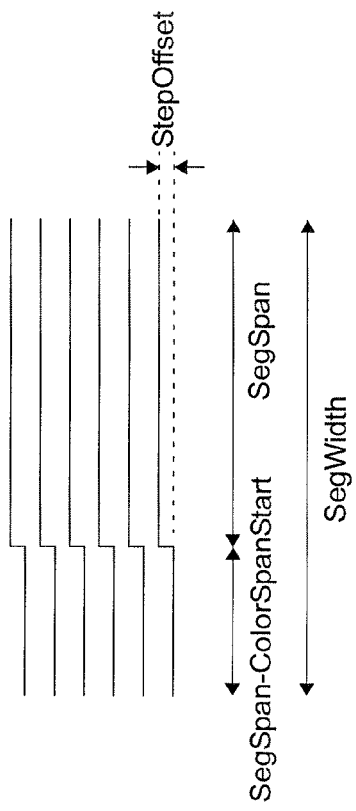
FIG. 29
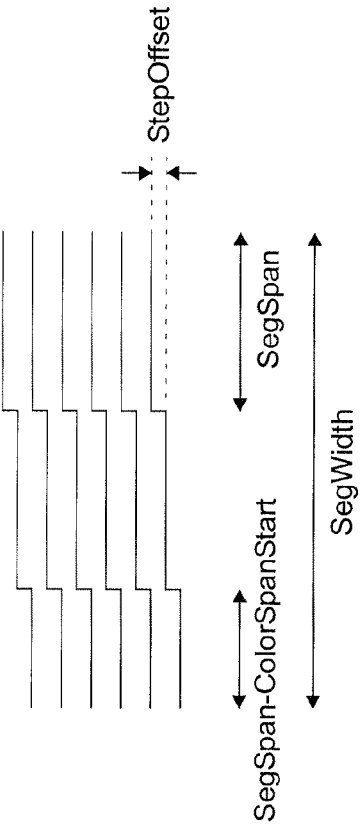

vertical offset of join
vertically aligned when printhead is rotated approx 1mm
(64 dot lines)

| Row Number | Default Firing Order | | Relative Row position in line-pitches |
|---|---|---|---|
| 0 | 1 | ○○○○○ ○○○ ○○○ ○○ ○○○ ○○○ ○○○ | 0 |
| 1 | 6 | ○○○○○○○○○○○○○○○○○○○○○○○○○○○ | 3.5 |
| 2 | 2 | ○○○○○○○○○○○○○○○○○○○○○○○○○○○ | 10.1 |
| 3 | 7 | ○○○○○○○○○○○○○○○○○○○○○○○○○○○ | 13.6 |
| 4 | 3 | ○○○○○○○○○○○○○○○○○○○○○○○○○○○ | 20.2 |
| 5 | 8 | ○○○○○○○○○○○○○○○○○○○○○○○○○○○ | 23.7 |
| 6 | 4 | ○○○○○○○○○○○○○○○○○○○○○○○○○○○ | 30.3 |
| 7 | 9 | ○○○○○○○○○○○○○○○○○○○○○○○○○○○ | 33.8 |
| 8 | 5 | ○○○○○○○○○○○○○○○○○○○○○○○○○○○ | 40.4 |
| 9 | 10 | ○○○○○○○○○○○○○○○○○○○○○○○○○○○ | 43.9 |

FIG. 68

| Firing Order | | Row position | Adjusted Firing Order | | Row position relative to ideal segment row 0 |
|---|---|---|---|---|---|
| 1 | ○○○○○○○○○○ | 0 | 4 | ○○○○○○○○○○ | 0.3 |
| 6 | ○○○○○○○○○○ | 3.5 | 9 | ○○○○○○○○○○ | 3.8 |
| 2 | ○○○○○○○○○○ | 10.1 | 5 | ○○○○○○○○○○ | 10.4 |
| 7 | ○○○○○○○○○○ | 13.6 | 10 | ○○○○○○○○○○ | 13.9 |
| 3 | ○○○○○○○○○○ | 20.2 | 6 | ○○○○○○○○○○ | 20.5 |
| 8 | ○○○○○○○○○○ | 23.7 | 1 | ○○○○○○○○○○ | 24.0 |
| 4 | ○○○○○○○○○○ | 30.3 | 7 | ○○○○○○○○○○ | 30.6 |
| 9 | ○○○○○○○○○○ | 33.8 | 2 | ○○○○○○○○○○ | 34.1 |
| 5 | ○○○○○○○○○○ | 40.4 | 8 | ○○○○○○○○○○ | 40.7 |
| 10 | ○○○○○○○○○○ | 43.9 | 3 | ○○○○○○○○○○ | 44.2 |
| Ideal segment | | | Segment misplaced by 0.3 line-pitches | | |

FIG. 69

INKJET PRINTHEAD HAVING MULTIPLE PRINTER CONTROLLERS

CROSS REFERENCE TO RELATED APPLICATIONS

The present application is a continuation of U.S. application Ser. No. 11/499,803 filed on Aug. 7, 2006, which is a continuation of U.S. application Ser. No. 11/212,823 filed on Aug. 29, 2005, now issued U.S. Pat. No. 7,163,345, which is a continuation of U.S. application Ser. No. 10/854,496 filed May 27, 2004, now issued U.S. Pat. No. 7,093,989, the entire contents of which are herein incorporated by reference.

CO-PENDING APPLICATIONS

Various methods, systems and apparatus relating to the present invention are disclosed in the following co-pending applications filed by the applicant or assignee of the present invention simultaneously with the present application:

| | | | | |
|---|---|---|---|---|
| 10/854,521 | 10/854,522 | 10/854,488 | 7,281,330 | 10/854,503 |
| 10/854,504 | 10/854,509 | 7,188,928 | 10/854,497 | 10/854,495 |
| 10/854,498 | 10/854,511 | 10/854,512 | 10/854,525 | 10/854,526 |
| 10/854,516 | 7,252,353 | 10/854,515 | 7,267,417 | 10/854,505 |
| 10/854,493 | 7,275,805 | 10/854,489 | 10/854,490 | 7,281,777 |
| 7,290,852 | 10/854,528 | 10/854,523 | 10/854,527 | 10/854,524 |
| 10/854,520 | 10/854,514 | 10/854,519 | 10/854,513 | 10/854,499 |
| 10/854,501 | 7,266,661 | 7,243,193 | 10/854,518 | 10/854,517 |

The disclosures of these co-pending applications are incorporated herein by cross-reference.

CROSS-REFERENCES

Various methods, systems and apparatus relating to the present invention are disclosed in the following co-pending applications filed by the applicant or assignee of the present invention. The disclosures of all of these co-pending applications are incorporated herein by cross-reference.

| | | | | |
|---|---|---|---|---|
| 7,249,108 | 6,566,858 | 6,331,946 | 6,246,970 | 6,442,525 |
| 09/517,384 | 09/505,951 | 6,374,354 | 7,246,098 | 6,816,968 |
| 6,757,832 | 6,334,190 | 6,745,331 | 7,249,109 | 10/636,263 |
| 10/636,283 | 10/407,212 | 7,252,366 | 10/683,064 | 10/683,041 |
| 10/727,181 | 10/727,162 | 10/727,163 | 10/727,245 | 7,121,639 |
| 7,165,824 | 7,152,942 | 10/727,157 | 7,181,572 | 7,096,137 |
| 10/727,257 | 7,278,034 | 7,188,282 | 10/727,159 | 10/727,180 |
| 10/727,179 | 10/727,192 | 10/727,274 | 10/727,164 | 10/727,161 |
| 10/727,198 | 10/727,158 | 10/754,536 | 10/754,938 | 10/727,227 |
| 10/727,160 | 6,795,215 | 7,154,638 | 6,859,289 | 6,977,751 |
| 6,398,332 | 6,394,573 | 6,622,923 | 6,747,760 | 6,921,144 |
| 10/780,624 | 7,194,629 | 10/791,792 | 7,182,267 | 7,025,279 |
| 6,857,571 | 6,817,539 | 6,830,198 | 6,992,791 | 7,038,809 |
| 6,980,323 | 7,148,992 | 7,139,091 | 6,947,173 | |

The disclosures of these co-pending applications are incorporated herein by cross-reference.

FIELD OF THE INVENTION

The present invention relates to a printer comprising one or more printhead modules and a printer controller for supplying the printhead modules with data to be printed.

The invention has primarily been developed in the form of a pagewidth inkjet printer in which considerable data processing and ordering is required of the printer controller, and will be described with reference to this example. However, it will be appreciated that the invention is not limited to any particular type of printing technology, and may be used in, for example, non-pagewidth and non-inkjet printing applications.

BACKGROUND

Printer controllers face difficulties when they have to send print data to two or more printhead modules in a printhead, each of the modules having one or more rows of print nozzles for outputting ink. In one embodiment favoured by the applicant, data for each row is shifted into a shift register associated with that row.

The applicant has discovered that some manufacturing advantages arise when printhead modules of different lengths are used within a product range. For example, a particular width of printhead for a pagewidth printer can be achieved with various different combinations of printhead module. So, a 10 inch printhead can be formed from two 5 inch printhead modules, a 6 and a 4 inch module, or a 7 and a 3 inch module.

Whilst useful in some ways, printhead modules of different lengths raise some other issues. One of these is that when one of the modules is longer, it must be loaded with more data than the other module in a given load period.

One way of dealing with the problem is to use a printer controller with sufficient processing power and data delivery capabilities that the data imbalance is not problematic. Alternatively, in some cases it may be feasible to add one or more additional printer controllers to help deal with the high data rates involved. However, if the data rates for the printer controller providing data to the longer printhead module are already relatively close to that printer controller's capabilities, it may be not be commercially feasible for either of these solutions to be implemented.

It would be useful to provide a printhead module that addresses at least some of the disadvantages of known printhead modules.

SUMMARY OF THE INVENTION

In a first aspect the present invention provides an inkjet printhead comprising:

a plurality of inkjet printhead modules arranged to successively abut one another along a pagewidth;

a first controller configured to receive and process print data to generate first ink dot data; and a second controller configured to receive and process print data and at least some of the first ink dot data to generate second ink dot data, wherein the first controller is arranged to output the first ink dot data to at least a first printhead module of the plurality of printhead modules and said at least some of the first ink dot data to the second controller, and the second controller is arranged to output the second ink dot data to at least a second printhead module of the plurality of printhead modules Optionally, at least one of the printhead modules is angled with respect to the other printhead modules.

Optionally, said at least one printhead module is on a mild slope.

Optionally, the angle of the mild slope is dependent on the width of the printhead.

Optionally, one or more of the printhead modules have rows of redundant inkjet nozzles.

Optionally, the rows of redundant nozzles are arranged so that the redundancy is based on an ink color to be ejected by said nozzles.

Optionally, more than one row of redundant nozzles is arranged for each ink color to be ejected.

Optionally, the first and second controllers are configured so that the nozzles in the rows of redundant nozzles receive the first or second ink dot data for positions where nozzles in non-redundant rows of nozzles are defective.

DETAILED DESCRIPTION OF PREFERRED EMBODIMENT

Figure 1:
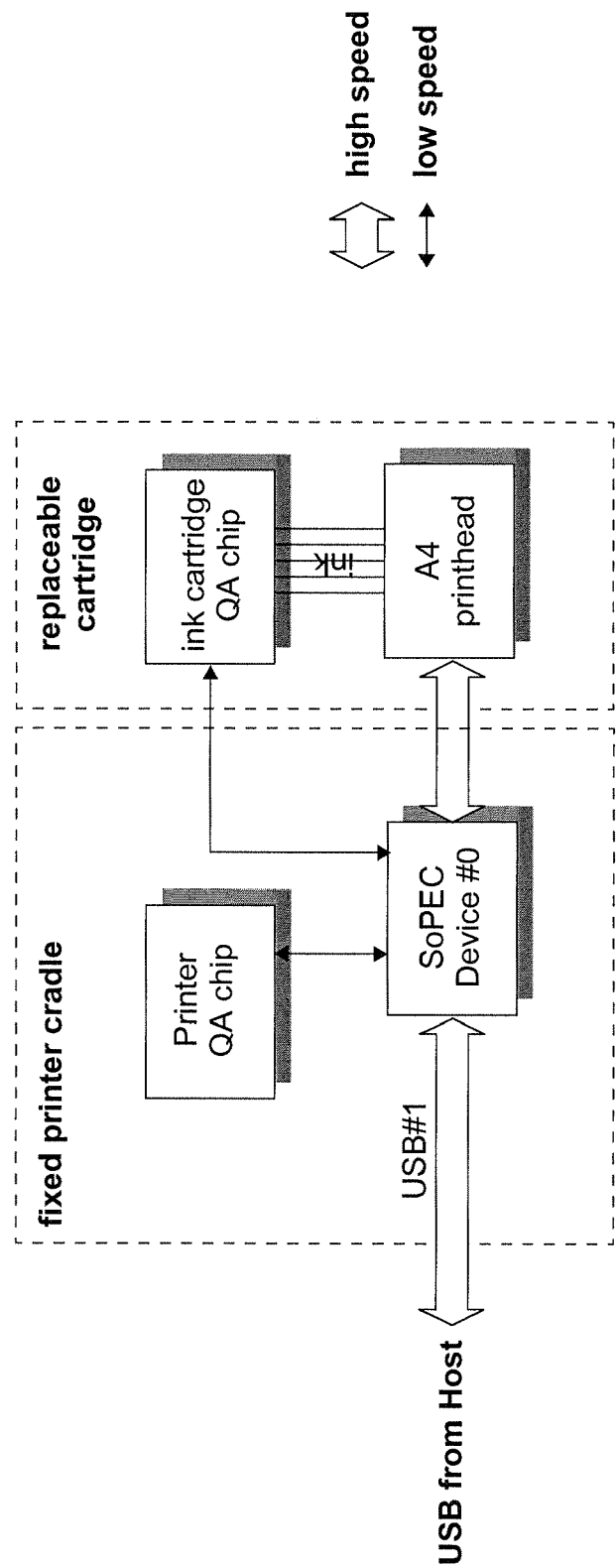
FIG. 1 Single SoPEC A4 Simplex system
FIG. 2 Dual SoPEC A4 Simplex system
FIG. 3 Dual SoPEC A4 Duplex system
FIG. 4 Dual SoPEC A3 simplex system
FIG. 5 Quad SoPEC A3 duplex system
FIG. 6 SoPEC A4 Simplex system with extra SoPEC used as DRAM storage
FIG. 7 SoPEC A4 Simplex system with network connection to Host PC
FIG. 8 SoPEC System Top Level partition
FIG. 9 Possible USB Topologies for Multi-SoPEC systems
FIG. 10 High level block diagram of DNC
FIG. 11 Dead nozzle table format
FIG. 12 Set of dots operated on for error diffusion
FIG. 13 Block diagram of DNC
FIG. 14 Sub-block diagram of ink replacement unit
FIG. 15 Dead nozzle table state machine
FIG. 16 Logic for dead nozzle removal and ink replacement
FIG. 17 Sub-block diagram of error diffusion unit
FIG. 18 Maximum length 32-bit LFSR used for random bit generation
FIG. 19 High level data flow diagram of DWU in context
FIG. 20 Printhead Nozzle Layout for conceptual 36 Nozzle AB single segment printhead
FIG. 21 Paper and printhead nozzles relationship (example with $D_1=D_2=5$)
FIG. 22 Dot line store logical representation
FIG. 23 Conceptual view of 2 adjacent printhead segments possible row alignment
FIG. 24 Conceptual view of 2 adjacent printhead segments row alignment (as seen by the LLU)
FIG. 25 Even dot order in DRAM (13312 dot wide line)
FIG. 26 High level data flow diagram of LLU in context
FIG. 27 Paper and printhead nozzles relationship (example with $D_1=D_2=5$)
FIG. 28 Conceptual view of vertically misaligned printhead segment rows (external)
FIG. 29 Conceptual view of vertically misaligned printhead segment rows (internal)
FIG. 30 Conceptual view of color dependent vertically misaligned printhead segment rows (internal)
FIG. 31 Conceptual horizontal misalignment between segments
FIG. 32 Relative positions of dot fired (example cases)
FIG. 33 PHI to linking printhead connection (Single SoPEC)
FIG. 34 PHI to linking printhead connection (2 SoPECs)
FIG. 35 Printing with 1 SoPEC
FIG. 36 Printing with 2 SoPECs (existing hardware)
FIG. 37 Each SoPEC generates dot data and writes directly to a single printhead
FIG. 38 Each SoPEC generates dot data and writes directly to a single printhead
FIG. 39 Two SoPECs generate dots and transmit directly to the larger printhead
FIG. 40 Serial Load
FIG. 41 Parallel Load
FIG. 42 Two SoPECs generate dot data but only one transmits directly to the larger printhead
FIG. 43 Odd and Even nozzles on same shift register
FIG. 44 Odd and Even nozzles on different shift registers
FIG. 45 Interwoven shift registers
FIG. 46 Linking Printhead Concept
FIG. 47 Linking Printhead 30 ppm
FIG. 48 Linking Printhead 60 ppm
FIG. 49 Theoretical 2 tiles assembled as A-chip/A-chip—right angle join
FIG. 50 Two tiles assembled as A-chip/A-chip
FIG. 51 Magnification of color n in A-chip/A-chip
FIG. 52 A-chip/A-chip growing offset
FIG. 53 A-chip/A-chip aligned nozzles, sloped chip placement
FIG. 54 Placing multiple segments together
FIG. 55 Detail of a single segment in a multi-segment configuration
FIG. 56 Magnification of inter-slope compensation
FIG. 57 A-chip/B-chip
FIG. 58 A-chip/B-chip multi-segment printhead
FIG. 59 Two A-B-chips linked together
FIG. 60 Two A-B-chips with on-chip compensation
FIG. 61 Overview of LSS buses for single SoPEC system
FIG. 62 Overview of LSS buses for single SoPEC printer
FIG. 63 Overview of LSS buses for simplest two-SoPEC printer
FIG. 64 Overview of LSS buses for alternative two-SoPEC printer
FIG. 65 SoPEC System top level partition
FIG. 66 Print construction and Nozzle position
FIG. 67 Conceptual horizontal misplacement between segments
FIG. 68 Printhead row positioning and default row firing order
FIG. 69 Firing order of fractionally misaligned segment
FIG. 70 Example of yaw in printhead IC misplacement
FIG. 71 Vertical nozzle spacing
FIG. 72 Single printhead chip plus connection to second chip
FIG. 73 Two printheads connected to form a larger printhead
FIG. 74 Colour arrangement
FIG. 75 Nozzle Offset at Linking Ends

Various aspects of the preferred and other embodiments will now be described. Much of this description is based on technical design documents, so the use of words like "must", "should" and "will", and all others that suggest limitations or positive attributes of the performance of a particular product, should not be interpreted as applying to the invention in general. These comments, unless clearly referring to the invention in general, should be considered as desirable or intended features in a particular design rather than a requirement of the invention. The intended scope of the invention is defined in the claims.

Also throughout this description, "printhead module" and "printhead" are used somewhat interchangeably. Technically, a "printhead" comprises one or more "printhead modules", but occasionally the former is used to refer to the latter. It should be clear from the context which meaning should be allocated to any use of the word "printhead".

A SoPEC ASIC (Small office home office Print Engine Controller) suitable for use in price sensitive SoHo printer products is described. The SoPEC ASIC is intended to be a relatively low cost solution for linking printhead control, replacing the multichip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design. SoPEC contains features making it suitable for multifunction or "all-in-one" devices as well as dedicated printing systems.

Basic features of the preferred embodiment of SoPEC include:
  Continuous 30 ppm operation for 1600 dpi output at A4/Letter.
  Linearly scalable (multiple SoPECs) for increased print speed and/or page width.
  192 MHz internal system clock derived from low-speed crystal input
  PEP processing pipeline, supports up to 6 color channels at 1 dot per channel per clock cycle
  Hardware color plane decompression, tag rendering, half-toning and compositing
  Data formatting for Linking Printhead
  Flexible compensation for dead nozzles, printhead misalignment etc.
  Integrated 20 Mbit (2.5 MByte) DRAM for print data and CPU program store
  LEON SPARC v8 32-bit RISC CPU
  Supervisor and user modes to support multi-threaded software and security
  1 kB each of I-cache and D-cache, both direct mapped, with optimized 256-bit fast cache update.
  1×USB2.0 device port and 3×USB2.0 host ports (including integrated PHYs)
  Support high speed (480 Mbit/sec) and full speed (12 Mbit/sec) modes of USB2.0
  Provide interface to host PC, other SoPECs, and external devices e.g. digital camera
  Enable alternative host PC interfaces e.g. via external USB/ethernet bridge
  Glueless high-speed serial LVDS interface to multiple Linking Printhead chips
  64 remappable GPIOs, selectable between combinations of integrated system control components:
  2×LSS interfaces for QA chip or serial EEPROM
  LED drivers, sensor inputs, switch control outputs
  Motor controllers for stepper and brushless DC motors
  Microprogrammed multi-protocol media interface for scanner, external RAM/Flash, etc.
  112-bit unique ID plus 112-bit random number on each device, combined for security protocol support
  IBM Cu-11 0.13 micron CMOS process, 1.5V core supply, 3.3V IO.
  208 pin Plastic Quad Flat Pack The following terms are used throughout this specification:
CPU Refers to CPU core, caching system and MMU.
Host A PC providing control and print data to a Memjet printer.
ISCMaster In a multi-SoPEC system, the ISCMaster (Inter SoPEC Communication Master) is the SoPEC device that initiates communication with other SoPECs in the system. The ISCMaster interfaces with the host.
ISCSlave In a multi-SoPEC system, an ISCSlave is a SoPEC device that responds to communication initiated by the ISCMaster.
LEON Refers to the LEON CPU core.
LineSyncMaster The LineSyncMaster device generates the line synchronisation pulse that all SoPECs in the system must synchronise their line outputs to.
Linking Printhead Refers to a page-width printhead constructed from multiple linking printhead ICs
Linking Printhead IC A MEMS IC. Multiple ICs link together to form a complete printhead. An A4/Letter page width printhead requires 11 printhead ICs.
Multi-SoPEC Refers to SoPEC based print system with multiple SoPEC devices
Netpage Refers to page printed with tags (normally in infrared ink).
PEC1 Refers to Print Engine Controller version 1, precursor to SoPEC used to control printheads constructed from multiple angled printhead segments.
PrintMaster The PrintMaster device is responsible for coordinating all aspects of the print operation. There may only be one PrintMaster in a system.
QA Chip Quality Assurance Chip
Storage SoPEC A SoPEC used as a DRAM store and which does not print.
Tag Refers to pattern which encodes information about its position and orientation which allow it to be optically located and its data contents read.

The preferred embodiment linking printhead produces 1600 dpi bi-level dots. On low-diffusion paper, each ejected drop forms a 22.5 $\Box$m diameter dot. Dots are easily produced in isolation, allowing dispersed-dot dithering to be exploited to its fullest. Since the preferred form of the linking printhead is pagewidth and operates with a constant paper velocity, color planes are printed in good registration, allowing dot-on-dot printing. Dot-on-dot printing minimizes 'muddying' of midtones caused by inter-color bleed.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16$\Box$16$\Box$18 bits for 257 intensity levels).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree. At a normal viewing distance of 12 inches (about 300 mm), this translates roughly to 200-300 cycles per inch (cpi) on the printed page, or 400-600 samples per inch according to Nyquist's theorem.

In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not anti-aliased (i.e. low-pass filtered) before being printed. Text should therefore be supersampled beyond the perceptual limits discussed above, to produce smoother edges when spatially integrated by the eye. Text resolution up to about 1200 dpi continues to contribute to perceived text sharpness (assuming low-diffusion paper).

A Netpage printer, for example, may use a contone resolution of 267 ppi (i.e. 1600 dpi 6), and a black text and graphics resolution of 800 dpi. A high end office or departmental printer may use a contone resolution of 320 ppi (1600 dpi/5) and a black text and graphics resolution of 1600 dpi. Both formats are capable of exceeding the quality of commercial (offset) printing and photographic reproduction.

The SoPEC device can be used in several printer configurations and architectures. In the general sense, every preferred embodiment SoPEC-based printer architecture will contain:
One or more SoPEC devices.
One or more linking printheads.
Two or more Low Speed Serial interface (LSS) busses.
Two or more QA chips.
Connection to host, directly via USB2.0 or indirectly.
Connections between SoPECs (when multiple SoPECs are used).

The SoPEC device contains several system on a chip (SoC) components, as well as the print engine pipeline control application specific logic.

The PEP reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the linking printhead.

SoPEC contains an embedded CPU for general-purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

A 2.5 Mbyte embedded memory buffer is integrated onto the SoPEC device, of which approximately 2 Mbytes are available for compressed page store data. A compressed page is divided into one or more bands, with a number of bands stored in memory. As a band of the page is consumed by the PEP for printing a new band can be downloaded. The new band may be for the current page or the next page.

Using banding it is possible to begin printing a page before the complete compressed page is downloaded, but care must be taken to ensure that data is always available for printing or a buffer underrun may occur.

A Storage SoPEC acting as a memory buffer could be used to provide guaranteed data delivery.

The embedded single-port USB2.0 device controller can be used either for interface to the host PC, or for communication with another SoPEC as an ISCSlave. It accepts compressed page data and control commands from the host PC or ISCMaster SoPEC, and transfers the data to the embedded memory for printing or downstream distribution.

The embedded three-port USB2.0 host controller enables communication with other SoPEC devices as a ISCMaster, as well as interfacing with external chips (e.g. for Ethernet connection) and external USB devices, such as digital cameras.

SoPEC contains embedded controllers for a variety of printer system components such as motors, LEDs etc, which are controlled via SoPEC's GPIOs. This minimizes the need for circuits external to SoPEC to build a complete printer system.

The printhead is constructed by abutting a number of printhead ICs together. Each SoPEC can drive up to 12 printhead ICs at data rates up to 30 ppm or 6 printhead ICs at data rates up to 60 ppm. For higher data rates, or wider printheads, multiple SoPECs must be used.

Each SoPEC device has 2 LSS system buses for communication with QA devices for system authentication and ink usage accounting. The number of QA devices per bus and their position in the system is unrestricted with the exception that PRINTER_QA and INK_QA devices should be on separate LSS busses.

Each SoPEC system can have several QA devices. Normally each printing SoPEC will have an associated PRINTER_QA. Ink cartridges will contain an INK_QA chip. PRINTER_QA and INK_QA devices should be on separate LSS busses. All QA chips in the system are physically identical with flash memory contents defining PRINTER_QA from INK_QA chip.

In a multi-SoPEC system, the primary communication channel is from a USB2.0 Host port on one SoPEC (the ISCMaster), to the USB2.0 Device port of each of the other SoPECs (ISCSlaves). If there are more ISCSlave SoPECs than available USB Host ports on the ISCMaster, additional connections could be via a USB Hub chip, or daisy-chained SoPEC chips. Typically one or more of SoPEC's GPIO signals would also be used to communicate specific events between multiple SoPECs.

In FIG. 1, a single SoPEC device is used to control a linking printhead with 11 printhead ICs. The SoPEC receives compressed data from the host through its USB device port. The compressed data is processed and transferred to the printhead. This arrangement is limited to a speed of 30 ppm. The single SoPEC also controls all printer components such as motors, LEDs, buttons etc, either directly or indirectly.

Figure 2:
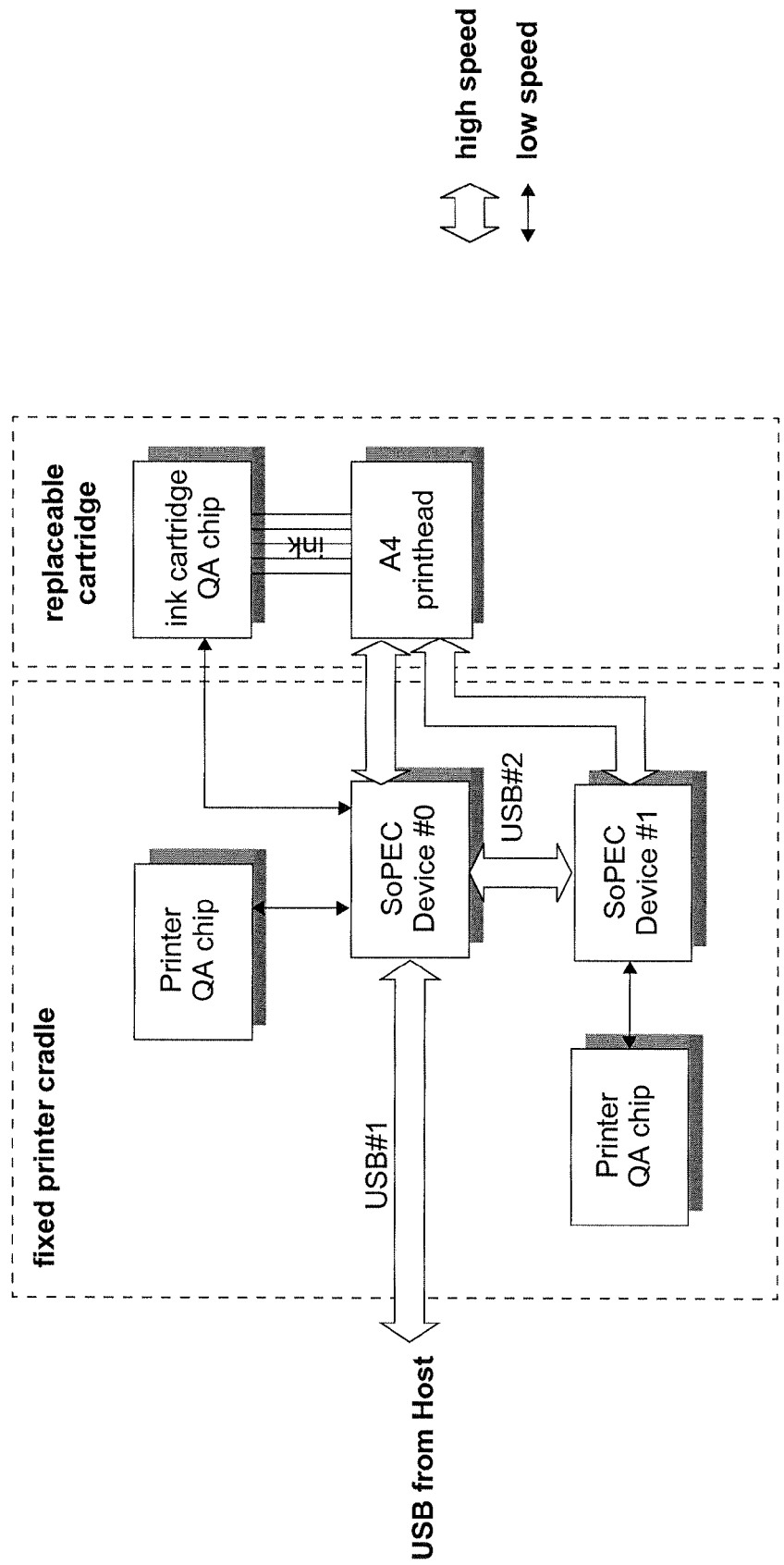

In FIG. 2, two SoPECs control a single linking printhead, to provide 60 ppm A4 printing. Each SoPEC drives 5 or 6 of the printheads ICs that make up the complete printhead. SoPEC #0 is the ISCMaster, SoPEC #1 is an ISCSlave. The ISCMaster receives all the compressed page data for both SoPECs and re-distributes the compressed data for the ISCSlave over a local USB bus. There is a total of 4 MBytes of page store memory available if required. Note that, if each page has 2 MBytes of compressed data, the USB2.0 interface to the host needs to run in high speed (not full speed) mode to sustain 60 ppm printing. (In practice, many compressed pages will be much smaller than 2 MBytes). The control of printer components such as motors, LEDs, buttons etc, is shared between the 2 SoPECs in this configuration.

Figure 3:
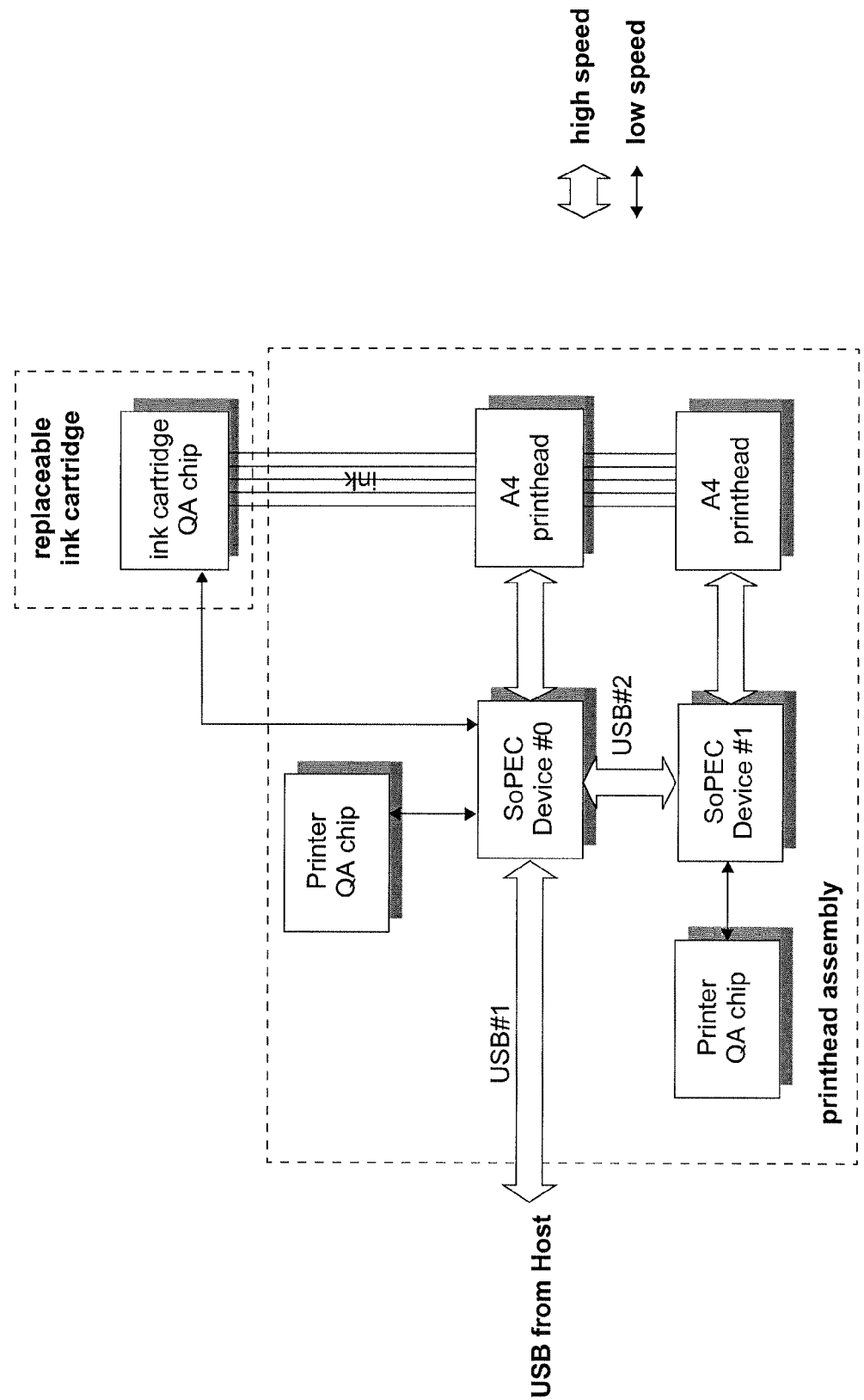

In FIG. 3, two SoPEC devices are used to control two printheads. Each printhead prints to opposite sides of the same page to achieve duplex printing. SoPEC #0 is the ISCMaster, SoPEC #1 is an ISCSlave. The ISCMaster receives all the compressed page data for both SoPECs and re-distributes the compressed data for the ISCSlave over a local USB bus. This configuration could print 30 double-sided pages per minute.

Figure 4:
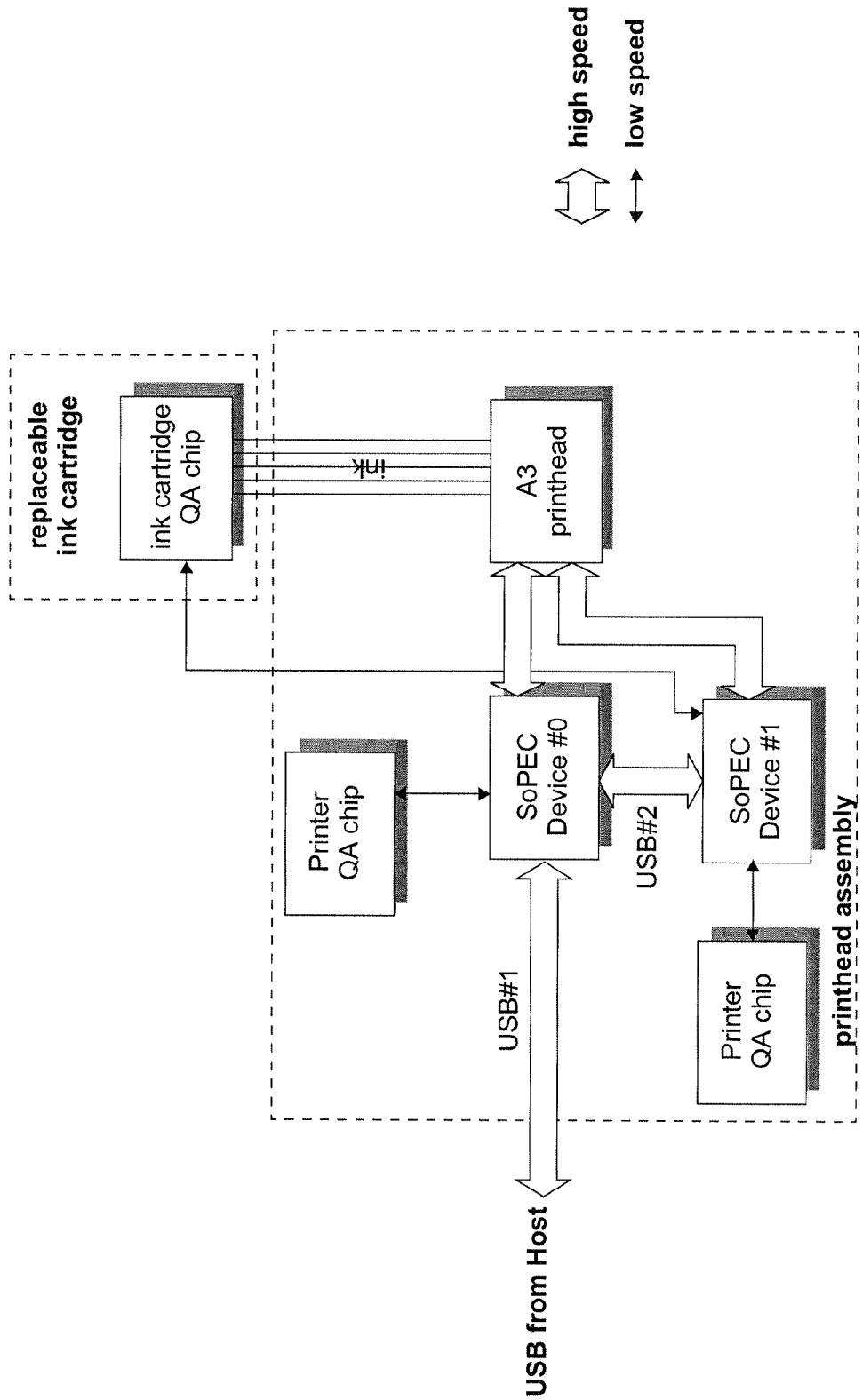

In FIG. 4, two SoPEC devices are used to control one A3 linking printhead, constructed from 16 printhead ICs. Each SoPEC controls 8 printhead ICs. This system operates in a similar manner to the 60 ppm A4 system in FIG. 2, although the speed is limited to 30 ppm at A3, since each SoPEC can only drive 6 printhead ICs at 60 ppm speeds. A total of 4 Mbyte of page store is available, this allows the system to use compression rates as in a single SoPEC A4 architecture, but with the increased page size of A3.

Figure 5:
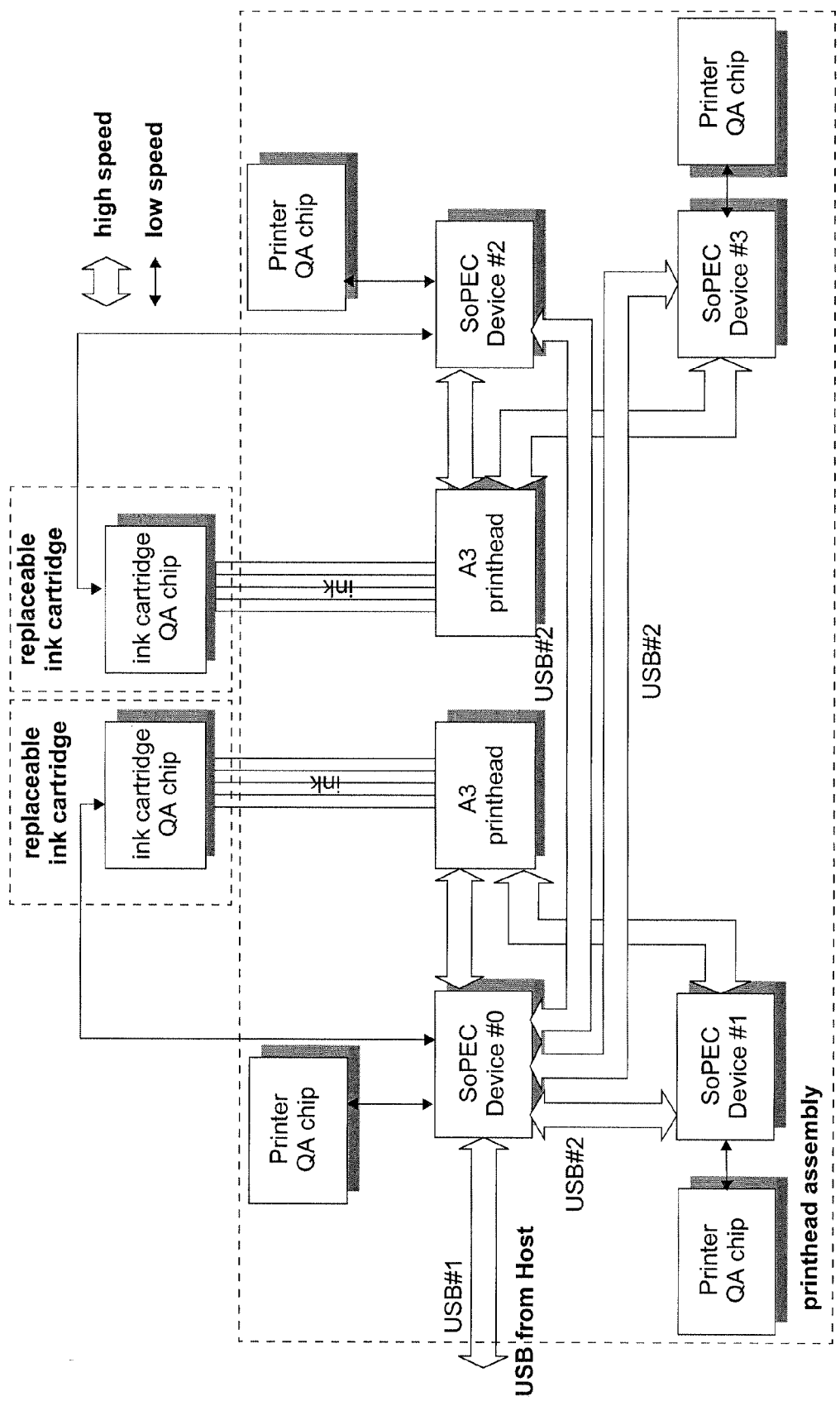

In FIG. 5 a four SoPEC system is shown. It contains 2 A3 linking printheads, one for each side of an A3 page. Each printhead contain 16 printhead ICs, each SoPEC controls 8 printhead ICs. SoPEC #0 is the ISCMaster with the other SoPECs as ISCSlaves. Note that all 3 USB Host ports on SoPEC #0 are used to communicate with the 3 ISCSlave SoPECs. In total, the system contains 8 Mbytes of compressed page store (2 Mbytes per SoPEC), so the increased page size does not degrade the system print quality, from that of an A4 simplex printer. The ISCMaster receives all the compressed page data for all SoPECs and re-distributes the compressed data over the local USB bus to the ISCSlaves. This configuration could print 30 double-sided A3 sheets per minute.

Figure 6:
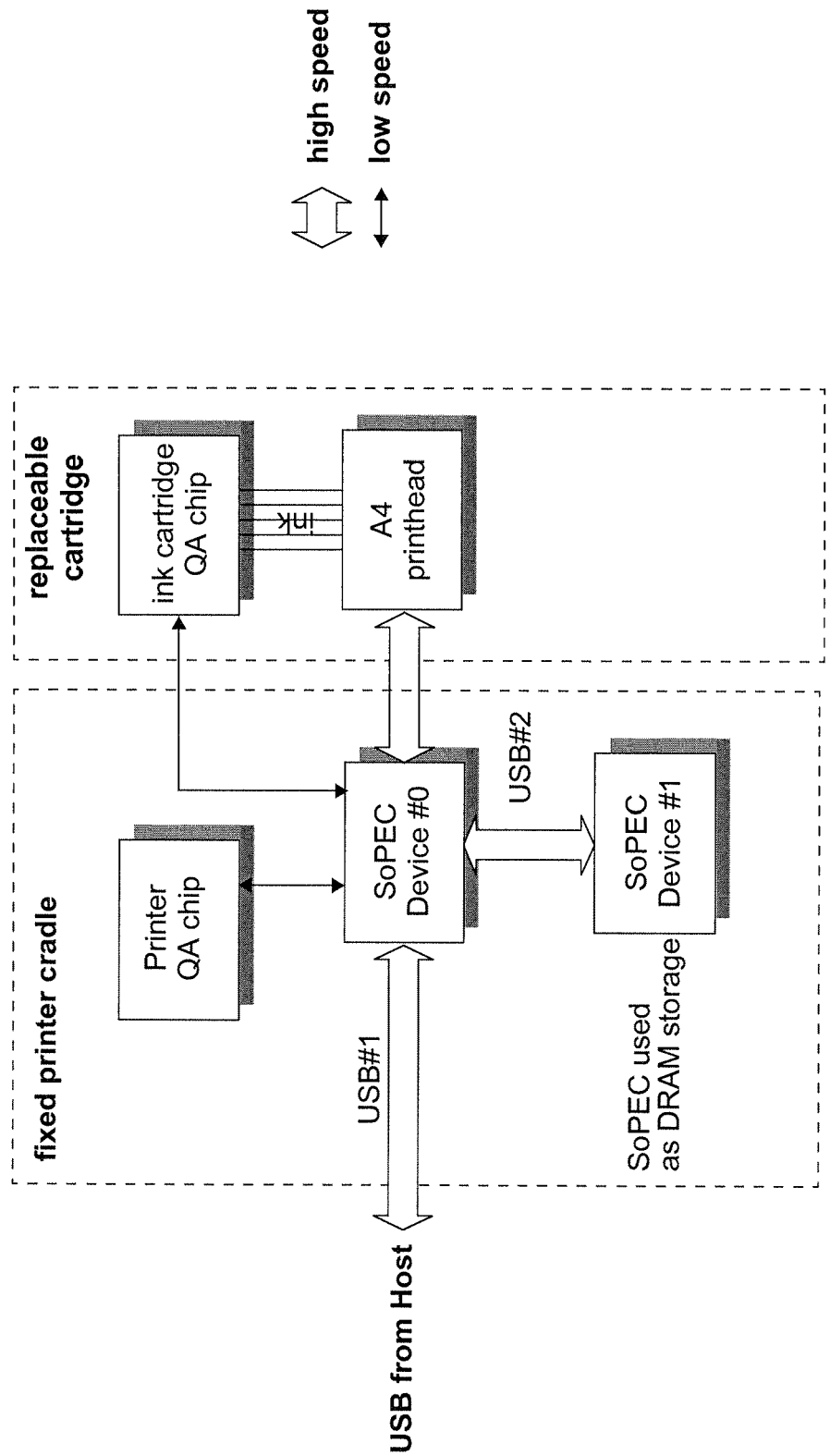
Figure 7:
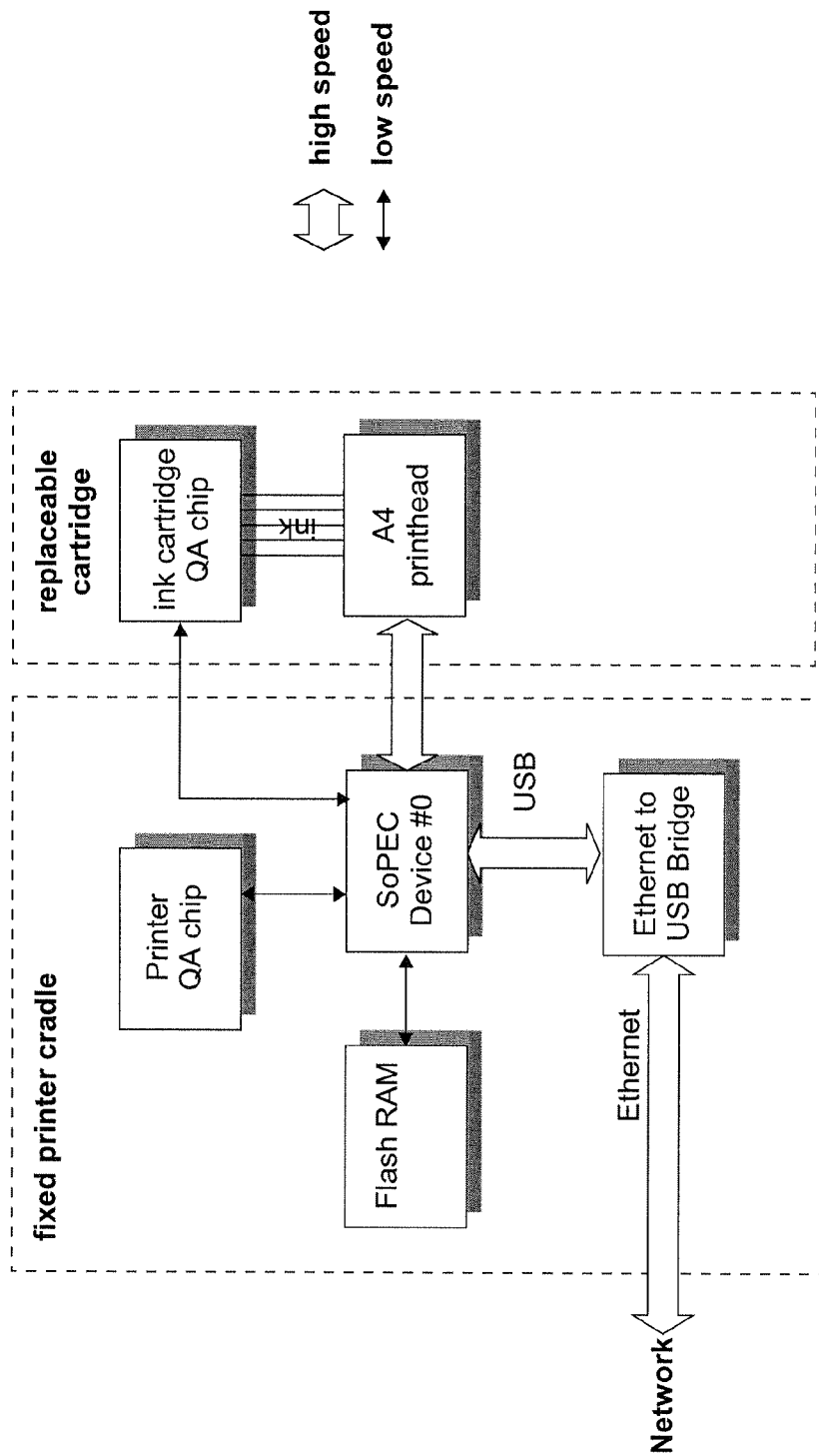
Figure 8:
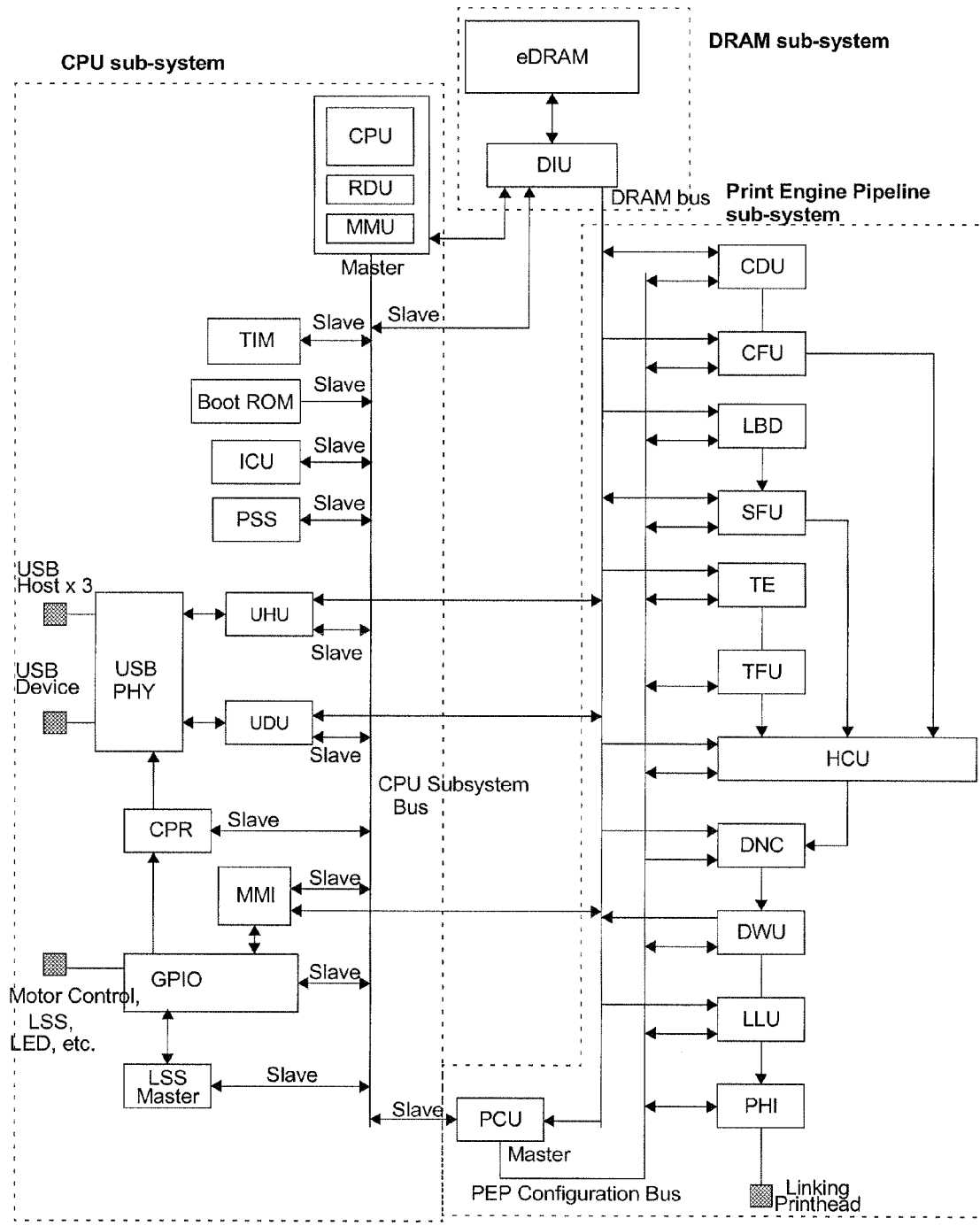

Extra SoPECs can be used for DRAM storage e.g. in FIG. 6 an A4 simplex printer can be built with a single extra SoPEC used for DRAM storage. The DRAM SoPEC can provide guaranteed bandwidth delivery of data to the printing SoPEC. SoPEC configurations can have multiple extra SoPECs used for DRAM storage.

Because of the page-width nature of the linking printhead, each page must be printed at a constant speed to avoid creating visible artifacts. This means that the printing speed can't be varied to match the input data rate. Document rasterization and document printing are therefore decoupled to ensure the printhead has a constant supply of data. A page is never printed until it is fully rasterized. This can be achieved by storing a compressed version of each rasterized page image in memory.

This decoupling also allows the RIP(s) to run ahead of the printer when rasterizing simple pages, buying time to rasterize more complex pages.

Because contone color images are reproduced by stochastic dithering, but black text and line graphics are reproduced directly using dots, the compressed page image format contains a separate foreground bi-level black layer and background contone color layer. The black layer is composited over the contone layer after the contone layer is dithered (although the contone layer has an optional black component). A final layer of Netpage tags (in infrared, yellow or black ink) is optionally added to the page for printout.

The SoPEC is a page rendering engine ASIC that takes compressed page images as input, and produces decompressed page images at up to 6 channels of bi-level dot data as output. The bi-level dot data is generated for the Memjet linking printhead. The dot generation process takes account of printhead construction, dead nozzles, and allows for fixative generation.

A single SoPEC can control up to 12 linking printheads and up to 6 color channels at >10,000 lines/sec, equating to 30 pages per minute. A single SoPEC can perform full-bleed printing of A4 and Letter pages. The 6 channels of colored ink are the expected maximum in a consumer SOHO, or office Memjet printing environment:

CMY, for regular color printing.
K, for black text, line graphics and gray-scale printing.
IR (infrared), for Netpage-enabled applications.
F (fixative), to enable printing at high speed. Because the Memjet printer is capable of printing so fast, a fixative may be required on specific media types (such as calendared paper) to enable the ink to dry before the page touches a previously printed page. Otherwise the pages may bleed on each other. In low speed printing environments, and for plain and photo paper, the fixative is not be required.

SoPEC provides mechanisms for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

The required printing rate for a single SoPEC is 30 sheets per minute with an inter-sheet spacing of 4 cm. To achieve a 30 sheets per minute print rate, this requires:

300 mm×63 (dot/mm)/2 sec=105.8 □seconds per line, with no inter-sheet gap.
340 mm×63 (dot/mm)/2 sec=93.3 □seconds per line, with a 4 cm inter-sheet gap.

A printline for an A4 page consists of 13824 nozzles across the page. At a system clock rate of 192 MHz, 13824 dots of data can be generated in 69.2 □seconds. Therefore data can be generated fast enough to meet the printing speed requirement.

Once generated, the data must be transferred to the printhead. Data is transferred to the printhead ICs using a 288 MHz clock (3/2 times the system clock rate). SoPEC has 6 printhead interface ports running at this clock rate. Data is 8b/10b encoded, so the throughput per port is 0.8×288=230.4 Mb/sec. For 6 color planes, the total number of dots per printhead IC is 1280×6=7680, which takes 33.3 □seconds to transfer. With 6 ports and 11 printhead ICs, 5 of the ports address 2 ICs sequentially, while one port addresses one IC and is idle otherwise. This means all data is transferred on 66.7 □seconds (plus a slight overhead). Therefore one SoPEC can transfer data to the printhead fast enough for 30 ppm printing.

In a system containing more than one SoPECs, the high bandwidth communication path between SoPECs is via USB. Typically, one SoPEC, the ISCMaster, has a USB connection to the host PC, and is responsible for receiving and distributing page data for itself and all other SoPECs in the system. The ISCMaster acts as a USB Device on the host PC's USB bus, and as the USB Host on a USB bus local to the printer.

Any local USB bus in the printer is logically separate from the host PC's USB bus; a SoPEC device does not act as a USB Hub. Therefore the host PC sees the entire printer system as a single USB function.

Figure 9:
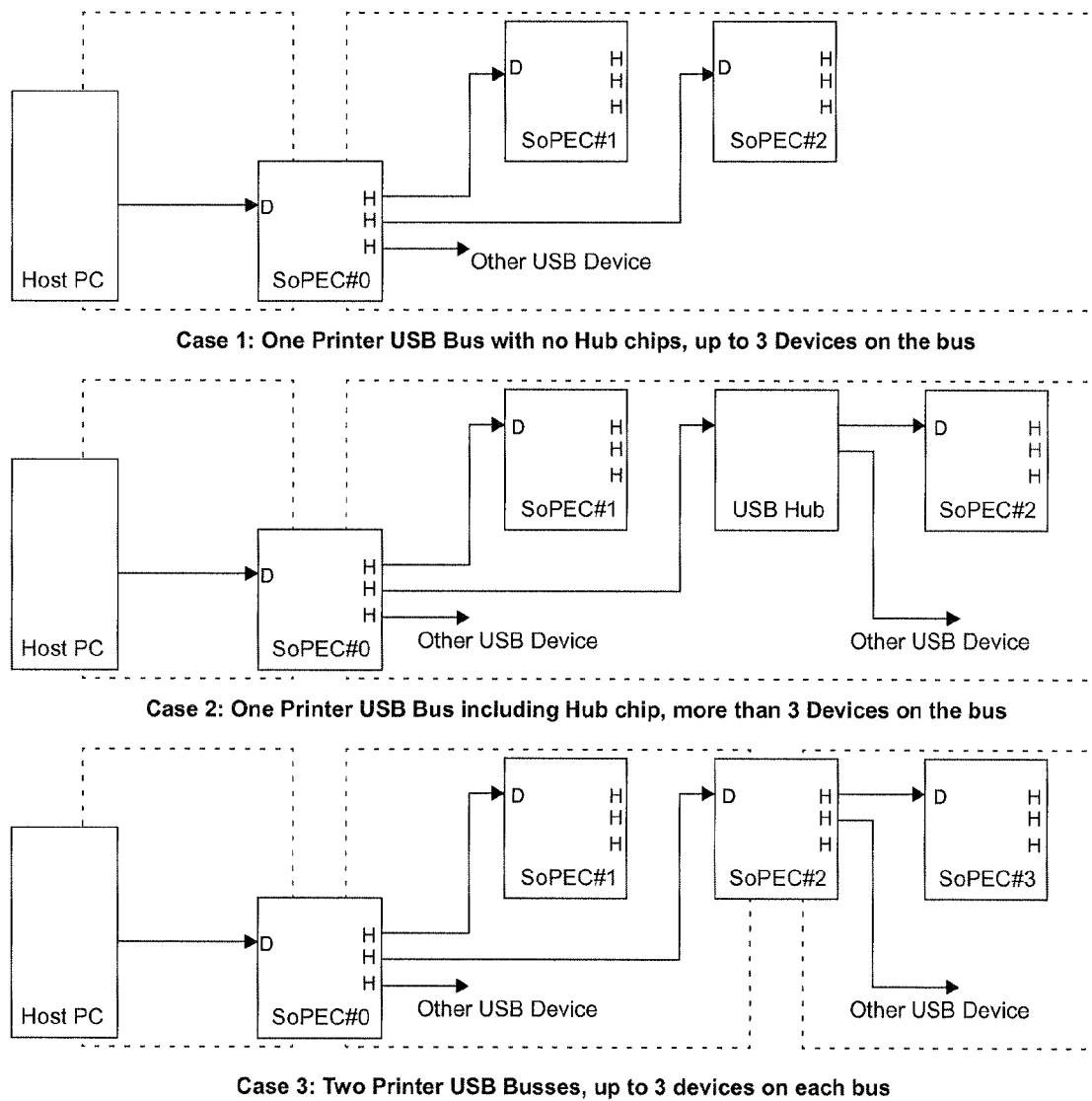

The SoPEC UHU supports three ports on the printer's USB bus, allowing the direct connection of up to three additional SoPEC devices (or other USB devices). If more than three USB devices need to be connected, two options are available: Expand the number of ports on the printer USB bus using a USB Hub chip; or Create one or more additional printer USB busses, using the UHU ports on other SoPEC devices. FIG. 9 shows these options.

Since the UDU and UHU for a single SoPEC are on logically different USB busses, data flow between them is via the on-chip DRAM, under the control of the SoPEC CPU. There is no direct communication, either at control or data level, between the UDU and the UHU. For example, when the host PC sends compressed page data to a multi-SoPEC system, all the data for all SoPECs must pass via the DRAM on the ISCMaster SoPEC. Any control or status messages between the host and any SoPEC will also pass via the ISCMaster's DRAM.

Further, while the UDU on SoPEC supports multiple USB interfaces and endpoints within a single USB device function, it typically does not have a mechanism to identify at the USB level which SoPEC is the ultimate destination of a particular USB data or control transfer. Therefore software on the CPU needs to redirect data on a transfer-by-transfer basis, either by parsing a header embedded in the USB data, or based on previously communicated control information from the host PC. The software overhead involved in this management adds to the overall latency of compressed page download for a multi-SoPEC system.

The UDU and UHU contain highly configurable DMA controllers that allow the CPU to direct USB data to and from DRAM buffers in a flexible way, and to monitor the DMA for a variety of conditions. This means that the CPU can manage the DRAM buffers between the UDU and the UHU without ever needing to physically move or copy packet data in the DRAM.

In a multi-SoPEC system the host generally manages program and compressed page download to all the SoPECs. Inter-SoPEC communication is over local USB links, which will add a latency. The SoPEC with the USB connection to the host is the ISCMaster.

In a multi-SoPEC system one of the SoPECs will be the PrintMaster. This SoPEC must manage and control sensors and actuators e.g. motor control. These sensors and actuators could be distributed over all the SoPECs in the system. An ISCMaster SoPEC may also be the PrintMaster SoPEC.

In a multi-SoPEC system each printing SoPEC will generally have its own PRINTER_QA chip (or at least access to a PRINTER_QA chip that contains the SoPEC's SoPEC_id_key) to validate operating parameters and ink usage. The results of these operations may be communicated to the PrintMaster SoPEC.

In general the ISCMaster may need to be able to: send messages to the ISCSlaves which will cause the ISCSlaves to send their status to the ISCMaster; and instruct the ISCSlaves to perform certain operations.

As the local USB links represent an insecure interface, commands issued by the ISCMaster are regarded as user mode commands. Supervisor mode code running on the SoPEC CPUs will allow or disallow these commands. The software protocol needs to be constructed with this in mind. The ISCMaster will initiate all communication with the ISC-Slaves.

Figure 10:
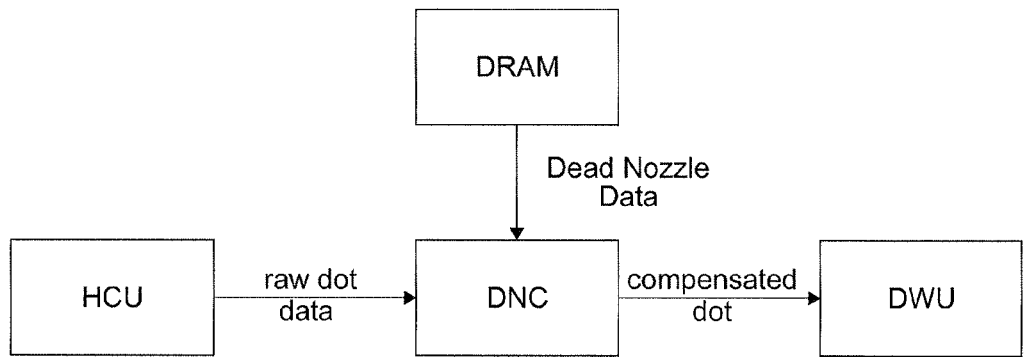

The Dead Nozzle Compensator (DNC) is responsible for adjusting Memjet dot data to take account of non-functioning nozzles in the Memjet printhead. Input dot data is supplied from the HCU, and the corrected dot data is passed out to the DWU. The high level data path is shown by the block diagram in FIG. 10.

The DNC compensates for a dead nozzles by performing the following operations:

Dead nozzle removal, i.e. turn the nozzle off
Ink replacement by direct substitution e.g. K-→$K_{alternative}$
Ink replacement by indirect substitution e.g. K-→CMY
Error diffusion to adjacent nozzles
Fixative corrections The DNC is required to efficiently support up to 5% dead nozzles, under the expected DRAM bandwidth allocation, with no restriction on where dead nozzles are located and handle any fixative correction due to nozzle compensations. Performance must degrade gracefully after 5% dead nozzles.

Figure 11:
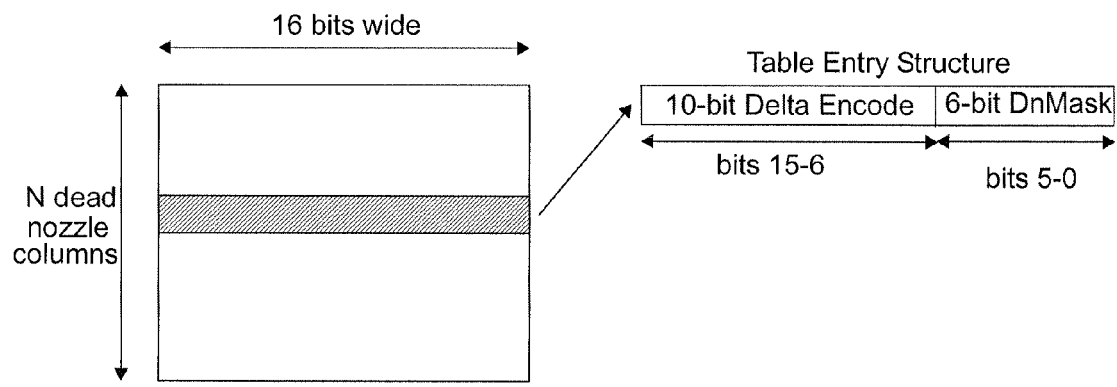

Dead nozzles are identified by means of a position value and a mask value. Position information is represented by a 10-bit delta encoded format, where the 10-bit value defines the number of dots between dead nozzle columns. The delta information is stored with an associated 6-bit dead nozzle mask (dn_mask) for the defined dead nozzle position. Each bit in the dn_mask corresponds to an ink plane. A set bit indicates that the nozzle for the corresponding ink plane is dead. The dead nozzle table format is shown in FIG. 11. The DNC reads dead nozzle information from DRAM in single 256-bit accesses. A 10-bit delta encoding scheme is chosen so that each table entry is 16 bits wide, and 16 entries fit exactly in each 256-bit read. Using 10-bit delta encoding means that the maximum distance between dead nozzle columns is 1023 dots. It is possible that dead nozzles may be spaced further than 1023 dots from each other, so a null dead nozzle identifier is required. A null dead nozzle identifier is defined as a 6-bit dn_mask of all zeros. These null dead nozzle identifiers should also be used so that: the dead nozzle table is a multiple of 16 entries (so that it is aligned to the 256-bit DRAM locations); and the dead nozzle table spans the complete length of the line, i.e. the first entry dead nozzle table should have a delta from the first nozzle column in a line and the last entry in the dead nozzle table should correspond to the last nozzle column in a line.

Note that the DNC deals with the width of a page. This may or may not be the same as the width of the printhead (printhead ICs may overlap due to misalignment during assembly, and additionally, the LLU may introduce margining to the page). Care must be taken when programming the dead nozzle table so that dead nozzle positions are correctly specified with respect to the page and printhead.

The DNC receives 6 bits of dot information every cycle from the HCU, 1 bit per color plane. When the dot position corresponds to a dead nozzle column, the associated 6-bit dn_mask indicates which ink plane(s) contains a dead nozzle(s). The DNC first deletes dots destined for the dead nozzle. It then replaces those dead dots, either by placing the data destined for the dead nozzle into an adjacent ink plane (direct substitution) or into a number of ink planes (indirect substitution). After ink replacement, if a dead nozzle is made active again then the DNC performs error diffusion. Finally, following the dead nozzle compensation mechanisms the fixative, if present, may need to be adjusted due to new nozzles being activated, or dead nozzles being removed.

If a nozzle is defined as dead, then the first action for the DNC is to turn off (zeroing) the dot data destined for that nozzle. This is done by a bit-wise ANDing of the inverse of the dn_mask with the dot value.

Ink replacement is a mechanism where data destined for the dead nozzle is placed into an adjacent ink plane of the same color (direct substitution, e.g. K-→$K_{alternative}$), or placed into a number of ink planes, the combination of which produces the desired color (indirect substitution, e.g. K-→CMY). Ink replacement is performed by filtering out ink belonging to nozzles that are dead and then adding back in an appropriately calculated pattern. This two step process allows the optional re-inclusion of the ink data into the original dead nozzle position to be subsequently error diffused. In the general case, fixative data destined for a dead nozzle should not be left active intending it to be later diffused.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data. The output of the ink replacement process is then filtered so that error diffusion is only allowed for the planes in which error diffusion is enabled. The output of the ink replacement logic is ORed with the resultant dot after dead nozzle removal. See FIG. 16 for implementation details.

For example if we consider the printhead color configuration C,M,Y,$K_1$,$K_2$,IR and the input dot data from the HCU is b101100. Assuming that the $K_1$ ink plane and IR ink plane for this position are dead so the dead nozzle mask is b000101. The DNC first removes the dead nozzle by zeroing the $K_1$ plane to produce b101000. Then the dead nozzle mask is ANDed with the dot data to give b000100 which selects the ink replacement pattern for $K_1$ (in this case the ink replacement pattern for $K_1$ is configured as b000010, i.e. ink replacement into the $K_2$ plane). Providing error diffusion for $K_2$ is enabled, the output from the ink replacement process is b000010. This is ORed with the output of dead nozzle removal to produce the resultant dot b101010. As can be seen the dot data in the defective $K_1$ nozzle was removed and replaced by a dot in the adjacent $K_2$ nozzle in the same dot position, i.e. direct substitution.

In the example above the $K_1$ ink plane could be compensated for by indirect substitution, in which case ink replacement pattern for $K_1$ would be configured as b111000 (substitution into the CMY color planes), and this is ORed with the output of dead nozzle removal to produce the resultant dot b111000. Here the dot data in the defective $K_1$ ink plane was removed and placed into the CMY ink planes.

Based on the programming of the lookup table the dead nozzle may be left active after ink replacement. In such cases the DNC can compensate using error diffusion. Error diffusion is a mechanism where dead nozzle dot data is diffused to adjacent dots.

When a dot is active and its destined nozzle is dead, the DNC will attempt to place the data into an adjacent dot position, if one is inactive. If both dots are inactive then the choice is arbitrary, and is determined by a pseudo random bit generator. If both neighbor dots are already active then the bit cannot be compensated by diffusion.

Figure 12:
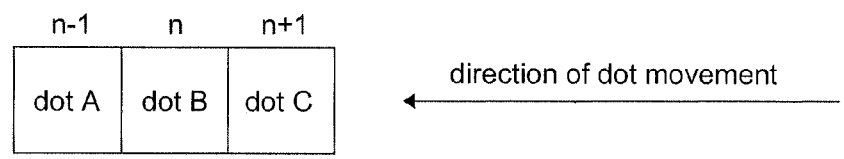

Since the DNC needs to look at neighboring dots to determine where to place the new bit (if required), the DNC works on a set of 3 dots at a time. For any given set of 3 dots, the first dot received from the HCU is referred to as dot A, and the second as dot B, and the third as dot C. The relationship is shown in FIG. 12.

For any given set of dots ABC, only B can be compensated for by error diffusion if B is defined as dead. A 1 in dot B will be diffused into either dot A or dot C if possible. If there is already a 1 in dot A or dot C then a 1 in dot B cannot be diffused into that dot.

The DNC must support adjacent dead nozzles. Thus if dot A is defined as dead and has previously been compensated for by error diffusion, then the dot data from dot B should not be diffused into dot A. Similarly, if dot C is defined as dead, then dot data from dot B should not be diffused into dot C.

Error diffusion should not cross line boundaries. If dot B contains a dead nozzle and is the first dot in a line then dot A represents the last dot from the previous line. In this case an active bit on a dead nozzle of dot B should not be diffused into dot A. Similarly, if dot B contains a dead nozzle and is the last dot in a line then dot C represents the first dot of the next line. In this case an active bit on a dead nozzle of dot B should not be diffused into dot C. Thus, as a rule, a 1 in dot B cannot be diffused into dot A if
- a 1 is already present in dot A,
- dot A is defined as dead,
- or dot A is the last dot in a line.

Similarly, a 1 in dot B cannot be diffused into dot C if
- a 1 is already present in dot C,
- dot C is defined as dead,
- or dot C is the first dot in a line.

If B is defined to be dead and the dot value for B is 0, then no compensation needs to be done and dots A and C do not need to be changed.

If B is defined to be dead and the dot value for B is 1, then B is changed to 0 and the DNC attempts to place the 1 from B into either A or C:
- If the dot can be placed into both A and C, then the DNC must choose between them. The preference is given by the current output from the random bit generator, 0 for "prefer left" (dot A) or 1 for "prefer right" (dot C).
- If dot can be placed into only one of A and C, then the 1 from B is placed into that position.
- If dot cannot be placed into either one of A or C, then the DNC cannot place the dot in either position.

The random bit value used to arbitrarily select the direction of diffusion is generated by a 32-bit maximum length random bit generator. The generator generates a new bit for each dot in a line regardless of whether the dot is dead or not. The random bit generator is initialized with a 32-bit programmable seed value.

Figure 13:
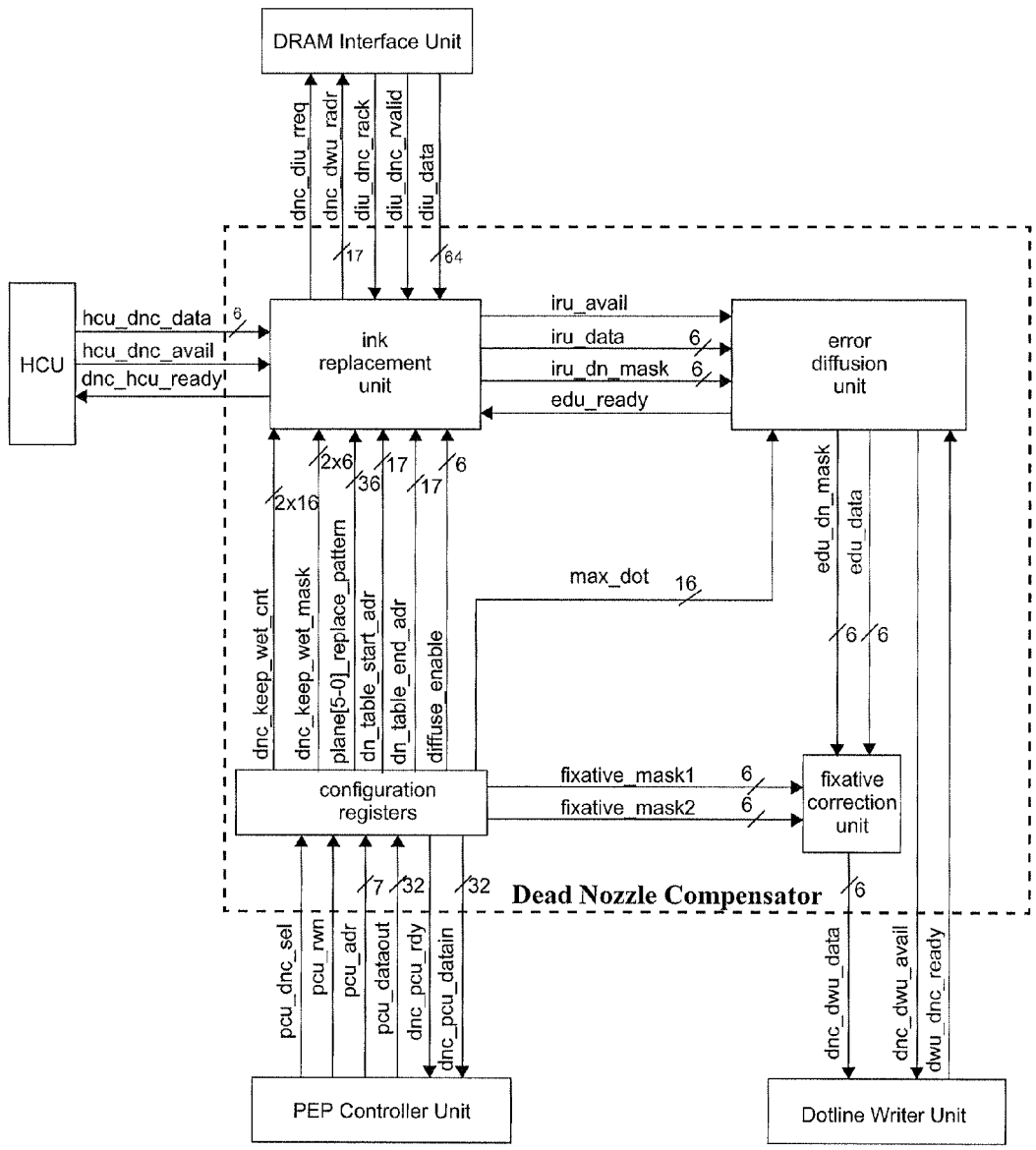
Figure 14:
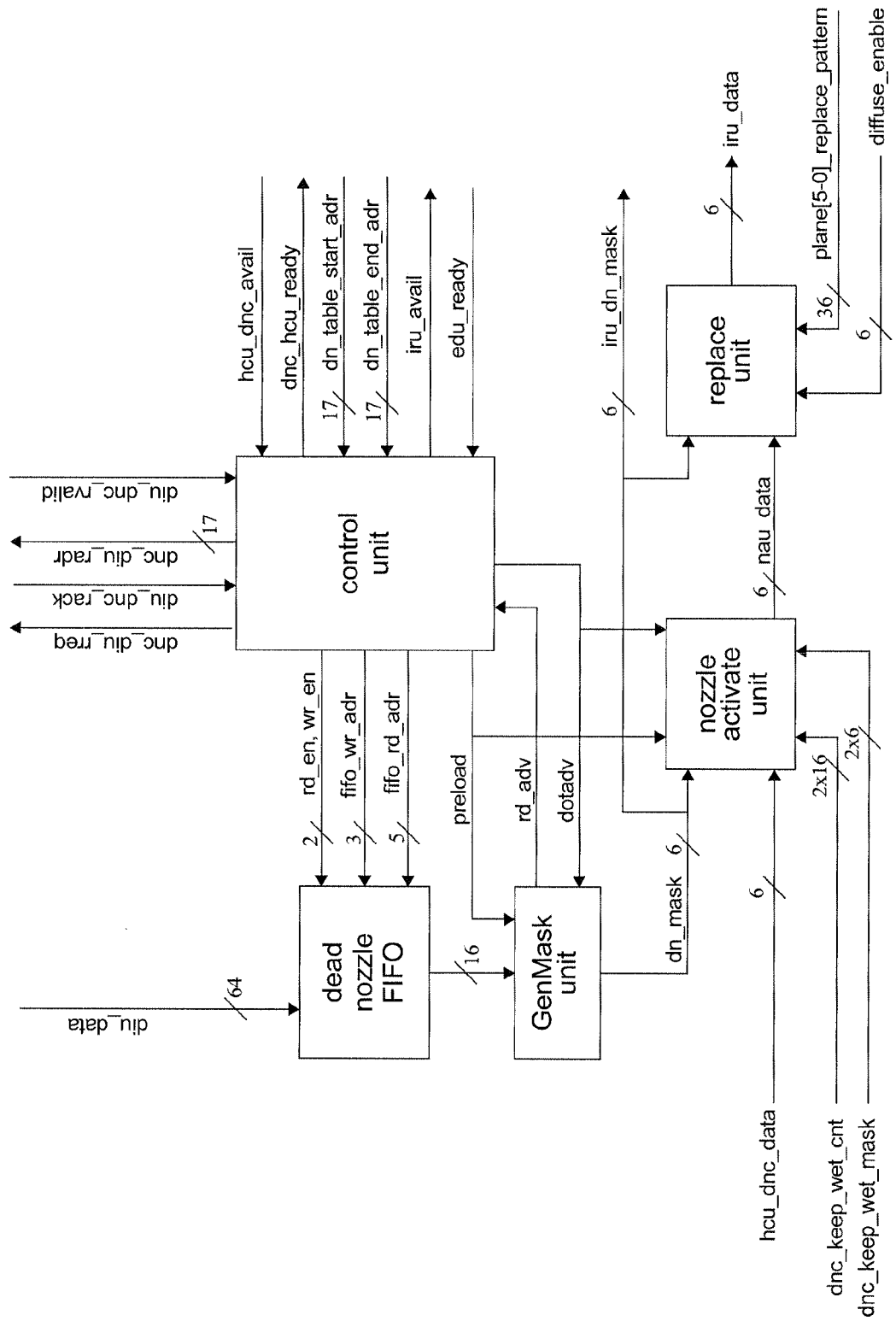

A block diagram of the DNC is shown in FIG. 13.

The configuration registers in the DNC are programmed via the PCU interface. Note that since addresses in SoPEC are byte aligned and the PCU only supports 32-bit register reads and writes, the lower 2 bits of the PCU address bus are not required to decode the address space for the DNC. When reading a register that is less than 32 bits wide zeros are returned on the upper unused bit(s) of dnc_pcu_datain.

Figure 15:
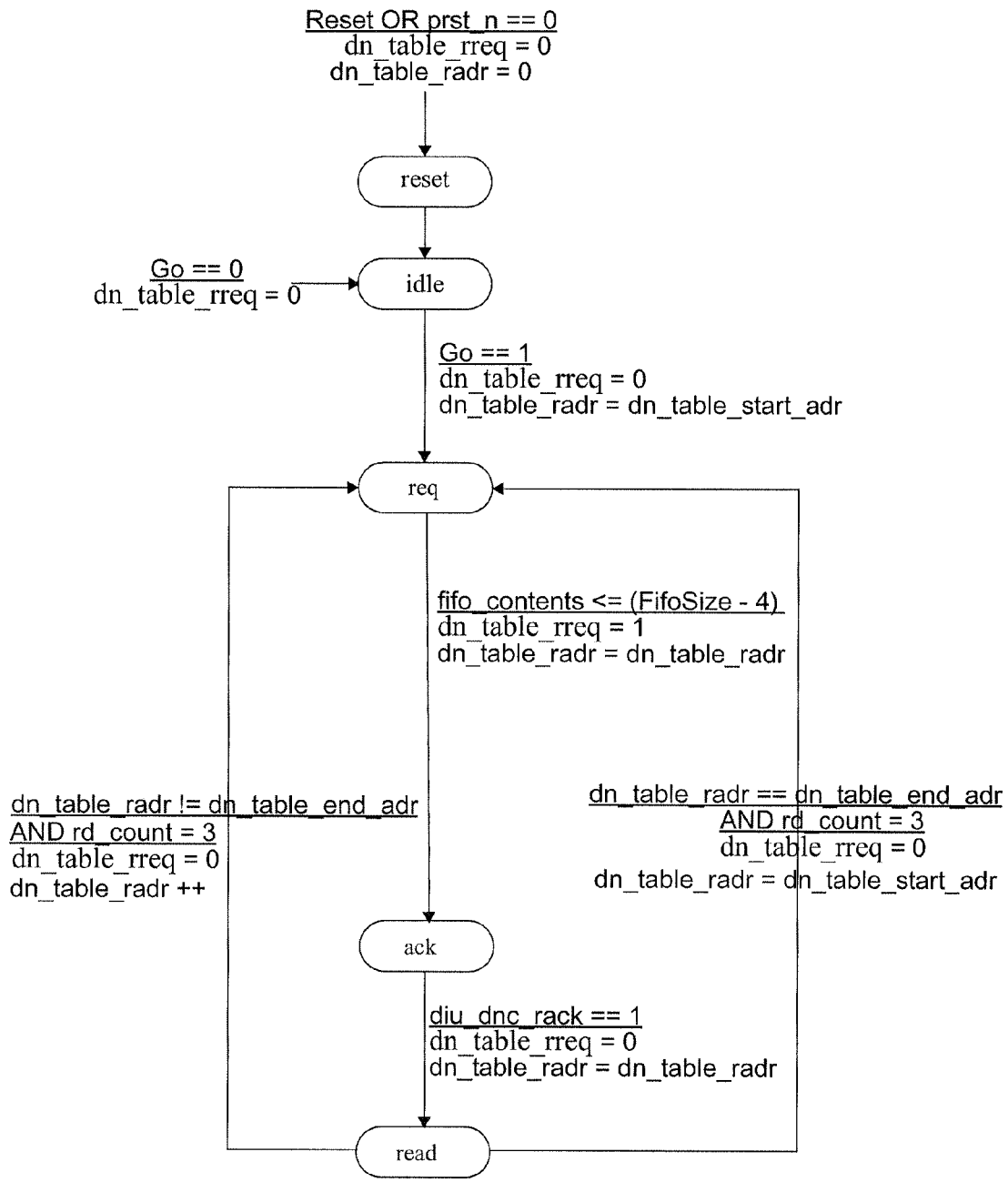

The control unit is responsible for reading the dead nozzle table from DRAM and making it available to the DNC via the dead nozzle FIFO. The dead nozzle table is read from DRAM in single 256-bit accesses, receiving the data from the DIU over 4 clock cycles (64-bits per cycle). The protocol and timing for read accesses to DRAM. Reading from DRAM is implemented by means of the state machine shown in FIG. 15.

All counters and flags should be cleared after reset. When Go transitions from 0 to 1 all counters and flags should take their initial value. While the Go bit is 1, the state machine requests a read access from the dead nozzle table in DRAM provided there is enough space in its FIFO.

A modulo-4 counter, rd_count, is used to count each of the 64-bits received in a 256-bit read access. It is incremented whenever diu_dnc_rvalid is asserted. When Go is 1, dn_table_radr is set to dn_table_start_adr. As each 64-bit value is returned, indicated by diu_dnc_rvalid being asserted, dn_table_radr is compared to dn_table_end_adr:
- If rd_count equals 3 and dn_table_radr equals dn_table_end_adr, then dn_table_radr is updated to dn_table_start_adr.
- If rd_count equals 3 and dn_table_radr does not equal dn_table_end_adr, then dn_table_radr is incremented by 1.

A count is kept of the number of 64-bit values in the FIFO. When diu_dnc_rvalid is 1 data is written to the FIFO by asserting wr_en, and fifo_contents and fifo_wr_adr are both incremented. When fifo_contents[3:0] is greater than 0 and edu_ready is 1 dnc_hcu ready is asserted to indicate that the DNC is ready to accept dots from the HCU. If hcu_dnc_avail is also 1 then a dotadv pulse is sent to the GenMask unit, indicating the DNC has accepted a dot from the HCU, and iru_avail is also asserted. After Go is set, a single preload pulse is sent to the GenMask unit once the FIFO contains data.

When a rd_adv pulse is received from the GenMask unit, fifo_rd_adr[4:0] is then incremented to select the next 16-bit value. If fifo_rd_adr[1:0]=11 then the next 64-bit value is read from the FIFO by asserting rd en, and fifo_contents[3:0] is decremented.

The dead nozzle FIFO conceptually is a 64-bit input, and 16-bit output FIFO to account for the 64-bit data transfers from the DIU, and the individual 16-bit entries in the dead nozzle table that are used in the GenMask unit. In reality, the FIFO is actually 8 entries deep and 64-bits wide (to accommodate two 256-bit accesses).

On the DRAM side of the FIFO the write address is 64-bit aligned while on the GenMask side the read address is 16-bit aligned, i.e. the upper 3 bits are input as the read address for the FIFO and the lower 2 bits are used to select 16 bits from the 64 bits (1st 16 bits read corresponds to bits 15-0, second 16 bits to bits 31-16 etc.).

The nozzle activate unit is responsible for activating nozzles periodically to prevent nozzle blocking. It inserts a nozzle activate mask dnc_keep_wet_mask every dnc_keep_wet_cnt number of active dots. The logic alternates between 2 configurable count and mask values, and repeats until Go is deasserted.

The logic is implemented with a single counter which is loaded with dnc_keep_wet_cnt0 when the preload signal from the control unit is received. The counter decrements each time an active dot is produced as indicated by the dotadv signal. When the counter is 0, the dnc_keep_wet_mask0 is inserted in the dot stream, and the counter is loaded with the dnc_keep_wet_cnt1. The counter is again decremented with each dotadv and when 0 the dnc_keep_wet_mask1 is inserted in the dot stream. The counter is loaded dnc_keep_wet_cnt0 value and the process is repeated.

When a dnc_keep_wet_mask value is inserted in the dot stream the nozzle activate unit checks the dn_mask value to prevent a dead nozzle getting activated by the inserted dot.

The GenMask unit generates the 6-bit dn_mask that is sent to the replace unit. It consists of a 10-bit delta counter and a mask register.

After Go is set, the GenMask unit will receive a preload pulse from the control unit indicating the first dead nozzle table entry is available at the output of the dead nozzle FIFO and should be loaded into the delta counter and mask register. A rd_adv pulse is generated so that the next dead nozzle table entry is presented at the output of the dead nozzle FIFO. The delta counter is decremented every time a dotadv pulse is received. When the delta counter reaches 0, it gets loaded with the current delta value output from the dead nozzle FIFO, i.e. bits 15-6, and the mask register gets loaded with mask output from the dead nozzle FIFO, i.e. bits 5-0. A rd_adv pulse is then generated so that the next dead nozzle table entry is presented at the output of the dead nozzle FIFO.

When the delta counter is 0 the value in the mask register is output as the dn_mask, otherwise the dn_mask is all 0s.

The GenMask unit has no knowledge of the number of dots in a line; it simply loads a counter to count the delta from one dead nozzle column to the next. Thus the dead nozzle table should include null identifiers if necessary so that the dead nozzle table covers the first and last nozzle column in a line.

Figure 16:
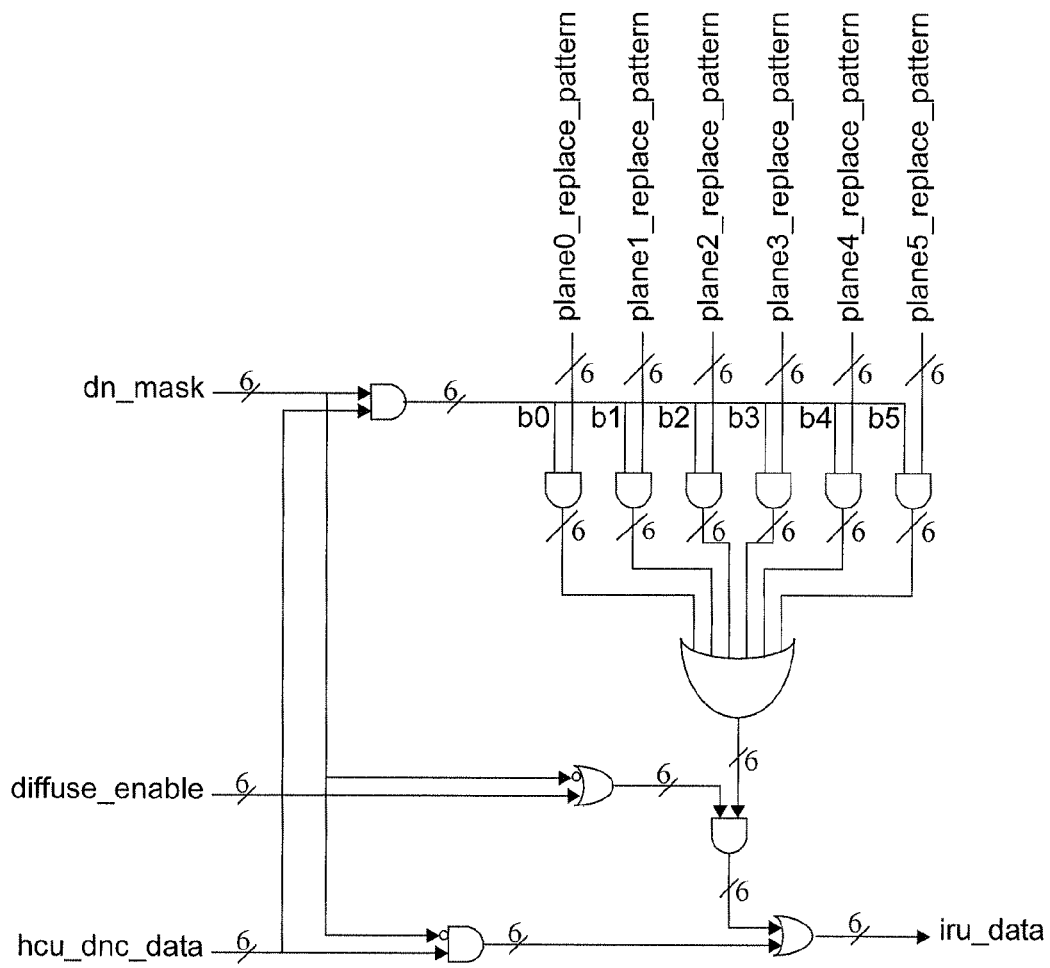

Dead nozzle removal and ink replacement are implemented by the combinatorial logic shown in FIG. 16. Dead nozzle removal is performed by bit-wise ANDing of the inverse of the dn_mask with the dot value.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data.

The output of the ink replacement process is then filtered so that error diffusion is only allowed for the planes in which error diffusion is enabled.

The output of the ink replacement process is ORed with the resultant dot after dead nozzle removal. If the dot position does not contain a dead nozzle then the dn_mask will be all 0s and the dot, hcu_dnc_data, will be passed through unchanged.

Figure 17:
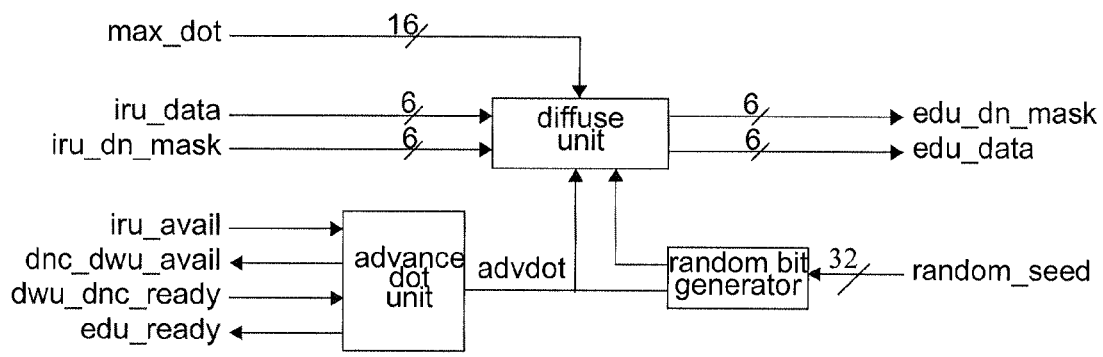

FIG. 17 shows a sub-block diagram for the error diffusion unit.

Figure 18:
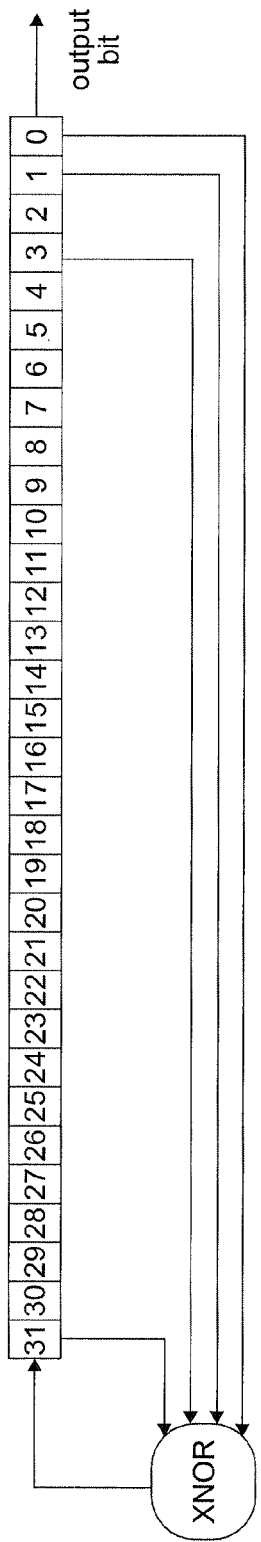

The random bit value used to arbitrarily select the direction of diffusion is generated by a maximum length 32-bit LFSR. The tap points and feedback generation are shown in FIG. 18. The LFSR generates a new bit for each dot in a line regardless of whether the dot is dead or not, i.e shifting of the LFSR is enabled when advdot equals 1. The LFSR can be initialised with a 32-bit programmable seed value, random_seed. This seed value is loaded into the LFSR whenever a write occurs to the RandomSeed register. Note that the seed value must not be all 1s as this causes the LFSR to lock-up.

The advance dot unit is responsible for determining in a given cycle whether or not the error diffuse unit will accept a dot from the ink replacement unit or make a dot available to the fixative correct unit and on to the DWU. It therefore receives the dwu_dnc_ready control signal from the DWU, the iru_avail flag from the ink replacement unit, and generates dnc_dwu_avail and edu_ready control flags.

Only the dwu_dnc_ready signal needs to be checked to see if a dot can be accepted and asserts edu_ready to indicate this. If the error diffuse unit is ready to accept a dot and the ink replacement unit has a dot available, then a advdot pulse is given to shift the dot into the pipeline in the diffuse unit. Note that since the error diffusion operates on 3 dots, the advance dot unit ignores dwu_dnc_ready initially until 3 dots have been accepted by the diffuse unit. Similarly dnc_dwu_avail is not asserted until the diffuse unit contains 3 dots and the ink replacement unit has a dot available.

The diffuse unit contains the combinatorial logic to implement the truth table. The diffuse unit receives a dot consisting of 6 color planes (1 bit per plane) as well as an associated 6-bit dead nozzle mask value.

Error diffusion is applied to all 6 planes of the dot in parallel. Since error diffusion operates on 3 dots, the diffuse unit has a pipeline of 3 dots and their corresponding dead nozzle mask values. The first dot received is referred to as dot A, and the second as dot B, and the third as dot C. Dots are shifted along the pipeline whenever advdot is 1. A count is also kept of the number of dots received. It is incremented whenever advdot is 1, and wraps to 0 when it reaches max_dot. When the dot count is 0 dot C corresponds to the first dot in a line. When the dot count is 1 dot A corresponds to the last dot in a line.

In any given set of 3 dots, the diffuse unit only compensates for dead nozzles from the point of view of dot B (the processing of data due to the deadness of dot A and/or dot C is undertaken when the data is at dot B i.e. one dot-time earlier for data now in dot A, or one dot-time later for data now in dot C). Dead nozzles are identified by bits set in iru_dn_mask. If dot B contains a dead nozzle(s), the corresponding bit(s) in dot A, dot C, the dead nozzle mask value for A, the dead nozzle mask value for C, the dot count, as well as the random bit value are input to the truth table logic and the dots A, B and C assigned accordingly. If dot B does not contain a dead nozzle then the dots are shifted along the pipeline unchanged.

The Dotline Writer Unit (DWU) receives 1 dot (6 bits) of color information per cycle from the DNC. Dot data received is bundled into 256-bit words and transferred to the DRAM.

The DWU (in conjunction with the LLU) implements a dot line FIFO mechanism to compensate for the physical placement of nozzles in a printhead, and provides data rate smoothing to allow for local complexities in the dot data generate pipeline.

Figure 19:
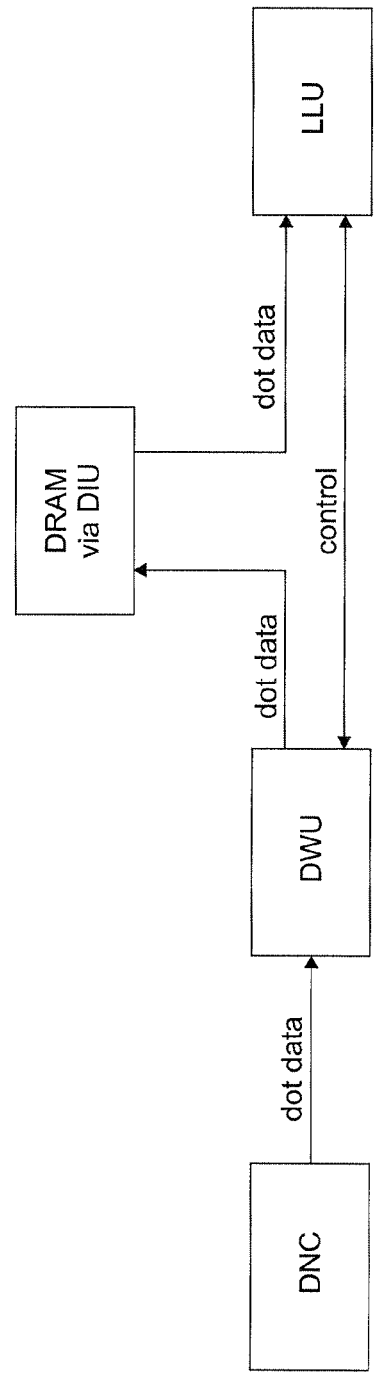

The physical placement of nozzles in the printhead means that in one firing sequence of all nozzles, dots will be produced over several print lines. The printhead consists of up to 12 rows of nozzles, one for each color of odd and even dots. Nozzles rows of the same color are separated by $D_1$ print lines and nozzle rows of different adjacent colors are separated by $D_2$ print lines. See FIG. 19 for reference. The first color to be printed is the first row of nozzles encountered by the incoming paper. In the example this is color 0 odd, although is dependent on the printhead type. Paper passes under printhead moving upwards.

Due to the construction limitations the printhead can have nozzles mildly sloping over several lines, or a vertical alignment discontinuity at potentially different horizontal positions per row ($D_3$). The DWU doesn't need any knowledge of the discontinuities only that it stores sufficient lines in the dot store to allow the LLU to compensate.

Figure 20:
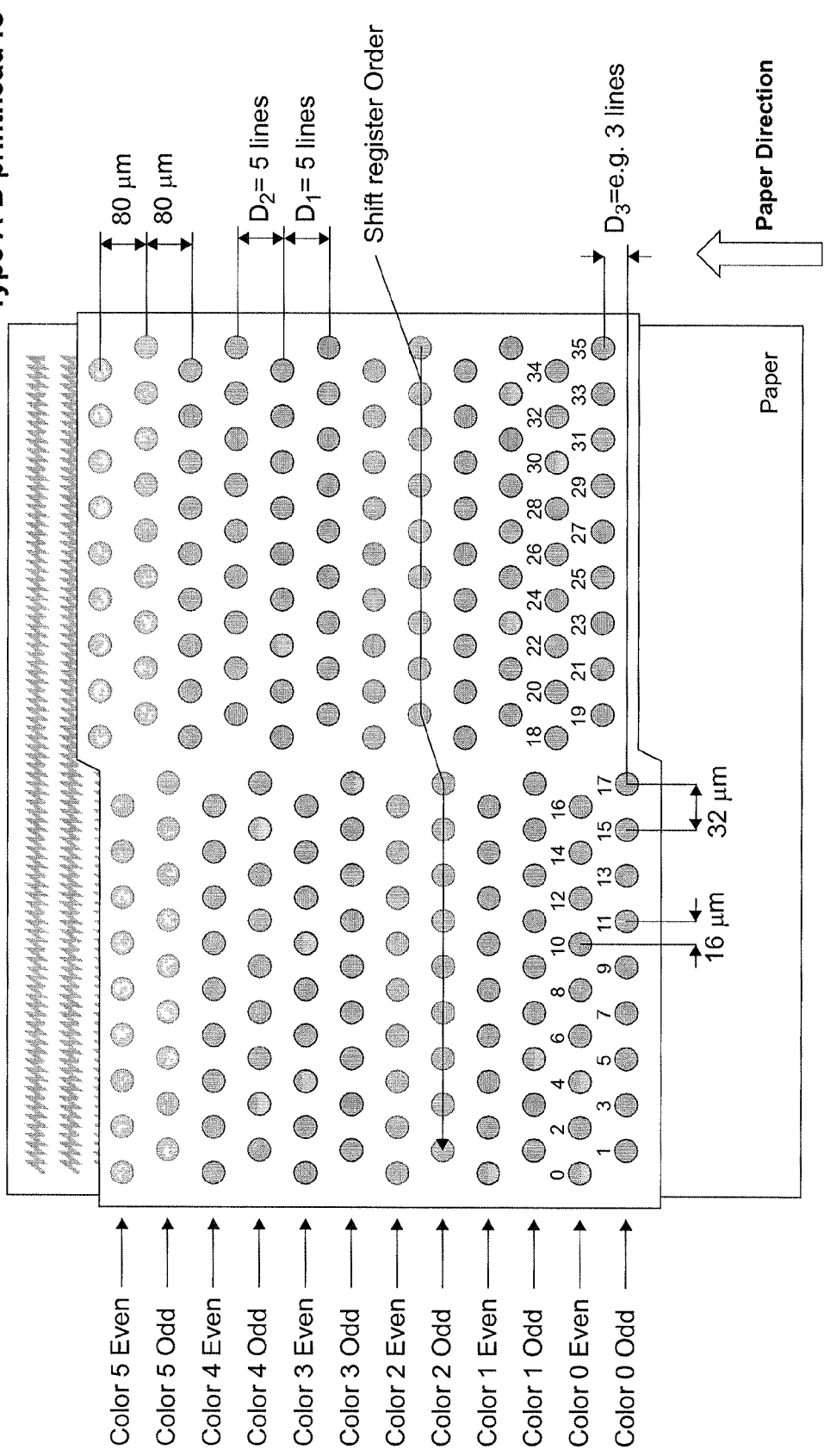

FIG. 20 shows a possible vertical misalignment of rows within a printhead segment. There will also be possible vertical and horizontal misalignment of rows between adjacent printhead segments.

The DWU compensates for horizontal misalignment of nozzle rows within printhead segments, and writes data out to half line buffers so that the LLU is able to compensate for vertical misalignments between and within printhead segments. The LLU also compensates for the horizontal misalignment between a printhead segment.

Figure 21:
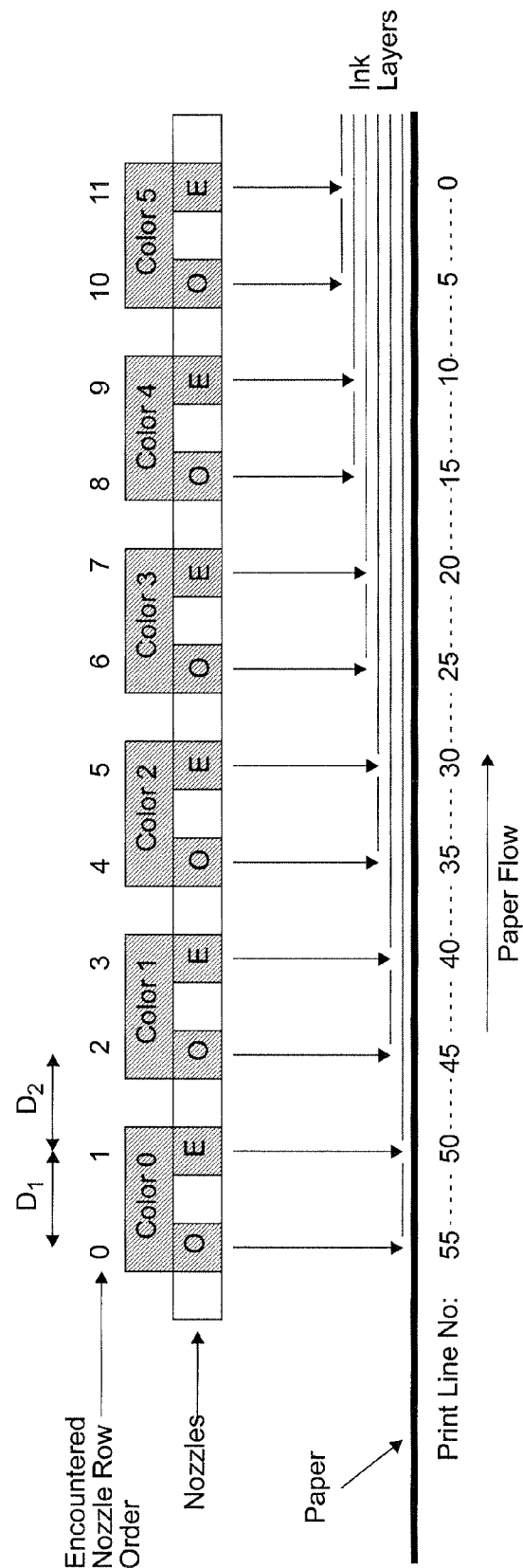

For example if the physical separation of each half row is 80 □m equating to $D_1=D_2=5$ print lines at 1600 dpi. This means that in one firing sequence, color 0 odd nozzles 1-17 will fire on dotline L, color 0 even nozzles 0-16 will fire on dotline L-$D_1$, color 1 odd nozzles 1-17 will fire on dotline L-$D_1$-$D_2$ and so on over 6 color planes odd and even nozzles. The total number of physical lines printed onto over a single line time is given as (0+5+5 . . . +5)1+11×5=56. See FIG. 21 for example diagram.

It is expected that the physical spacing of the printhead nozzles will be 80 □m (or 5 dot lines), although there is no dependency on nozzle spacing. The DWU is configurable to allow other line nozzle spacings.

The DWU block is required to compensate for the physical spacing between lines of nozzles. It does this by storing dot lines in a FIFO (in DRAM) until such time as they are required by the LLU for dot data transfer to the printhead interface. Colors are stored separately because they are needed at different times by the LLU. The dot line store must store enough lines to compensate for the physical line separation of the printhead but can optionally store more lines to allow system level data rate variation between the read (printhead feed) and write sides (dot data generation pipeline) of the FIFOs.

Figure 22:
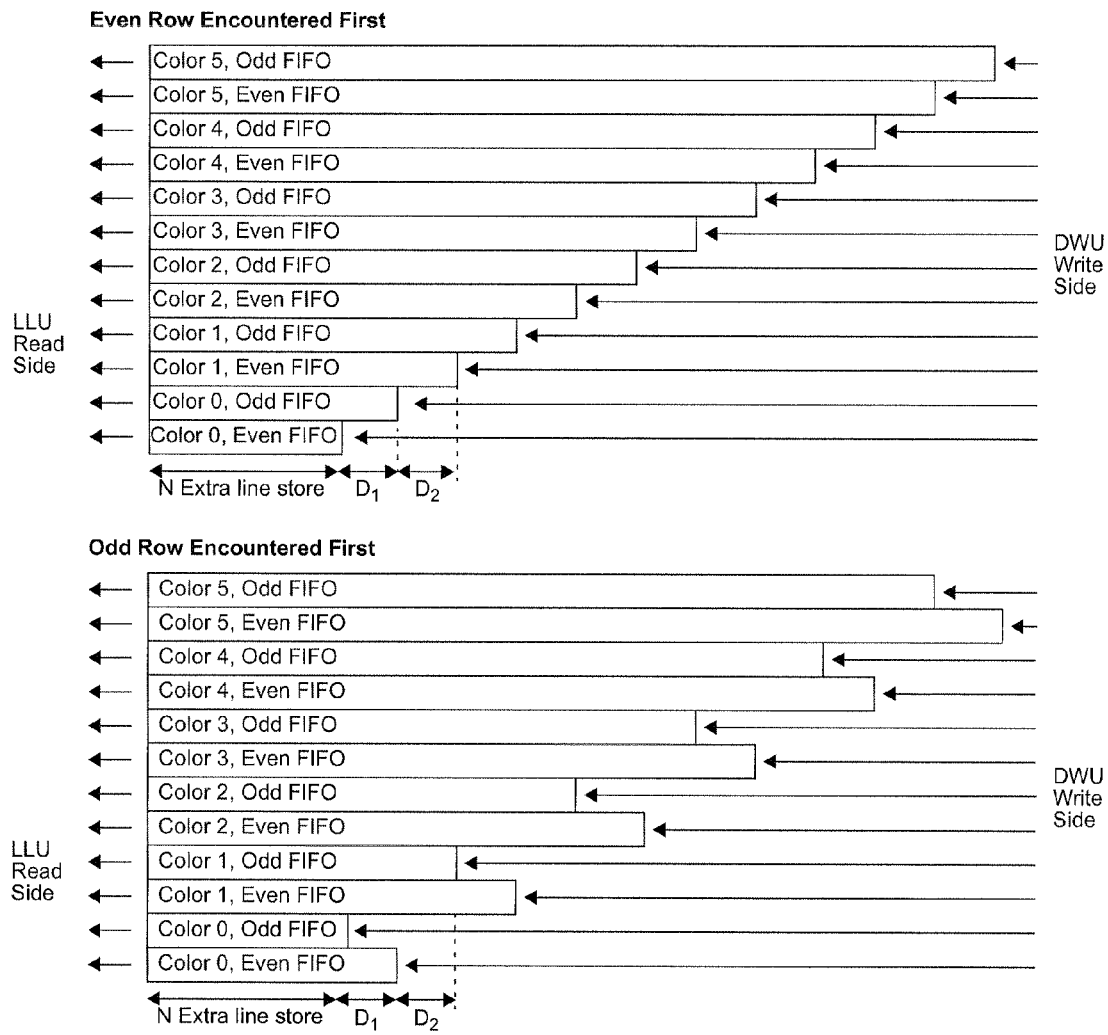

A logical representation of the FIFOs is shown in FIG. 22, where N is defined as the optional number of extra half lines in the dot line store for data rate de-coupling.

If the printhead contains nozzles sloping over X lines or a vertical misalignment of Y lines then the DWU must store N>X and N>Y lines in the dotstore to allow the LLU to compensate for the nozzle slope and any misalignment. It is also possible that the effects of a slope, and a vertical misalignment are accumulative, in such cases N>(X+Y).

The DNC and the DWU concept of line lengths can be different. The DNC can be programmed to produce less dots than the DWU expects per line, or can be programmed to produce an odd number of dots (the DWU always expect an even number of dots per line). The DWU produces NozzleSkewPadding more dots than it excepts from the DNC per line. If the DNC is required to produce an odd number of dots, the NozzleSkewPadding value can be adjusted to ensure the output from the DWU is still even. The relationship of line lengths between DWU and DNC must always satisfy:

(LineSize+1)*2−NozzleSkewPadding=*Dnc*LineLength

For an arbitrary page width of d dots (where d is even), the number of dots per half line is d/2. For interline spacing of $D_2$ and inter-color spacing of $D_1$, with C colors of odd and even half lines, the number of half line storage is $(C-1)(D_2+D_1)+D_1$.

For N extra half line stores for each color odd and even, the storage is given by (N*C*2).

The total storage requirement is $((C-1)(D_2+D_1)+D_1+(N*C*2))*d/2$ in bits.

Note that when determining the storage requirements for the dot line store, the number of dots per line is the page width and not necessarily the printhead width. The page width is often the dot margin number of dots less than the printhead width. They can be the same size for full bleed printing.

For example in an A4 page a line consists of 13824 dots at 1600 dpi, or 6912 dots per half dot line. To store just enough dot lines to account for an inter-line nozzle spacing of 5 dot lines it would take 55 half dot lines for color 5 odd, 50 dot lines for color 5 even and so on, giving 55+50+45 . . . 10+5+0=330 half dot lines in total. If it is assumed that N=4 then the storage required to store 4 extra half lines per color is 4×12=48, in total giving 330+48=378 half dot lines. Each half dot line is 6912 dots, at 1 bit per dot give a total storage requirement of 6912 dots×378 half dot lines/8 bits=Approx 319 Kbytes. Similarly for an A3 size page with 19488 dots per line, 9744 dots per half line×378 half dot lines/8=Approx 450 Kbytes.

The potential size of the dot line store makes it unfeasible to be implemented in on-chip SRAM, requiring the dot line store to be implemented in embedded DRAM. This allows a configurable dotline store where unused storage can be redistributed for use by other parts of the system.

Due to construction limitations of the printhead it is possible that nozzle rows within a printhead segment may be misaligned relative to each other by up to 5 dots per half line, which means 56 dot positions over 12 half lines (i.e. 28 dot pairs). Vertical misalignment can also occur but is compensated for in the LLU and not considered here. The DWU is required to compensate for the horizontal misalignment.

Dot data from the HCU (through the DNC) produces a dot of 6 colors all destined for the same physical location on paper. If the nozzle rows in the within a printhead segment are aligned as shown in FIG. 20 then no adjustment of the dot data is needed.

Figure 23:
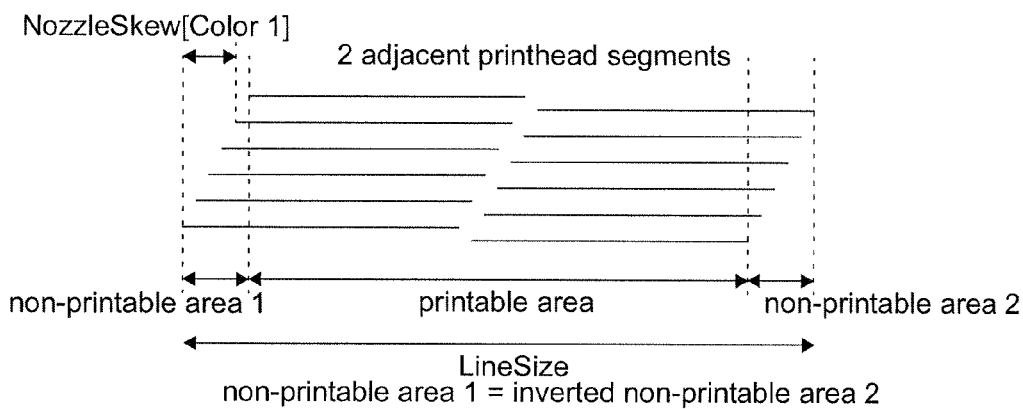

A conceptual misaligned printhead is shown in FIG. 23. The exact shape of the row alignment is arbitrary, although is most likely to be sloping (if sloping, it could be sloping in either direction).

The DWU is required to adjust the shape of the dot streams to take into account the relative horizontal displacement of nozzles rows between 2 adjacent printhead segments. The LLU compensates for the vertical skew between printhead segments, and the vertical and horizontal skew within printhead segments. The nozzle row skew function aligns rows to compensate for the seam between printhead segments (as shown in FIG. 23) and not for the seam within a printhead (as shown in FIG. 20). The DWU nozzle row function results in aligned rows as shown in the example in FIG. 24.

To insert the shape of the skew into the dot stream, for each line we must first insert the dots for non-printable area 1, then the printable area data (from the DNC), and then finally the dots for non-printable area 2. This can also be considered as: first produce the dots for non-printable area 1 for line n, and then a repetition of:

produce the dots for the printable area for line n (from the DNC)
produce the dots for the non-printable area 2 (for line n) followed by the dots of non-printable area 1 (for line n+1).

The reason for considering the problem this way is that regardless of the shape of the skew, the shape of non-printable area 2 merged with the shape of non-printable area 1 will always be a rectangle since the widths of non-printable areas 1 and 2 are identical and the lengths of each row are identical. Hence step 2 can be accomplished by simply inserting a constant number (NozzleSkewPadding) of 0 dots into the stream.

For example, if the color n even row non-printable area 1 is of length X, then the length of color n even row non-printable area 2 will be of length NozzleSkewPadding−X. The split between non-printable areas 1 and 2 is defined by the NozzleSkew registers.

Data from the DNC is destined for the printable area only, the DWU must generate the data destined for the non-printable areas, and insert DNC dot data correctly into the dot data stream before writing dot data to the fifos. The DWU inserts the shape of the misalignment into the dot stream by delaying dot data destined to different nozzle rows by the relative misalignment skew amount.

An embedded DRAM is expected to be of the order of 256 bits wide, which results in 27 words per half line of an A4 page, and 39 words per half line of A3. This requires 27 words×12 half colors (6 colors odd and even)=324×256-bit DRAM accesses over a dotline print time, equating to 6 bits per cycle (equal to DNC generate rate of 6 bits per cycle). Each half color is required to be double buffered, while filling one buffer the other buffer is being written to DRAM. This results in 256 bits×2 buffers×12 half colors i.e. 6144 bits in total. With 2× buffering the average and peak DRAM bandwidth requirement is the same and is 6 bits per cycle.

Should the DWU fail to get the required DRAM access within the specified time, the DWU will stall the DNC data generation. The DWU will issue the stall in sufficient time for the DNC to respond and still not cause a FIFO overrun. Should the stall persist for a sufficiently long time, the PHI will be starved of data and be unable to deliver data to the printhead in time. The sizing of the dotline store FIFO and internal FIFOs should be chosen so as to prevent such a stall happening.

The dot data shift register order in the printhead is shown in FIG. 20 (the transmit order is the opposite of the shift register order). In the example shown dot 1, dot 3, dot 5, . . . , dot 33, dot 35 would be transmitted to the printhead in that order. As data is always transmitted to the printhead in increasing order it is beneficial to store the dot lines in increasing order to facilitate easy reading and transfer of data by the LLU and PHI.

For each line in the dot store the order is the same (although for odd lines the numbering will be different the order will remain the same). Dot data from the DNC is always received in increasing dot number order. The dot data is bundled into 256-bit words and written in increasing order in DRAM, word 0 first, then word 1, and so on to word N, where N is the number of words in a line. The starting point for the first dot in a DRAM word is configured by the AlignmentOffset register.

The dot order in DRAM is shown in FIG. 25.

The start address for each half color N is specified by the ColorBaseAdr[N] registers and the end address (actually the end address plus 1) is specified by the ColorBaseAdr[N+1]. Note there are 12 colors in total, 0 to 11, the ColorBaseAdr [12] register specifies the end of the color 11 dot FIFO and not the start of a new dot FIFO. As a result the dot FIFOs must be specified contiguously and increasing in DRAM.

As each line is written to the FIFO, the DWU increments the FifoFillLevel register, and as the LLU reads a line from the FIFO the FifoFillLevel register is decremented. The LLU indicates that it has completed reading a line by a high pulse on the llu_dwu_line_rd line.

When the number of lines stored in the FIFO is equal to the MaxWriteAhead value the DWU will indicate to the DNC that it is no longer able to receive data (i.e. a stall) by deasserting the dwu_dnc_ready signal.

The ColorEnable register determines which color planes should be processed, if a plane is turned off, data is ignored for that plane and no DRAM accesses for that plane are generated.

Figure 26:
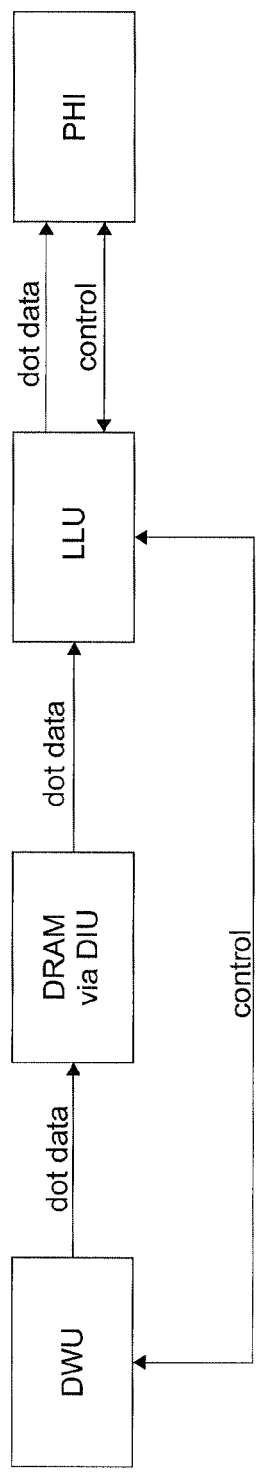

The Line Loader Unit (LLU) reads dot data from the line buffers in DRAM and structures the data into even and odd dot channels destined for the same print time. The blocks of dot data are transferred to the PHI and then to the printhead. FIG. 26 shows a high level data flow diagram of the LLU in context.

Figure 27:
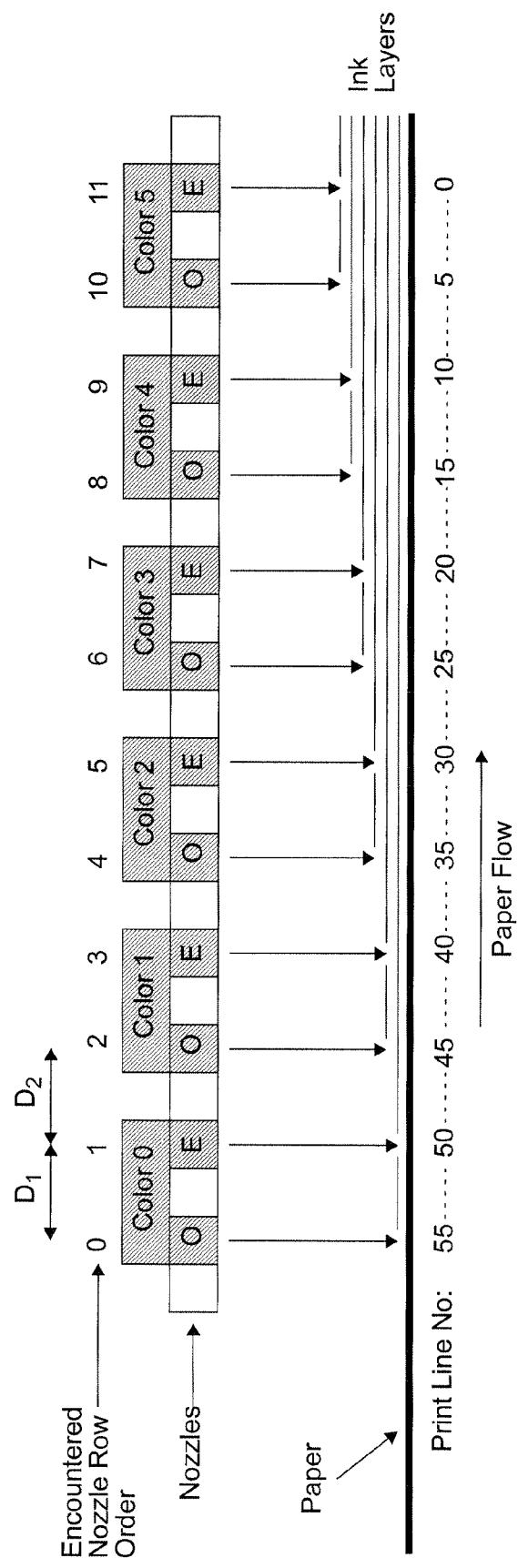
Figure 30:
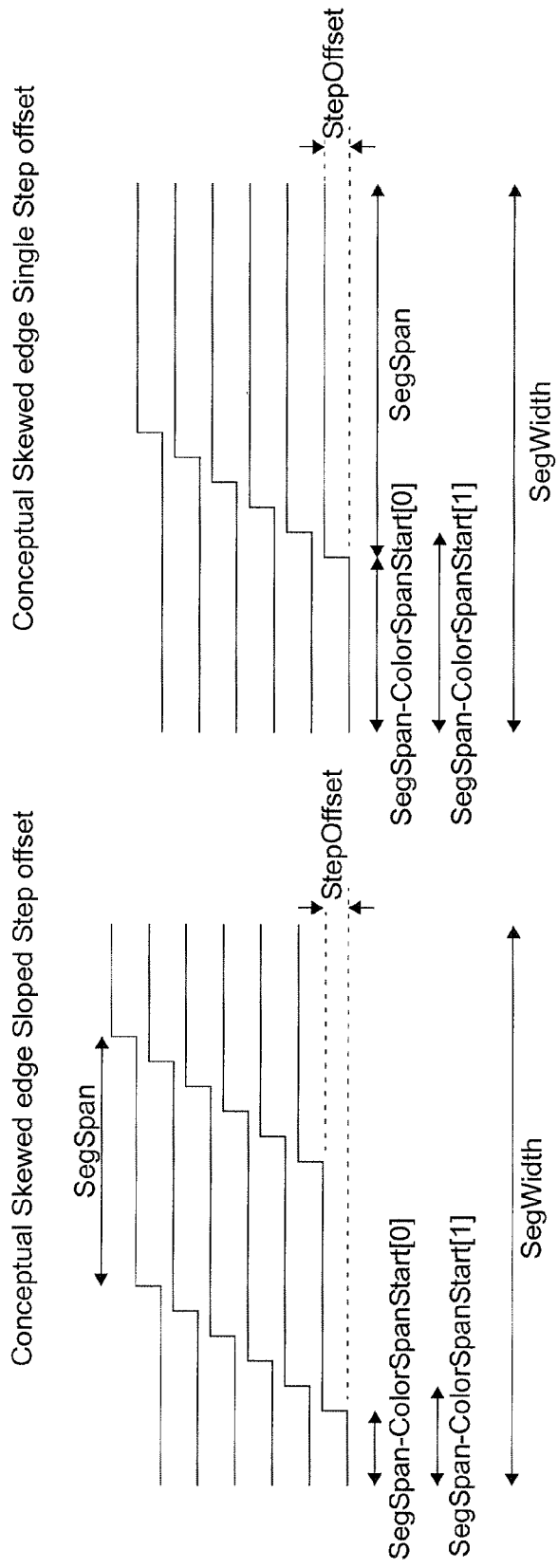

The DWU re-orders dot data into 12 separate dot data line FIFOs in the DRAM. Each FIFO corresponds to 6 colors of odd and even data. The LLU reads the dot data line FIFOs and sends the data to the printhead interface. The LLU decides when data should be read from the dot data line FIFOs to correspond with the time that the particular nozzle on the printhead is passing the current line. The interaction of the DWU and LLU with the dot line FIFOs compensates for the physical spread of nozzles firing over several lines at once. FIG. 27 shows the physical relationship between nozzle rows and the line time the LLU starts reading from the dot line store. A printhead is constructed from printhead segments. One A4 printhead can be constructed from up to 11 printhead segments. A single LLU needs to be capable of driving up to 11 printhead segments, although it may be required to drive less. The LLU will read this data out of FIFOs written by the DWU, one FIFO per half-color.

The PHI needs to send data out over 6 data lines, each data line may be connected to up to two segments. When printing A4 portrait, there will be 11 segments. This means five of the data lines will have two segments connected and one will have a single segment connected (any printhead channel could have a single segment connected). In a dual SoPEC system, one of the SoPECs will be connected to 5 segments, while the other is connected to 6 segments.

Focusing for a moment on the single SoPEC case, SoPEC maintains a data generation rate of 6 bits per cycle throughout the data calculation path. If all 6 data lines broadcast for the entire duration of a line, then each would need to sustain 1 bit per cycle to match SoPECs internal processing rate. However, since there are 11 segments and 6 data lines, one of the lines has only a single segment attached. This data line receives only half as much data during each print line as the other data lines. So if the broadcast rate on a line is 1 bit per cycle, then we can only output at a sustained rate of 5.5 bits per cycle, thus not matching the internal generation rate. These lines therefore need an output rate of at least 6/5.5 bits per cycle.

Due to clock generation limitations in SoPEC the PHI datalines can transport data at 6/5 bits per cycle, slightly faster than required.

While the data line bandwidth is slightly more than is needed, the bandwidth needed is still slightly over 1 bit per cycle, and the LLU data generators that prepare data for them must produce data at over 1 bit per cycle. To this end the LLU will target generating data at 2 bits per cycle for each data line.

The LLU will have 6 data generators. Each data generator will produce the data for either a single segment, or for 2 segments. In cases where a generator is servicing multiple segments the data for one entire segment is generated first before the next segments data is generated. Each data generator will have a basic data production rate of 2 bits per cycle, as discussed above. The data generators need to cater to variable segment width. The data generators will also need to cater for the full range of printhead designs currently considered plausible. Dot data is generated and sent in increasing order.

The generators need to be able to cope with segments being vertically offset. This could be due to poor placement and assembly techniques, or due to each printhead segment being placed slightly above or below the previous printhead segment.

They need to be able to cope with the segments being placed at mild slopes. The slopes being discussed and planned for are of the order of 5-10 lines across the width of the printhead (termed Sloped Step).

It is necessary to cope with printhead segments that have a single internal step of 3-10 lines thus avoiding the need for continuous slope. Note the term step is used to denote when the LLU changes the dot line it is reading from in the dot line store. To solve this we will reuse the mild sloping facility, but allow the distance stepped back to be arbitrary, thus it would be several steps of one line in most mild sloping arrangements and one step of several lines in a single step printhead. SoPEC should cope with a broad range of printhead sizes. It is likely that the printheads used will be 1280 dots across. Note this is 640 dots/nozzles per half color.

It is also necessary that the LLU be able to cope with a single internal step, where the step position varies per nozzle row within a segment rather than per segment (termed Single Step).

The LLU can compensate for either a Sloped Step or Single Step, and must compensate all segments in the printhead with the same manner.

Due to construction limitations of the linking printhead it is possible that nozzle rows may be misaligned relative to each other. Odd and even rows, and adjacent color rows may be horizontally misaligned by up to 5 dot positions relative to each other. Vertical misalignment can also occur between printhead segments used to construct the printhead. The DWU compensates for some horizontal misalignment issues, and the LLU compensates for the vertical misalignments and some horizontal misalignment.

The vertical skew between printhead segments can be different between any 2 segments. For example the vertical difference between segment A and segment B (Vertical skew AB) and between segment B and segment C (Vertical skew BC) can be different.

The LLU compensates for this by maintaining a different set of address pointers for each segment. The segment offset register (SegDRAMOffset) specifies the number of DRAM words offset from the base address for a segment. It specifies the number of DRAM words to be added to the color base address for each segment, and is the same for all odd colors and even colors within that segment. The SegDotOffset specifies the bit position within that DRAM word to start processing dots, there is one register for all even colors and one for all odd colors within that segment. The segment offset is programmed to account for a number of dot lines, and compensates for the printhead segment mis-alignment. For example in the diagram above the segment offset for printhead segment B is SegWidth+(LineLength*3) in DRAM words.

Vertical skew within a segment can take the form of either a single step of 3-10 lines, or a mild slope of 5-10 lines across the length of the printhead segment. Both types of vertical skew are compensated for by the LLU using the same mechanism, but with different programming.

Within a segment there may be a mild slope that the LLU must compensate for by reading dot data from different parts of the dot store as it produces data for a segment. Every SegSpan number of dot pairs the LLU dot generator must adjust the address pointer by StepOffset. The StepOffset is added to the address pointer but a negative offset can be achieved by setting StepOffset sufficiently large enough to wrap around the dot line store. When a dot generator reaches the end of a segment span and jumps to the new DRAM word specified by the offset, the dot pointer (pointing to the dot within a DRAM word) continues on from the same position it finished. It is possible (and likely) that the span step will not align with a segment edge. The span counter must start at a configured value (ColorSpanStart) to compensate for the mis-alignment of the span step and the segment edge.

The programming of the ColorSpanStart, StepOffset and SegSpan can be easily reprogrammed to account for the single step case.

All segments in a printhead are compensated using the same ColorSpanStart, StepOffset and SegSpan settings, no parameter can be adjusted on a per segment basis.

With each step jump not aligned to a 256-bit word boundary, data within a DRAM word will be discarded. This means that the LLU must have increased DRAM bandwidth to compensate for the bandwidth lost due to data getting discarded.

The LLU is also required to compensate for color row dependant vertical step offset. The position of the step offset is different for each color row and but the amount of the offset is the same per color row. Color dependent vertical skew will be the same for all segments in the printhead.

The color dependant step compensation mechanism is a variation of the sloped and single step mechanisms described earlier. The step offset position within a printhead segment varies per color row. The step offset position is adjusted by setting the span counter to different start values depending on the color row being processed. The step offset is defined as SegSpan−ColorSpanStart[N] where N specifies the color row to process.

In the skewed edge sloped step case it is likely the mechanism will be used to compensate for effects of the shape of the edge of the printhead segment. In the skewed edge single step case it is likely the mechanism will be used to compensate for the shape of the edge of the printhead segment and to account for the shape of the internal edge within a segment.

Figure 31:
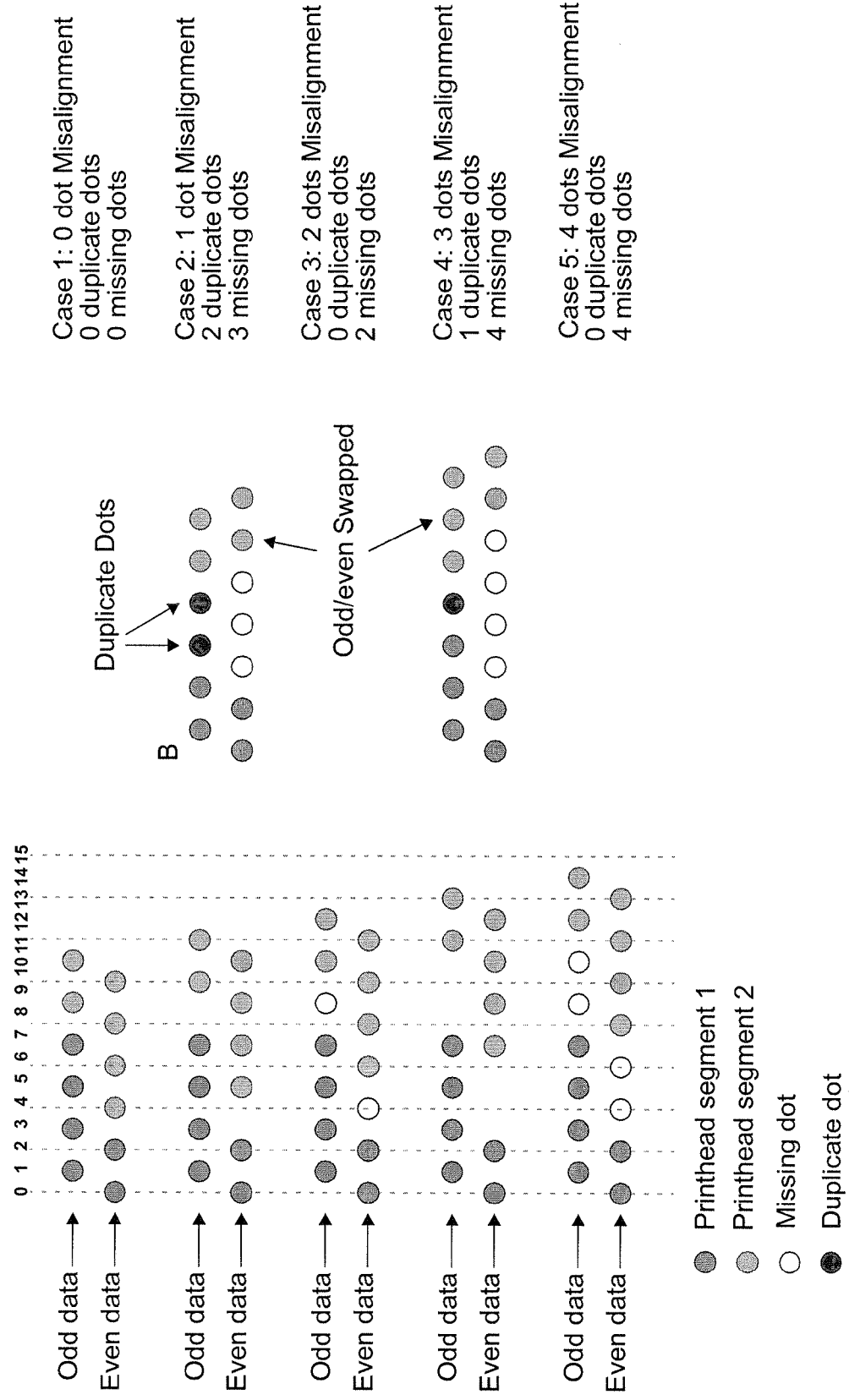

The LLU is required to compensate for horizontal misalignments between printhead segments. FIG. 31 shows possible misalignment cases.

In order for the LLU to compensate for horizontal misalignment it must deal with 3 main issues
Swap odd/even dots to even/odd nozzle rows (case 2 and 4)
Remove duplicated dots (case 2 and 4)
Read dots on a dot boundary rather than a dot pair In case 2 the second printhead segment is misaligned by one dot. To compensate for the misalignment the LLU must send odd nozzle data to the even nozzle row, and even nozzle data to the odd nozzle row in printhead segment 2. The Odd- Aligned register configures if a printhead segment should have odd/even data swapped, when set the LLU reads even dot data and transmits it to the odd nozzle row (and visa versa).

When data is swapped, nozzles in segment 2 will overlap with nozzles in segment 1 (indicated in FIG. 31), potentially causing the same dot data to be fired twice to the same position on the paper. To prevent this the LLU provides a mechanism whereby the first dots in a nozzle row in a segment are zeroed or prevented from firing. The SegStartDotRemove register configures the number of starting dots (up to a maximum of 3 dots) in a row that should be removed or zeroed out on a per segment basis. For each segment there are 2 registers one for even nozzle rows and one for odd nozzle rows.

Another consequence of nozzle row swapping, is that nozzle row data destined for printhead segment 2 is no longer aligned. Recall that the DWU compensates for a fixed horizontal skew that has no knowledge of odd/even nozzle data swapping. Notice that in Case 2*b* in FIG. 31 that odd dot data destined for the even nozzle row of printhead segment 2 must account for the 3 missing dots between the printhead segments, whereas even dot data destined for the odd nozzle row of printhead segment 2 must account for the 2 duplicate dots at the start of the nozzle row. The LLU allows for this by providing different starting offsets for odd and even nozzles rows and a per segment basis. The SegDRAMOffset and SegDotOffset registers have 12 sets of 2 registers, one set per segment, and within a set one register per odd/even nozzle row. The SegDotOffset register allows specification of dot offsets on a dot boundary.

The LLU (in conjunction with sub-line compensation in printhead segments) is required to compensate for sub-line vertical skew between printhead segments.

Figure 32:
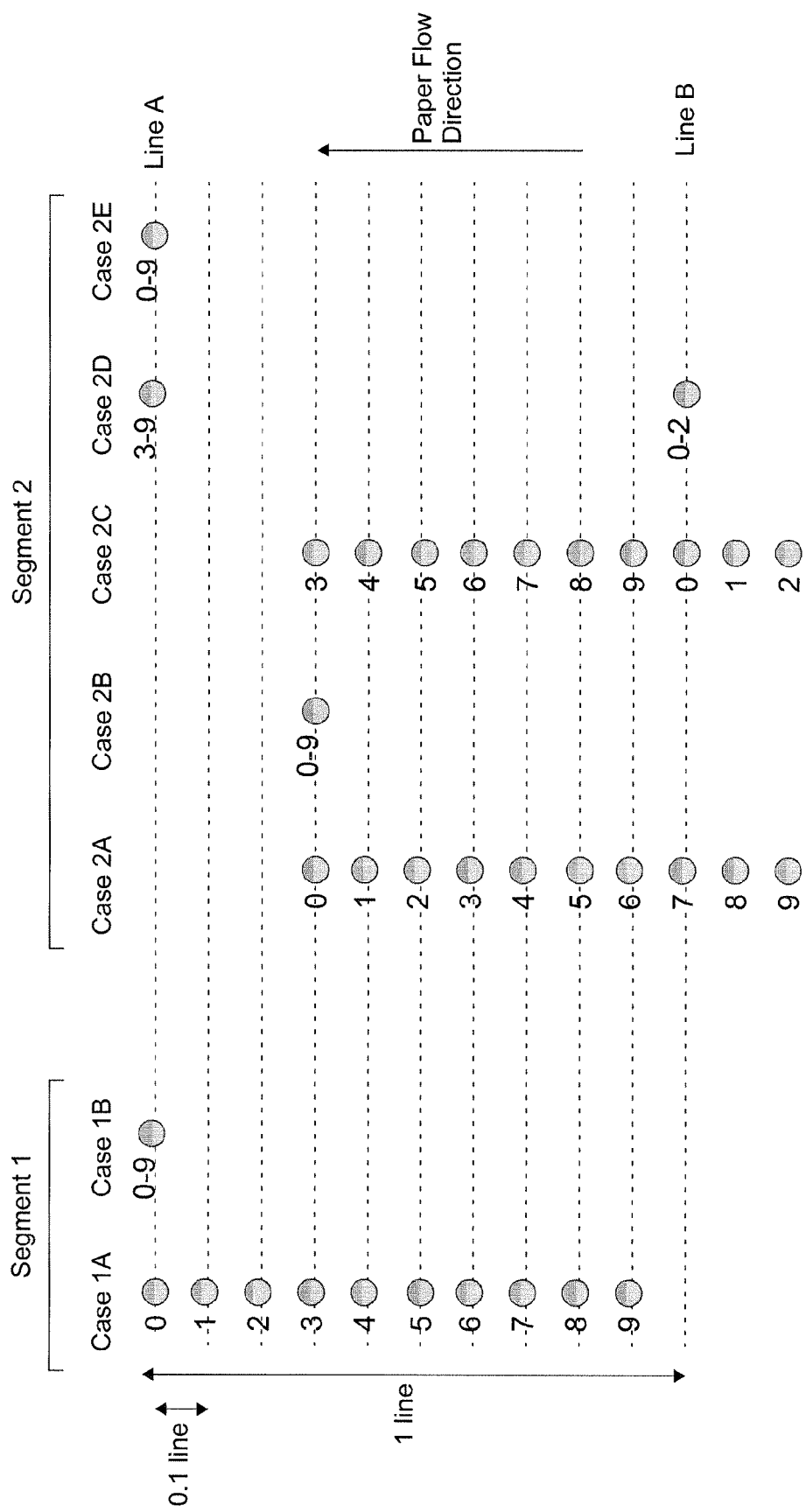
Figure 33:
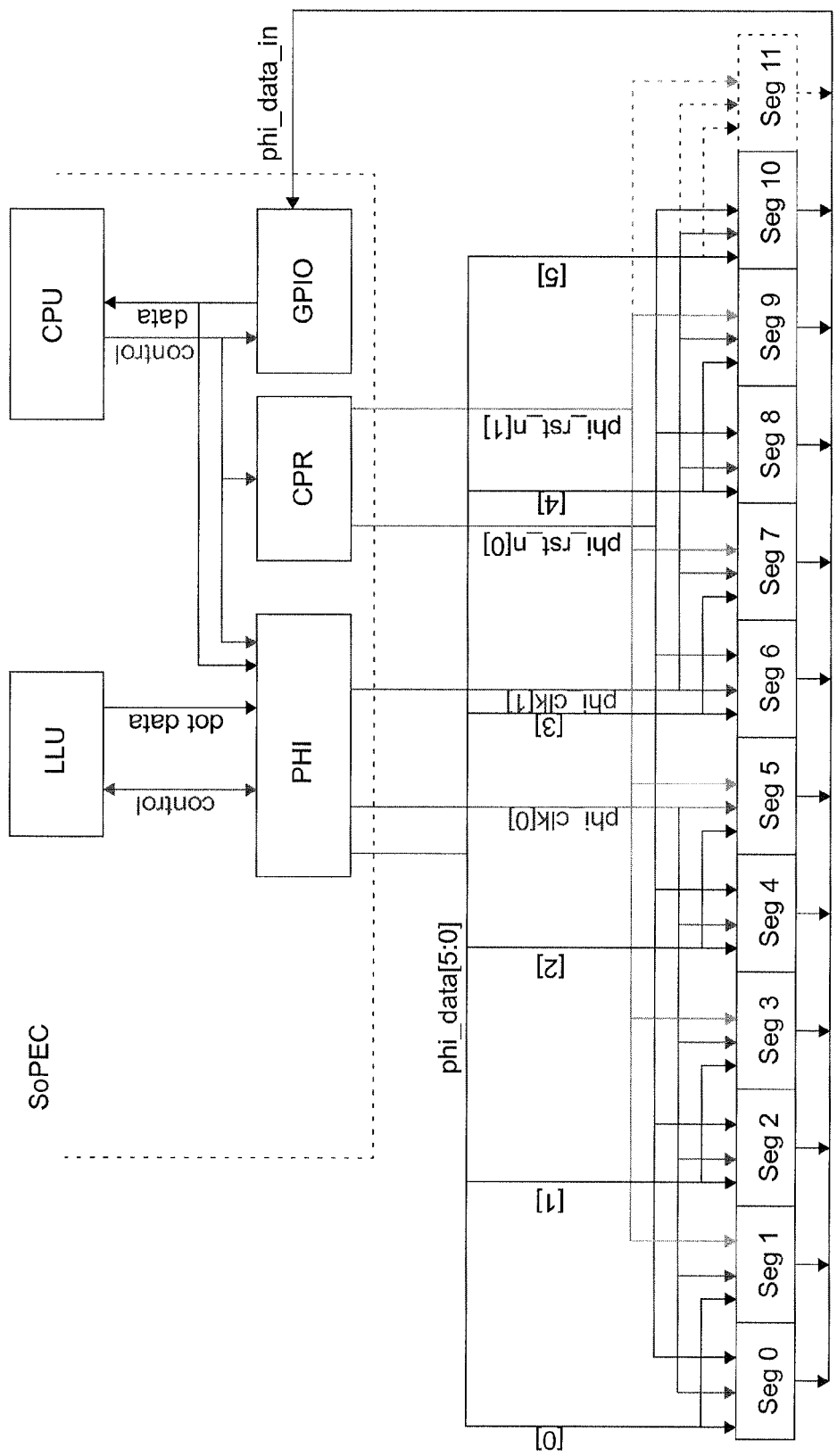
Figure 34:
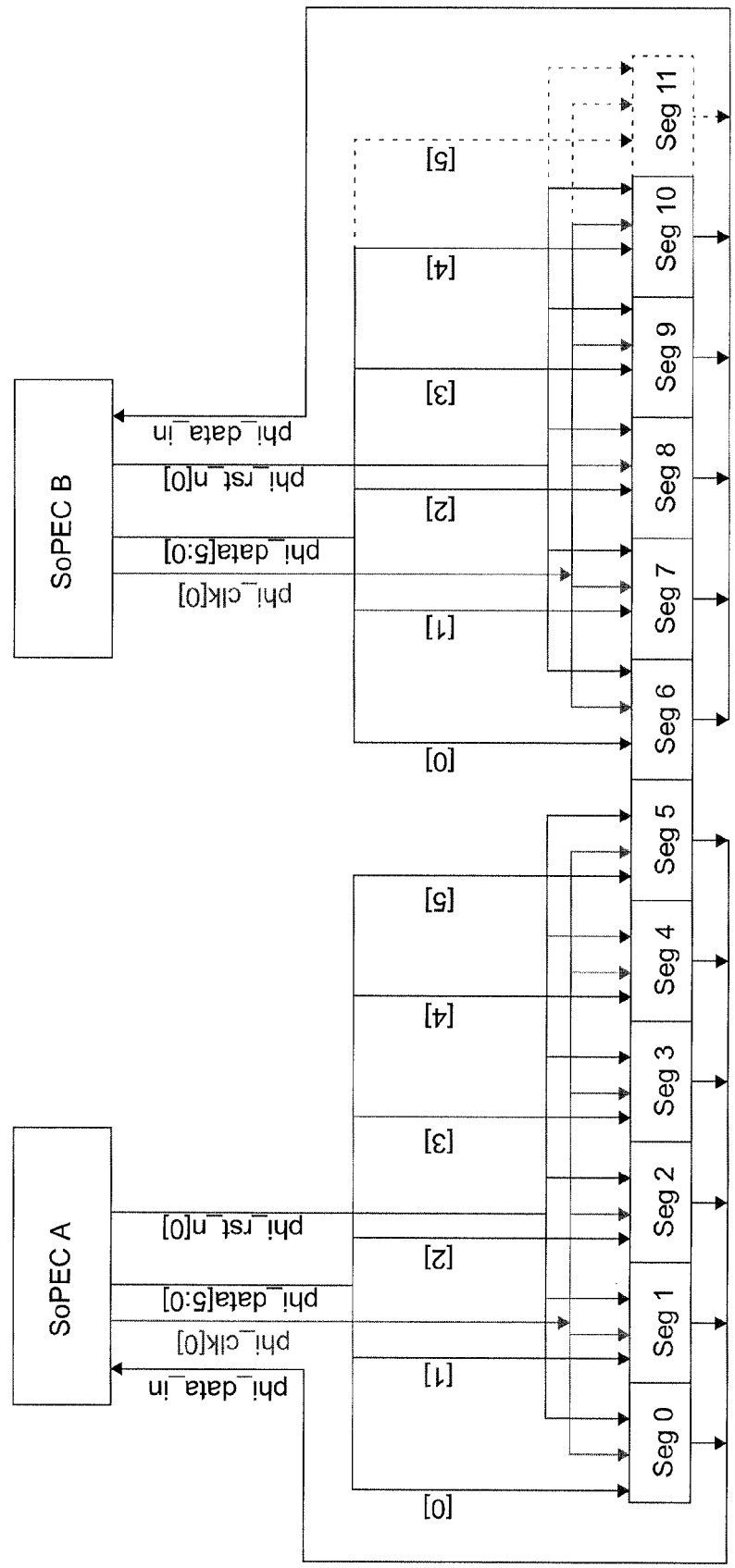
Figure 35:
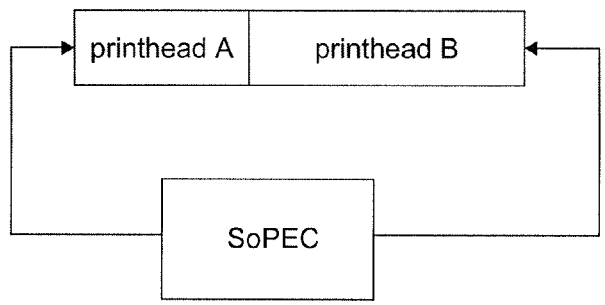
Figure 36:
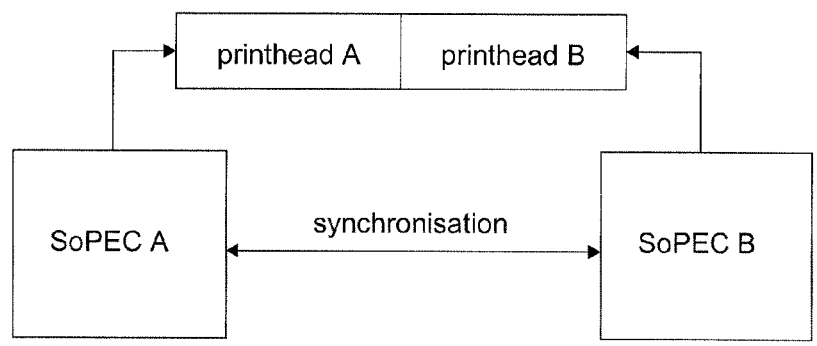
Figure 37:
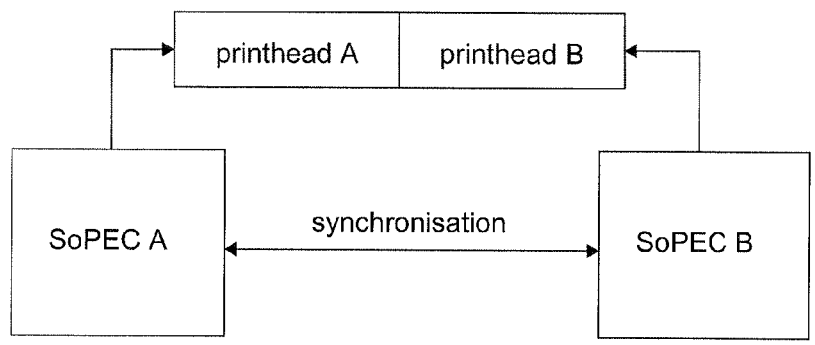
Figure 38:
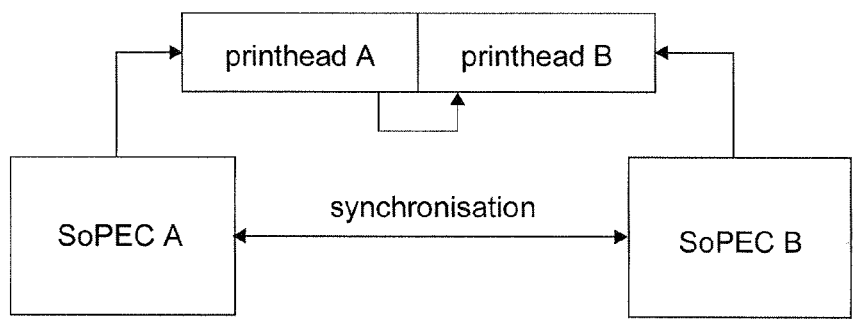
Figure 39:
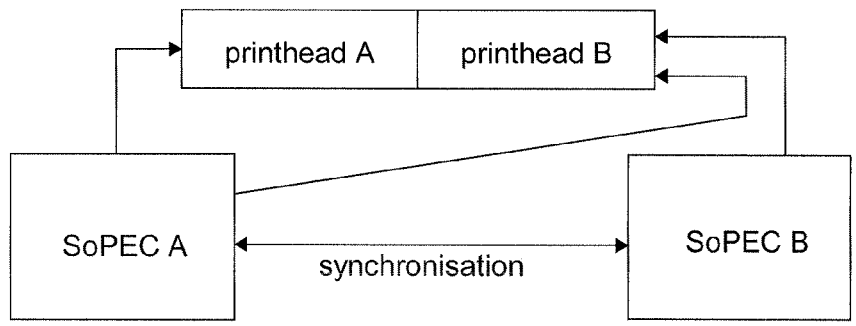
Figure 40:
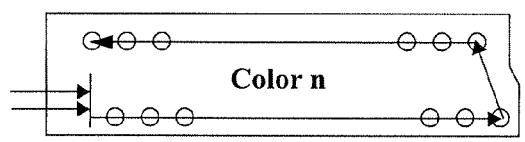
Figure 41:
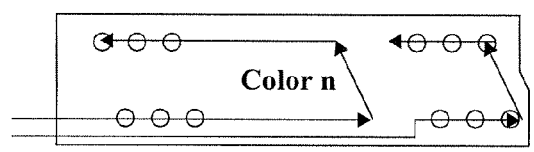
Figure 42:
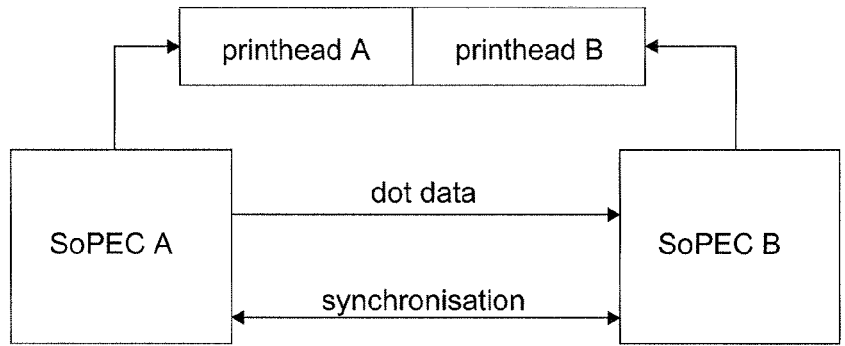
Figure 43:
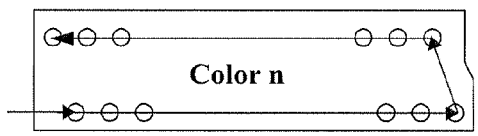
Figure 44:
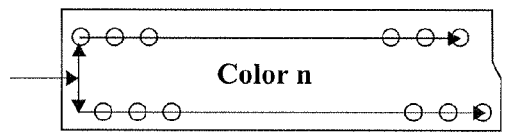
Figure 45:
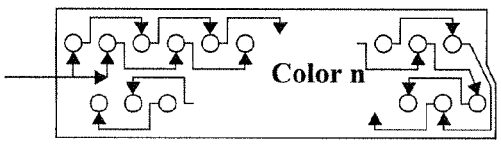

FIG. 32 shows conceptual example cases to illustrate the sub-line compensation problem.

Consider a printhead segment with 10 rows each spaced exactly 5 lines apart. The printhead segment takes 100 us to fire a complete line, 10 us per row. The paper is moving continuously while the segment is firing, so row 0 will fire on line A, row 1 will 10 us later on Line A+0.1 of a line, and so on until to row 9 which is fire 90 us later on line A+0.9 of a line (note this assumes the 5 line row spacing is already compensated for). The resultant dot spacing is shown in case 1A in FIG. 32.

If the printhead segment is constructed with a row spacing of 4.9 lines and the LLU compensates for a row spacing of 5 lines, case 1B will result with all nozzle rows firing exactly on top of each other. Row 0 will fire on line A, row 1 will fire 10 us later and the paper will have moved 0.1 line, but the row separation is 4.9 lines resulting in row 1 firing on line A exactly, (line A+4.9 lines physical row spacing−5 lines due to LLU row spacing compensation+0.1 lines due to 10 us firing delay=line A).

Consider segment 2 that is skewed relative to segment 1 by 0.3 of a line. A normal printhead segment without sub-line adjustment would print similar to case 2A. A printhead segment with sub-line compensation would print similar to case 2B, with dots from all nozzle rows landing on Line A+segment skew (in this case 0.3 of a line).

If the firing order of rows is adjusted, so instead of firing rows 0, 1, 2 . . . 9, the order is 3, 4, 5 . . . 8, 9, 0, 1, 2, and a printhead with no sub-line compensation is used a pattern similar to case 2C will result. A dot from nozzle row 3 will fire at line A+segment skew, row 4 at line A+segment skew+0.1 of a line etc. (note that the dots are now almost aligned with segment 1). If a printhead with sub-line compensation is used, a dot from nozzle row 3 will fire on line A, row 4 will fire on line A and so on to row 9, but rows 0, 1, 2 will fire on line B (as shown in case 2D). The LLU is required to compensate for normal row spacing (in this case spacing of 5 lines), it needs to also compensate on a per row basis for a further line due to sub-line compensation adjustments in the printhead. In case 2D, the firing pattern and resulting dot locations for rows 0, 1, 2 means that these rows would need to be loaded with data from the following line of a page in order to be printing the correct dot data to the correct position. When the LLU adjustments are applied and a sub-line compensating printhead segment is used a dot pattern as shown in case 2E will result, compensating for the sub-line skew between segment 1 and 2.

The LLU is configured to adjust the line spacing on a per row per segment basis by programming the SegColorRowInc registers, one register per segment, and one bit per row.

The specific sub-line placement of each row, and subsequent standard firing order is dependant on the design of the printhead in question. However, for any such firing order, a different ordering can be constructed, like in the above sample, that results in sub-line correction. And while in the example above it is the first three rows which required adjustment it might equally be the last three or even three non-contiguous rows that require different data than normal when this facility is engaged. To support this flexibly the LLU needs to be able to specify for each segment a set of rows for which the data is loaded from one line further into the page than the default programming for that half-color.

The Printhead interface (PHI) accepts dot data from the LLU and transmits the dot data to the printhead, using the printhead interface mechanism. The PHI generates the control and timing signals necessary to load and drive the printhead. A printhead is constructed from a number of printhead segments. The PHI has 6 transmission lines (printhead channel), each line is capable of driving up to 2 printhead segments, allowing a single PHI to drive up to 12 printhead segments. The PHI is capable of driving any combination of 0, 1 or 2 segments on any printhead channel.

The PHI generates control information for transmission to each printhead segment. The control information can be generated automatically by the PHI based on configured values, or can be constructed by the CPU for the PHI to insert into the data stream.

The PHI transmits data to printhead segments at a rate of 288 Mhz, over 6 LVDS data lines synchronous to 2 clocks. Both clocks are in phase with each other. In order to assist sampling of data in the printhead segments, each data line is encoded with 8b10b encoding, to minimize the maximum number of bits without a transition. Each data line requires a continuous stream of symbols, if a data line has no data to send it must insert IDLE symbols to enable the receiving printhead to remain synchronized. The data is also scrambled to reduce EMI effects due to long sequences of identical data sent to the printhead segment (i.e. IDLE symbols between lines). The descrambler also has the added benefit in the receiver of increasing the chance single bit errors will be seen multiple times. The 28-bit scrambler is self-synchronizing with a feedback polynomial of $1+x^{15}+x^{28}$.

The PHI needs to send control commands to each printhead segment as part of the normal line and page download to each printhead segment. The control commands indicate line position, color row information, fire period, line sync pulses etc. to the printhead segments.

A control command consists of one control symbol, followed by 0 or more data or control symbols. A data or control symbol is defined as a 9-bit unencoded word. A data symbol has bit 8 set to 0, the remaining 8 bits represent the data character. A control symbol has bit 8 set to 1, with the 8 remaining bits set to a limited set of other values to complete the 8b10b code set.

Each command is defined by CmdCfg[CMD_NAME] register. The command configuration register configures 2 pointers into a symbol array (currently the symbol array is 32 words, but could be extended). Bits 4:0 of the command configuration register indicate the start symbol, and bits 9:5 indicate the end symbol. Bit 10 is the empty string bit and is used to indicate that the command is empty, when set the command is ignored and no symbols are sent. When a command is transmitted to a printhead segment, the symbol pointed to by the start pointer is send first, then the start pointer+1 etc. and all symbols to the end symbol pointer. If the end symbol pointer is less than the start symbol pointer the PHI will send all symbols from start to stop wrapping at 32.

The IDLE command is configured differently to the others. It is always only one symbol in length and cannot be configured to be empty. The IDLE symbol value is defined by the IdleCmdCfg register.

The symbol array can be programmed by accessing the SymbolTable registers. Note that the symbol table can be written to at any time, but can only be read when Go is set to 0.

The PHI provides a mechanism for the CPU to send data and control words to any individual segment or to broadcast to all segments simultaneously. The CPU writes commands to the command FIFO, and the PHI accepts data from the command FIFO, and transmits the symbols to the addressed printhead segment, or broadcasts the symbols to all printhead segments.

The CPU command is of the form:

The 9-bit symbol can be a control or data word, the segment address indicates which segment the command should be sent to. Valid segment addresses are 0-11 and the broadcast address is 15. There is a direct mapping of segment addresses to printhead data lines, segment addresses 0 and 1 are sent out printhead channel 0, addresses 2 and 3 are sent out printhead channel 1, and so on to addresses 10 and 11 which are send out printhead channel 5. The end of command (EOC) flag indicates that the word is the last word of a command. In multi-word commands the segment address for the first word determines which printhead channel the command gets sent to, the segment address field in subsequent words is ignored.

The PHI operates in 2 modes, CPU command mode and data mode. A CPU command always has higher priority than the data stream (or a stream of idles) for transmission to the printhead. When there is data in the command FIFO, the PHI will change to CPU command mode as soon as possible and start transmitting the command word. If the PHI detects data in the command FIFO, and the PHI is in the process of transmitting a control word the PHI waits for the control word to complete and then switches to CPU command mode. Note that idles are not considered control words. The PHI will remain in CPU command mode until it encounters a command word with the EOC flag set and no other data in the command FIFO.

The PHI must accept data for all printhead channels from the LLU together, and transmit all data to all printhead segments together. If the CPU command FIFO wants to send data to a particular printhead segment, the PHI must stall all data channels from the LLU, and send IDLE symbols to all other print channels not addressed by the CPU command word. If the PHI enters CPU command mode and begins to transmit command words, and the command FIFO becomes empty but the PHI has not encountered an EOC flag then the PHI will continue to stall the LLU and insert IDLE symbols into the print streams. The PHI remains in CPU command mode until an EOC flag is encountered.

To prevent such stalling the command FIFO has an enable bit CmdFIFOEnable which enables the PHI reading the command FIFO. It allows the CPU to write several words to the command FIFO without the PHI beginning to read the FIFO. If the CPU disables the FIFO (setting CmdFIFOEnable to 0) and the PHI is currently in CPU command mode, the PHI will continue transmitting the CPU command until it encounters an EOC flag and will then disable the FIFO. When the PHI is switching from CPU command mode to data transfer mode, it sends a RESUME command to the printhead channel group data transfer that was interrupted. This enables each printhead to easily differentiate between control and data streams. For example if the PHI is transmitting data to printhead group B and is interrupted to transmit a CPU command, then upon return to data mode the PHI must send a RESUME_B control command. If the PHI was between pages (when Go=0) transmitting IDLE commands and was interrupted by a CPU command, it doesn't need to send any resume command before returning to transmit IDLE.

The command FIFO can be written to at any time by the CPU by writing to the CmdFifo register. The CmdFiFO register allows FIFO style access to the command FIFO. Writing to the CmdFIFO register will write data to the command FIFO address pointed to by the write pointer and will increment the write pointer. The CmdFIFO register can be read at any time but will always return the command FIFO value pointed to by the internal read pointer.

The current fill level of the CPU command FIFO can be read by accessing the CmdFIFOLevel register.

The command FIFO is 32 words×14 bits.

The PHI sends data to each printhead segment in a fixed order inserting the appropriate control command sequences into the data stream at the correct time. The PHI receives a fixed data stream from the LLU, it is the responsibility of the PHI to determine which data is destined for which line, color nozzle row and printhead segment, and to insert the correct command sequences.

The SegWidth register specifies the number of dot pairs per half color nozzle row. To avoid padding to the nearest 8 bits (data symbol input amount) the SegWidth must be programmed to a multiple of 8.

The MaxColor register specifies the number of half nozzle rows per printhead segment.

The MaxSegment specifies the maximum number segments per printhead channel. If MaxSegment is set to 0 then all enabled channels will generate a data stream for one segment only. If MaxSegment is set to 1 then all enabled channels will generate data for 2 segments. The LLU will generate null data for any missing printhead segments.

The PageLenLine register specifies the number of lines of data to accept from the LLU and transfer to the printhead before setting the page finished flag (PhiPageFinish) in the PhiStatus register.

Printhead segments are divided into 2 groups, group A segments are 0, 2, 4, 6, 8, 10 and group B segments are 1, 3, 5, 7, 9, 11. For any printhead channel, group A segment data is transmitted first then group B.

Each time a line sync is received from the GPIO, the PHI sends a line of data and a fire (FIRE) command to all printhead segments.

The PHI first sends a next color command (NC_A) for the first half color nozzle row followed by nozzle data for the first half color dots. The number of dots transmitted (and accepted from the LLU) is configured by SegWidth register. The PHI then sends a next color command indicating to the printhead to reconfigure to accept the next color nozzle data. The PHI then sends the next half color dots. The process is repeated for MaxColor number of half nozzle rows. After all dots for a particular segment are transmitted, the PHI sends a next color B (NC_B) command to indicate to the group B printheads to prepare to accept nozzle row data. The command and data sequence is repeated as before. The line transmission to the printhead is completed with the transmission of a FIRE command.

The PHI can optionally insert a number of IDLE symbols before each next color command. The number of IDLE symbols inserted is configured by the IdleInsert register. If it's set to zero no symbols will be inserted.

When a line is complete, the PHI decrements the PageLenLine counter, and waits for the next line sync pulse from the GPIO before beginning the next line of data.

The PHI continues sending line data until the PageLenLine counter is 0 indicating the last line. When the last line is transmitted to the printhead segments, the PHI sets a page finished flag (PhiPageFinish) in the PhiStatus register. The PHI will then wait until the Go bit is toggled before sending the next page to the printhead.

Before starting printing SoPEC must configure the printhead segments. If there is more than one printhead segment on a printline, the printhead segments must be assigned a unique ID per print line. The IDs are assigned by holding one group of segments in reset while the other group is programmed by a CPU command stream issued through the PHI. The PHI does not directly control the printhead reset lines. They are connected to CPR block output pins and are controlled by the CPU through the CPR.

The printhead also provides a mechanism for reading data back from each individual printhead segment. All printhead segments use a common data back channel, so only one printhead segment can send data at a time. SoPEC issues a CPU command stream directed at a particular printhead segment, which causes the segment to return data on the back channel. The back channel is connected to a GPIO input, and is sampled by the CPU through the GPIO.

If SoPEC is being used in a multi-SoPEC printing system, it is possible that not all print channels, or clock outputs are being used. Any unused data outputs can be disabled by programming the PhiDataEnable register, or unused clock outputs disabled by programming the PhiClkEnable.

The CPU when enabling or disabling the clock or data outputs must ensure that the printhead segments they are connected to are held in a benign state while toggling the enable status of the output pins.

Figure 46:
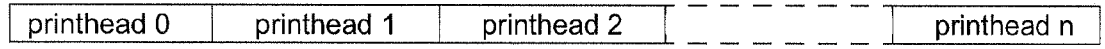

The basic idea of the linking printhead is that we create a printhead from tiles each of which can be fully formed within the reticle. The printheads are linked together as shown in FIG. 46 to form the page-width printhead. For example, an A4/Letter page is assembled from 11 tiles.

The printhead is assembled by linking or butting up tiles next to each other. The physical process used for linking means that wide-format printheads are not readily fabricated (unlike the 21 mm tile). However printers up to around A3 portrait width (12 inches) are expected to be possible.

The nozzles within a single segment are grouped physically to reduce ink supply complexity and wiring complexity. They are also grouped logically to minimize power consumption and to enable a variety of printing speeds, thereby allowing speed/power consumption trade-offs to be made in different product configurations.

Each printhead segment contains a constant number of nozzles per color (currently 1280), divided into half (640) even dots and half (640) odd dots. If all of the nozzles for a single color were fired at simultaneously, the even and odd dots would be printed on different dot-rows of the page such that the spatial difference between any even/odd dot-pair is an exact number of dot lines. In addition, the distance between a dot from one color and the corresponding dot from the next color is also an exact number of dot lines.

The exact distance between even and odd nozzle rows, and between colors will vary between embodiments, so it is preferred that these relationships be programmable with respect to SoPEC.

Figure 47:
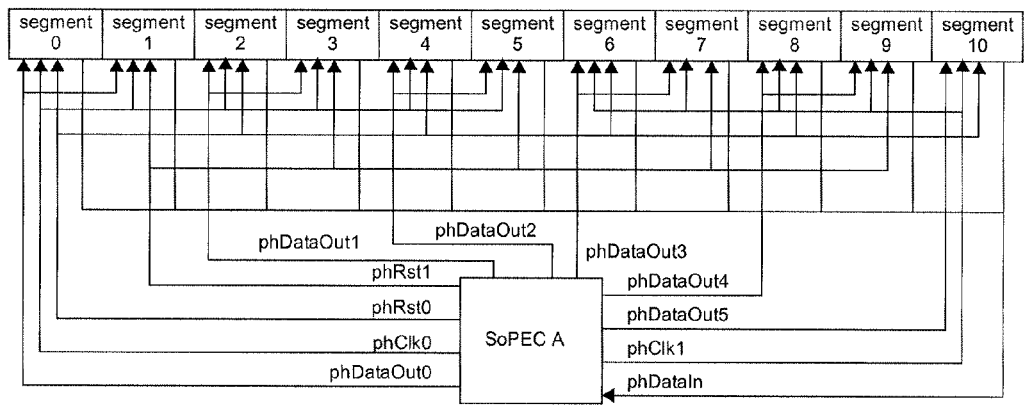

When 11 segments are joined together to create a 30 ppm printhead, a single SoPEC will connect to them as shown in FIG. 47 below.

Notice that each phDataOutn lvds pair goes to two adjacent printhead segments, and that each phClkn signal goes to 5 or 6 printhead segments. Each phRstn signal goes to alternate printhead segments.

SoPEC drives phRst0 and phRst1 to put all the segments into reset.

SoPEC then lets phRst1 come out of reset, which means that all the segment 1, 3, 5, 7, and 9 are now alive and are capable of receiving commands.

SoPEC can then communicate with segment 1 by sending commands down phDataOut0, and program the segment 1 to be id 1. It can communicate with segment 3 by sending commands down phDataOut1, and program segment 3 to be id 1. This process is repeated until all segments 1, 3, 5, 7, and 9 are assigned ids of 1. The id only needs to be unique per segment addressed by a given phDataOutn line.

SoPEC can then let phRst0 come out of reset, which means that segments 0, 2, 4, 6, 8, and 10 are all alive and are capable of receiving commands. The default id after reset is 0, so now each of the segments is capable of receiving commands along the same pDataOutn line.

SoPEC needs to be able to send commands to individual printheads, and it does so by writing to particular registers at particular addresses.

The exact relationship between id and register address etc. is yet to be determined, but at the very least it will involve the CPU being capable of telling the PHI to send a command byte sequence down a particular phDataOutn line.

One possibility is that one register contains the id (possibly 2 bits of id). Further, a command may consist of: register write; register address; and data. A 10-bit wide fifo can be used for commands in the PHI.

Figure 48:
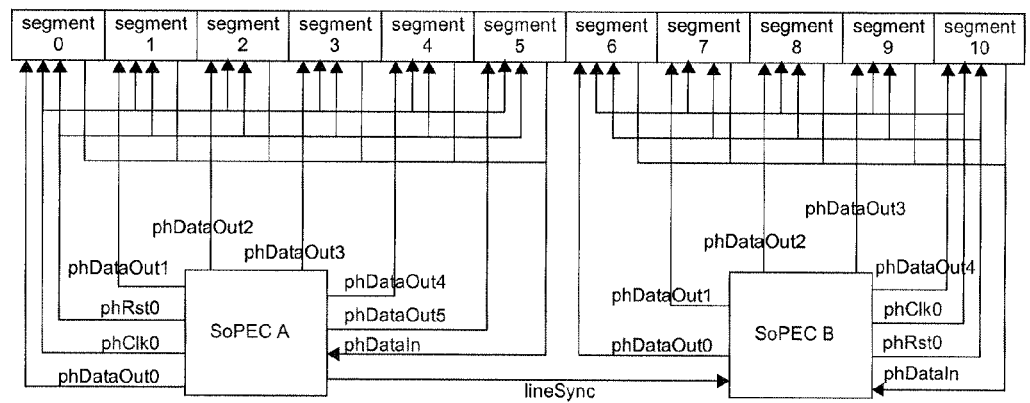

When 11 segments are joined together to create a 60 ppm printhead, the 2 SoPECs will connect to them as shown in FIG. 48.

In the 60 ppm case only phClk0 and phRst0 are used (phClk1 and phRst1 are not required). However note that lineSync is required instead. It is possible therefore to reuse phRst1 as a lineSync signal for multi-SoPEC synchronisation. It is not possible to reuse the pins from phClk1 as they are lvds. It should be possible to disable the lvds pads of phClk1 on both SoPECs and phDataOut5 on SoPEC B and therefore save a small amount of power.

Various classes of printhead that can be used are described below. With the exception of the PEC1 style slope printhead, SoPEC is designed to be capable of working with each of these printhead types at full 60 ppm printing speed.

A-Chip/A-Chip

This printhead style consists of identical printhead tiles (type A) assembled in such a way that rows of nozzles between 2 adjacent chips have no vertical misalignment.

Figure 49:
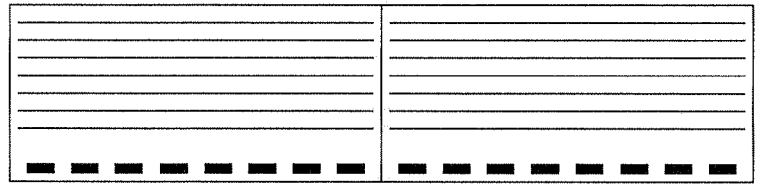

The most ideal format for this kind of printhead from a data delivery point of view is a rectangular join between two adjacent printheads, as shown in FIG. 49. However due to the requirement for dots to be overlapping, a rectangular join results in a it results in a vertical stripe of white down the join section since no nozzle can be in this join region. A white stripe is not acceptable, and therefore this join type is not acceptable.

Figure 50:
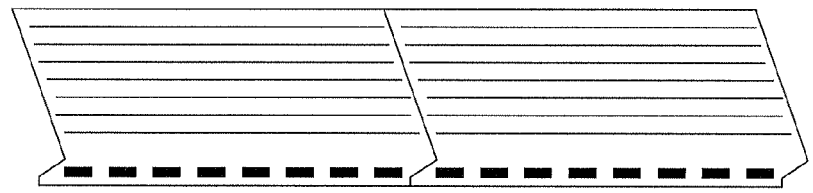
Figure 51:
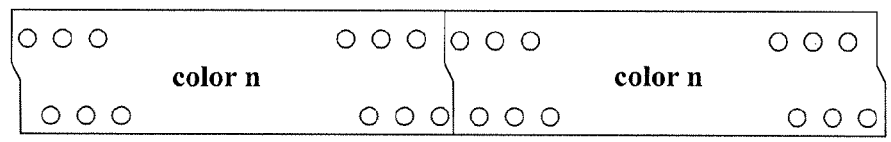

FIG. 50 shows a sloping join similar to that described for the bi-lithic printhead chip, and FIG. 51 is a zoom in of a single color component, illustrating the way in which there is no visible join from a printing point of view (i.e. the problem seen in FIG. 50 has been solved).

A-Chip/A-Chip Growing Offset

Figure 52:
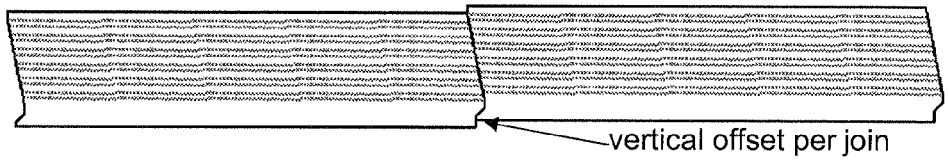

The A-chip/A-chip setup requires perfect vertical alignment. Due to a variety of factors (including ink sealing) it may not be possible to have perfect vertical alignment. To create more space between the nozzles, A-chips can be joined with a growing vertical offset, as shown in FIG. 52.

The growing offset comes from the vertical offset between two adjacent tiles. This offset increases with each join. For example, if the offset were 7 lines per join, then an 11 segment printhead would have a total of 10 joins, and 70 lines.

To supply print data to the printhead for a growing offset arrangement, the print data for the relevant lines must be present. A simplistic solution of simply holding the entire line of data for each additional line required leads to increased line store requirements. For example, an 11 segment×1280-dot printhead requires an additional 11×1280-dots×6-colors per line i.e. 10.3125 Kbytes per line. 70 lines requires 722 Kbytes of additional storage. Considering SoPEC contains only 2.5 MB total storage, an additional 722 Kbytes just for the offset component is not desirable. Smarter solutions require storage of smaller parts of the line, but the net effect is the same: increased storage requirements to cope with the growing vertical offset.

A-Chip/A-Chip Aligned Nozzles, Sloped Chip Placement

The problem of a growing offset is that a number of additional lines of storage need to be kept, and this number increases proportional to the number of joins i.e. the longer the printhead the more lines of storage are required.

However, we can place each chip on a mild slope to achieve a constant number of printlines regardless of the number of joins. The arrangement is similar to that used in PEC1, where the printheads are sloping. The difference here is that each printhead is only mildly sloping, for example so that the total number of lines gained over the length of the printhead is 7. The next printhead can then be placed offset from the first, but this offset would be from the same base. i.e. a printhead line of nozzles starts addressing line n, but moves to different lines such that by the end of the line of nozzles, the dots are 7 dotlines distant from the startline. This means that the 7-line offset required by a growing-offset printhead can be accommodated.

Figure 53:
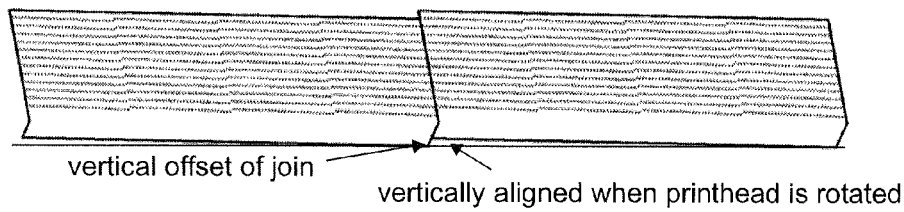

The arrangement is shown in FIG. 53.

If the offset were 7 rows, then a total of 72.2 KBytes are required to hold the extra rows, which is a considerable saving over the 722 Kbytes.

Note also, that in this example, the printhead segments are vertically aligned (as in PEC1). It may be that the slope can only be a particular amount, and that growing offset compensates for additional differences—i.e. the segments could in theory be misaligned vertically. In general SoPEC must be able to cope with vertically misaligned printhead segments.

The question then arises as to how much slope must be compensated for at 60 ppm speed.

Basically—as much as can comfortably handled without too much logic. However, amounts like 1 in 256 (i.e. 1 in 128 with respect to a half color), or 1 in 128 (i.e. 1 in 64 with respect to a half color) must be possible. Greater slopes and weirder slopes (e.g. 1 in 129 with respect to a half color) must be possible, but with a sacrifice of speed i.e. SoPEC must be capable even if it is a slower print.

Note also that the nozzles are aligned, but the chip is placed sloped. This means that when horizontal lines are attempted to be printed and if all nozzles were fired at once, the effect would be lots of sloped lines. However, if the nozzles are fired in the correct order relative to the paper movement, the result is a straight line for n dots, then another straight line for n dots 1 line up.

PEC1 Style Slope

This is the physical arrangement used by printhead segments addressed by PEC1. Note that SoPEC is not expected to work at 60 ppm speed with printheads connected in this way. However it is expected to work and is shown here for completeness, and if tests should prove that there is no working alternative to the 21 mm tile, then SoPEC will require significant reworking to accommodate this arrangement at 60 ppm.

Figure 54:
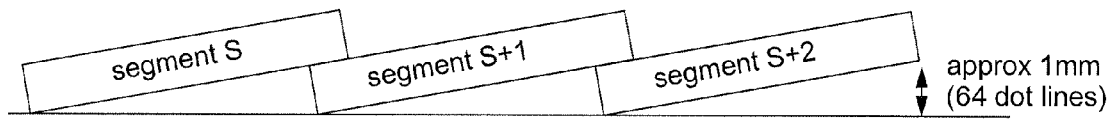

In this scheme, the segments are joined together by being placed on an angle such that the segments fit under each other, as shown in FIG. 54. The exact angle will depend on the width of the Memjet segment and the amount of overlap desired, but the vertical height is expected to be in the order of 1 mm, which equates to 64 dot lines at 1600 dpi.

Figure 55:
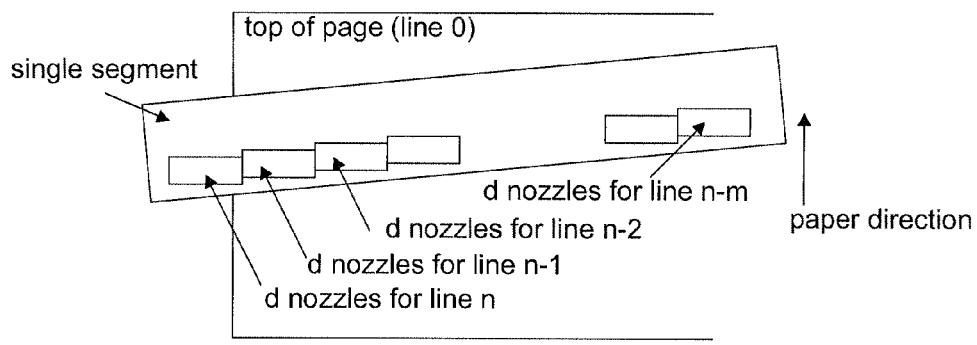

FIG. 55 shows more detail of a single segment in a multi-segment configuration, considering only a single row of nozzles for a single color plane. Each of the segments can be considered to produce dots for multiple sets of lines. The leftmost d nozzles (d depends on the angle that the segment is placed at) produce dots for line n, the next d nozzles produce dots for line n−1, and so on.

A-Chip/A-Chip with Inter-Line Slope Compensation

Here the nozzles are physically arranged inside the printhead to compensate for the nozzle firing order given the desire to spread the power across the printhead. This means that one nozzle and its neighbor can be vertically separated on the printhead by 1 printline. i.e. the nozzles don't line up across the printhead. This means a jagged effect on printed "horizontal lines" is avoided, while achieving the goal of averaging the power.

Figure 56:

The arrangement of printheads is the same as that shown in FIG. 53. However the actual nozzles are slightly differently arranged, as illustrated via magnification in FIG. 56.

A-Chip/B-Chip

Another possibility is to have two kinds of printing chips: an A-type and a B-type. The two types of chips have different shapes, but can be joined together to form long printheads. A parallelogram is formed when the A-type and B-type are joined.

Figure 57:

The two types are joined together as shown in FIG. 57.

Figure 58:

Note that this is not a growing offset. The segments of a multiple-segment printhead have alternating fixed vertical offset from a common point, as shown in FIG. 58.

If the vertical offset from a type-A to a type-B printhead were n lines, the entire printhead regardless of length would have a total of n lines additionally required in the line store. This is certainly a better proposition than a growing offset).

However there are many issues associated with an A-chip/B-chip printhead. Firstly, there are two different chips i.e. an A-chip, and a B-chip. This means 2 masks, 2 developments, verification, and different handling, sources etc. It also means that the shape of the joins are different for each printhead segment, and this can also imply different numbers of nozzles in each printhead. Generally this is not a good option.

A-B Chip with SoPEC Compensation

The general linking concept illustrated in the A-chip/B-chip can be incorporated into a single printhead chip that contains the A-B join within the single chip type.

Figure 59:

This kind of joining mechanism is referred to as the A-B chip since it is a single chip with A and B characteristics. The two types are joined together as shown in FIG. 59.

This has the advantage of the single chip for manipulation purposes.

Note that as with the A-chip/B-chip, SoPEC must compensate for the vertical misalignment within the printhead. The amount of misalignment is the amount of additional line storage required.

Note that this kind of printhead can effectively be considered similar to the mildly sloping printhead except that the step at the discontinuity is likely to be many lines vertically (on the order of 7 or so) rather than the 1 line that a gentle slope would generate.

A-B Chip with Printhead Compensation

Figure 60:
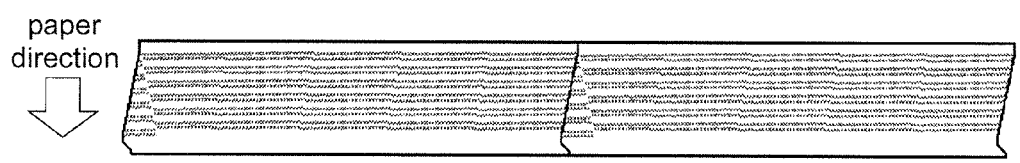
Figure 61:
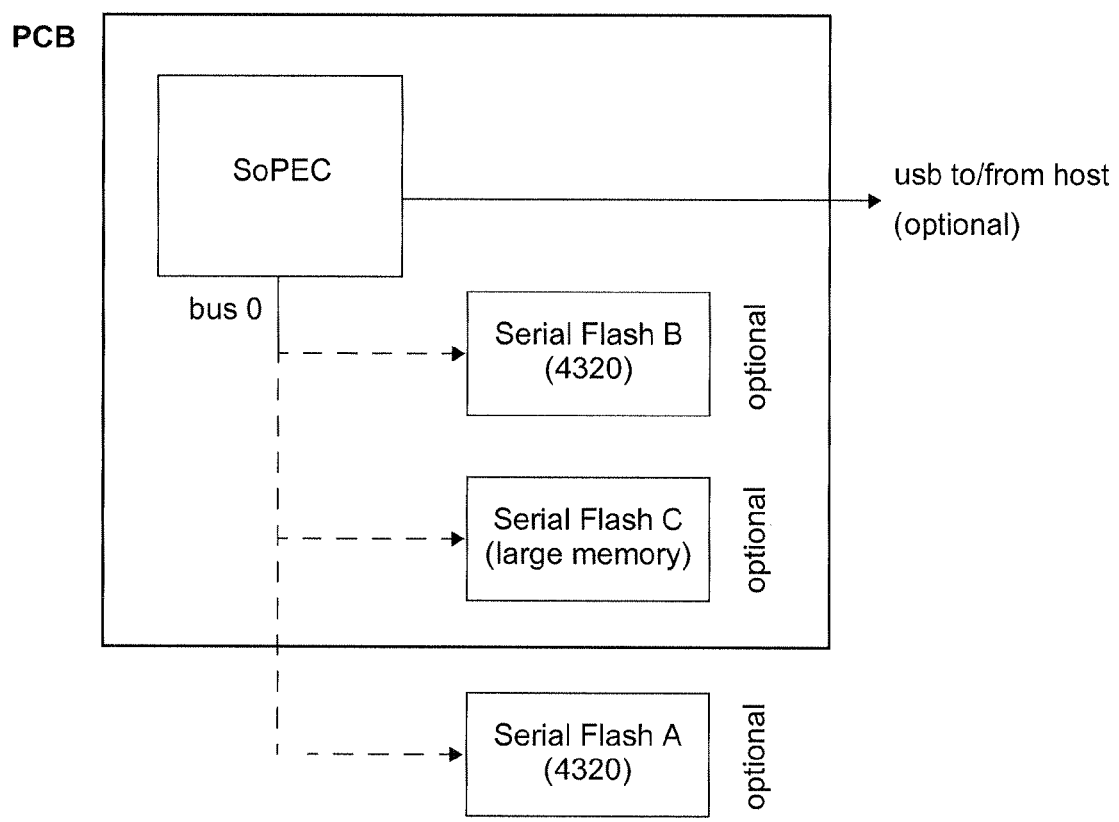
Figure 62:
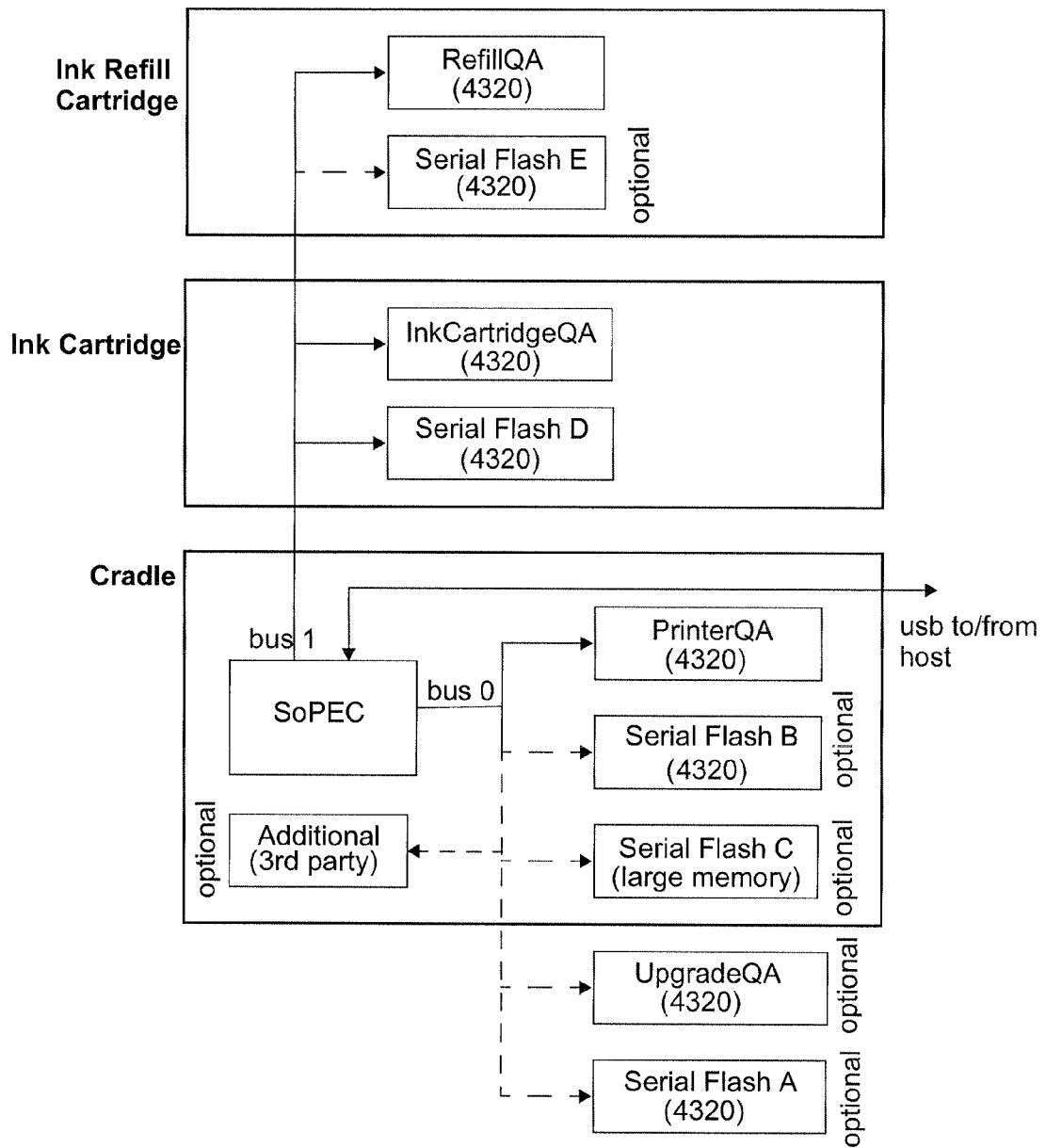
Figure 63:
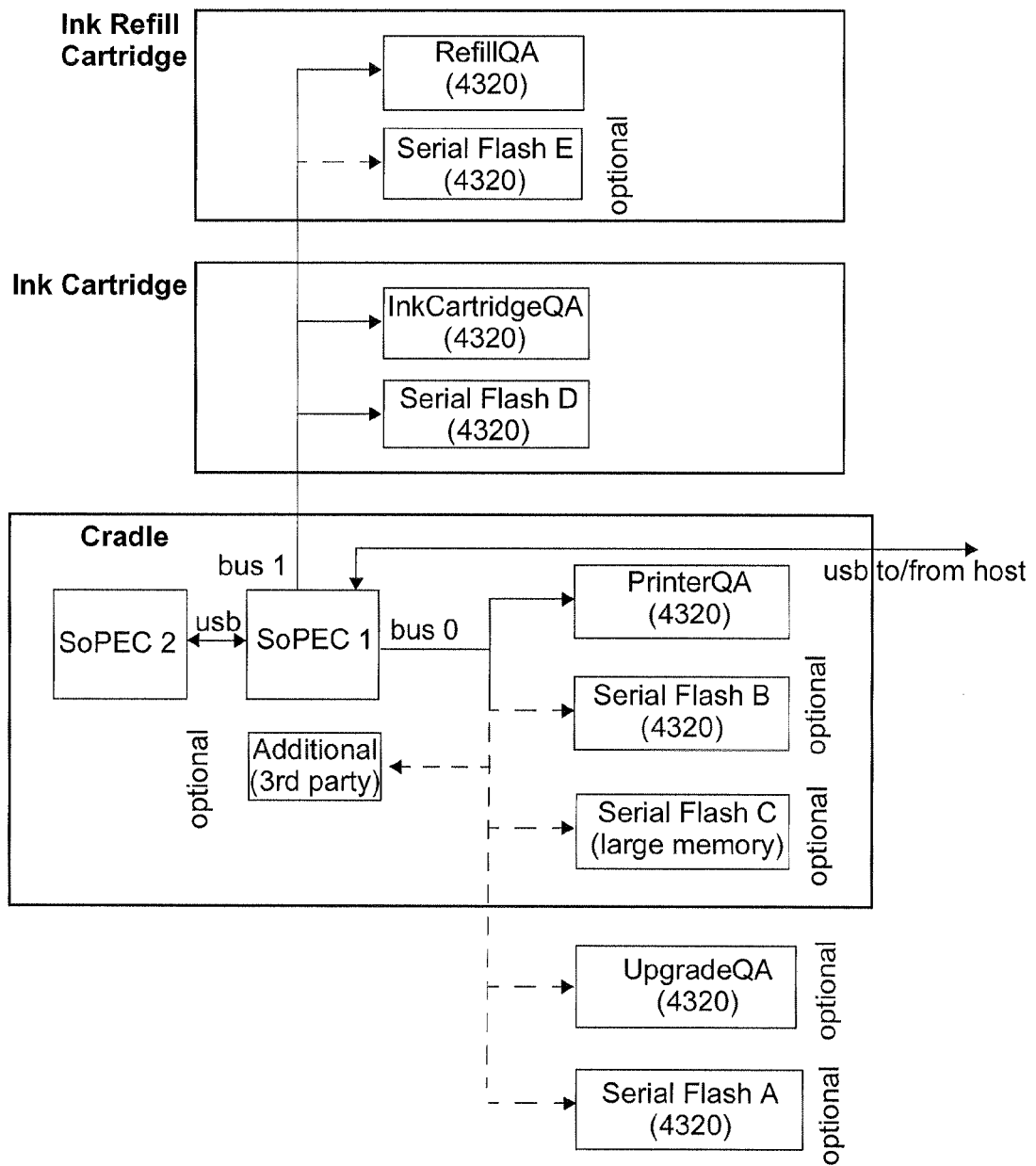
Figure 64:
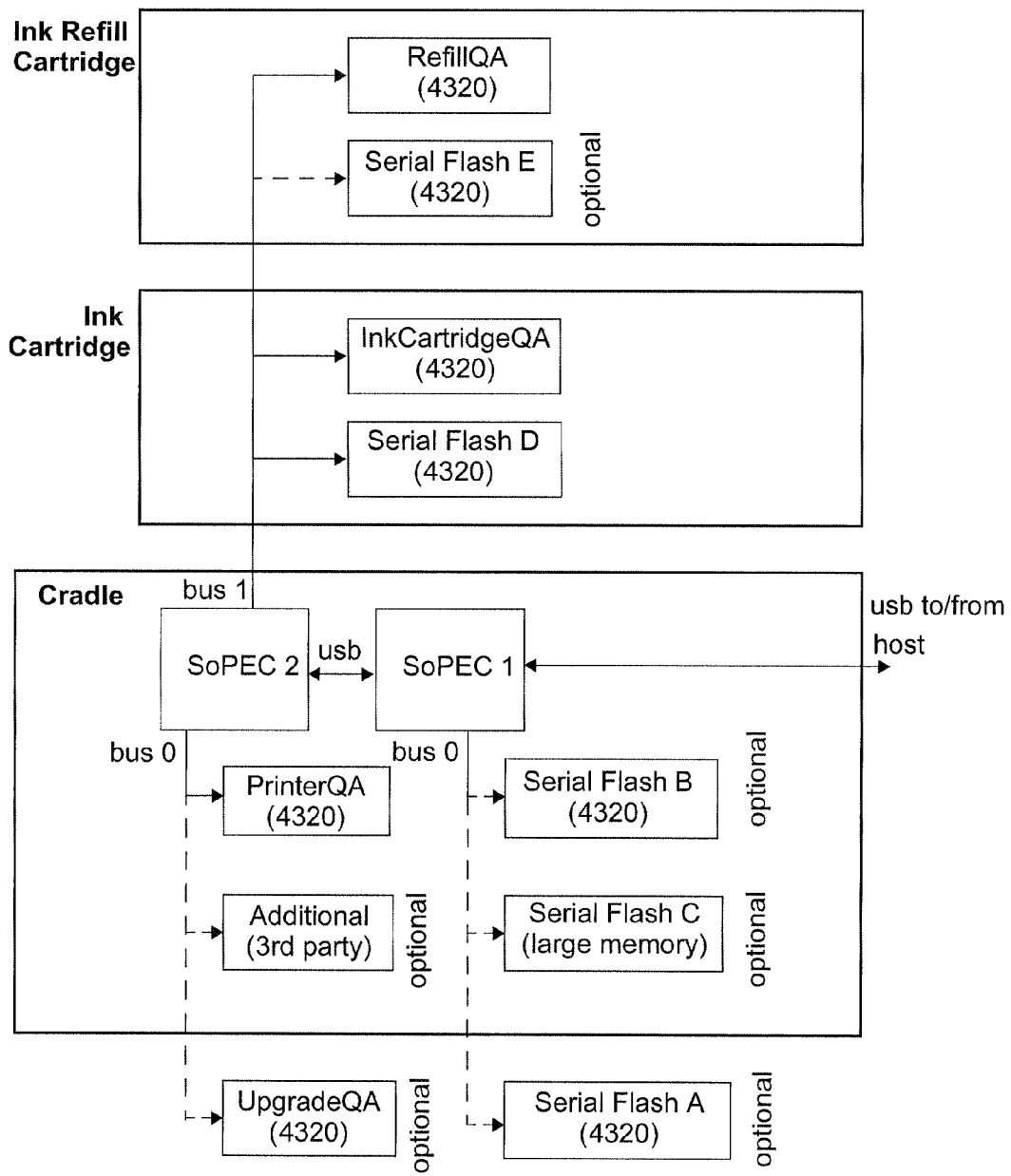
Figure 65:
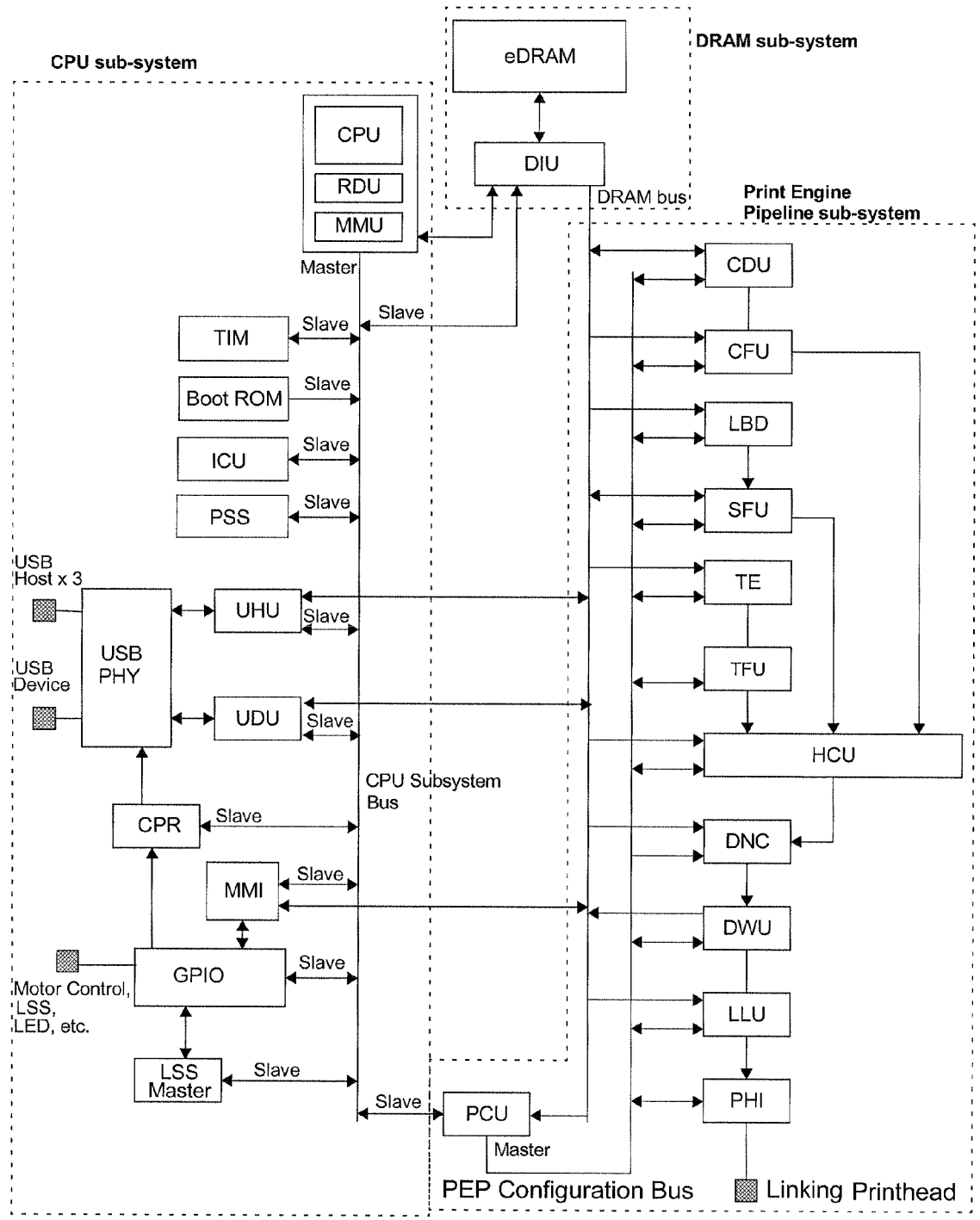
Figure 66:
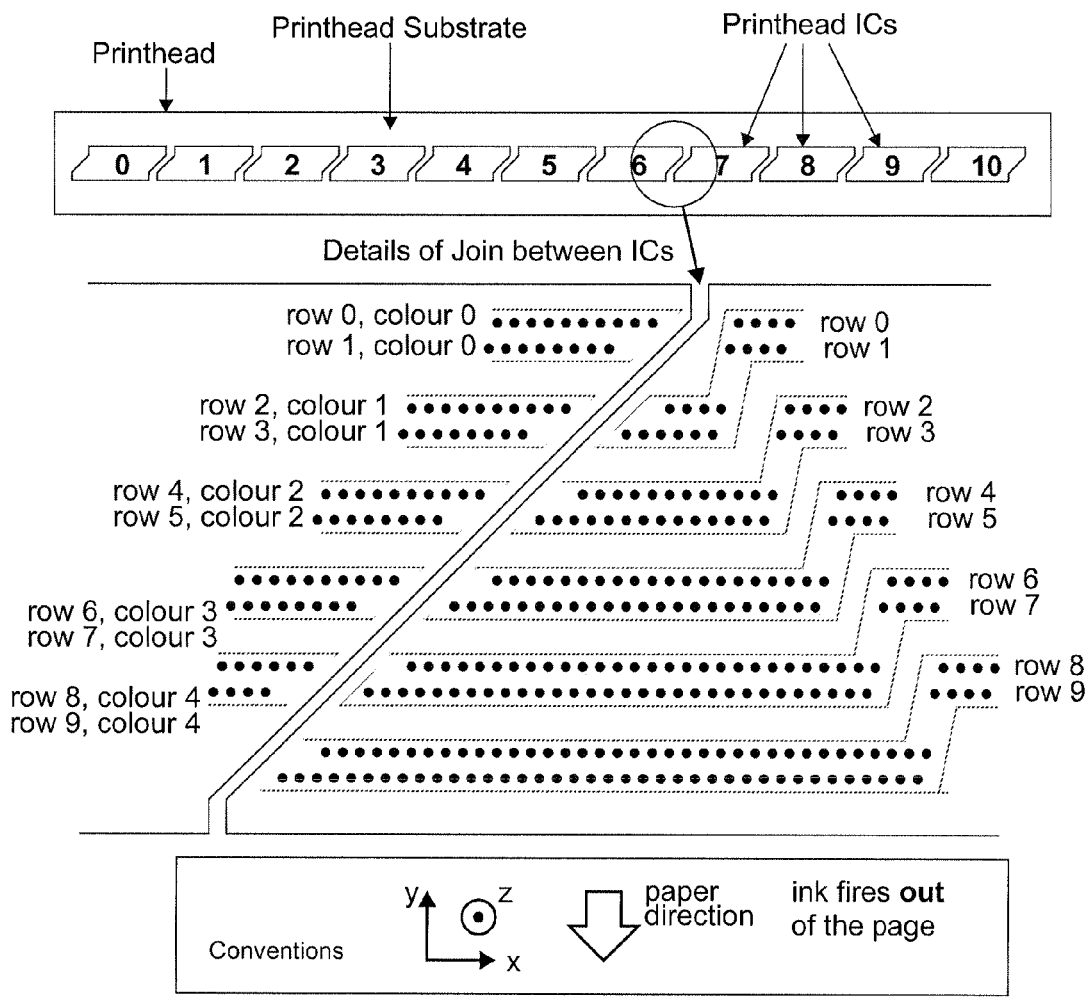
Figure 67:
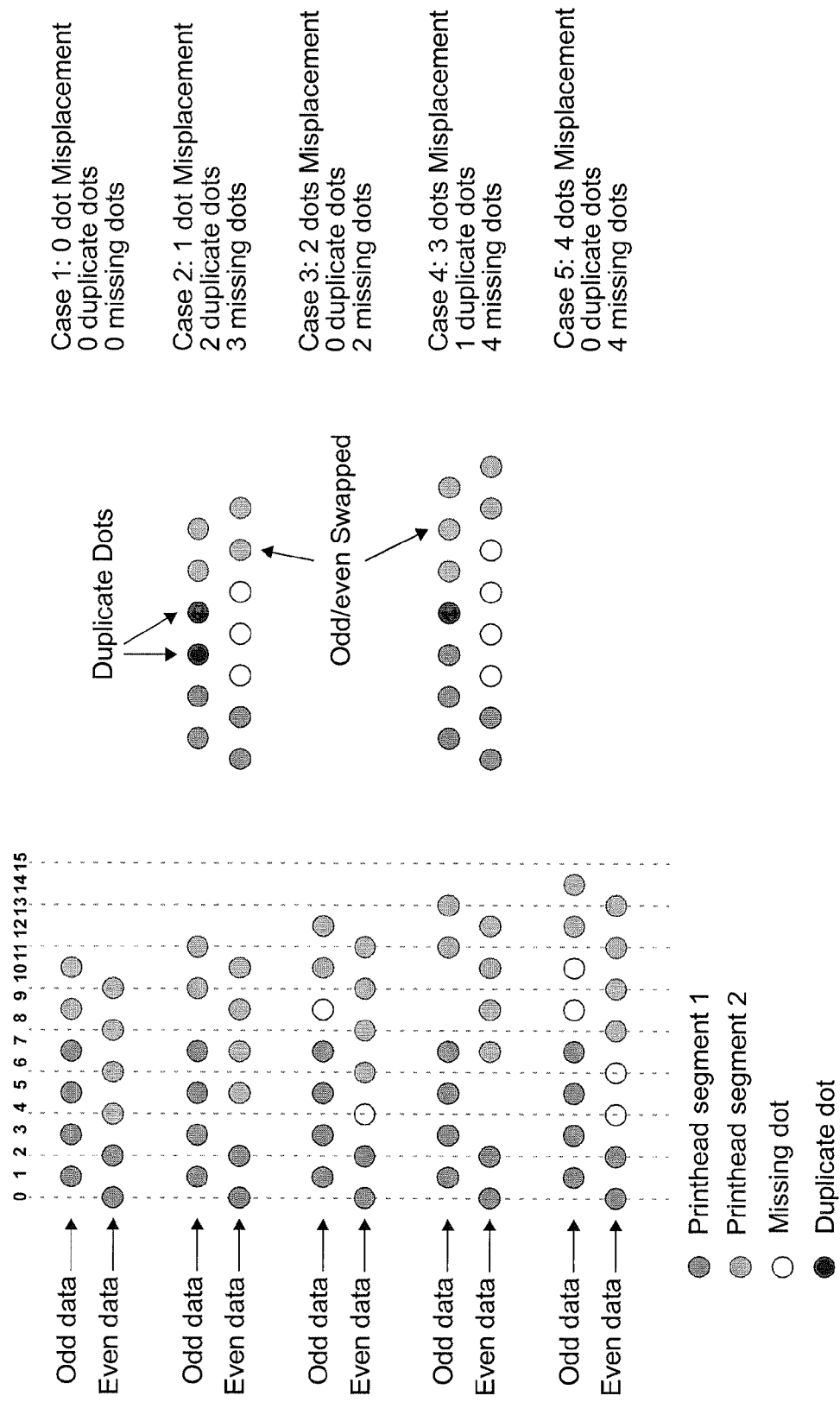
Figure 70:
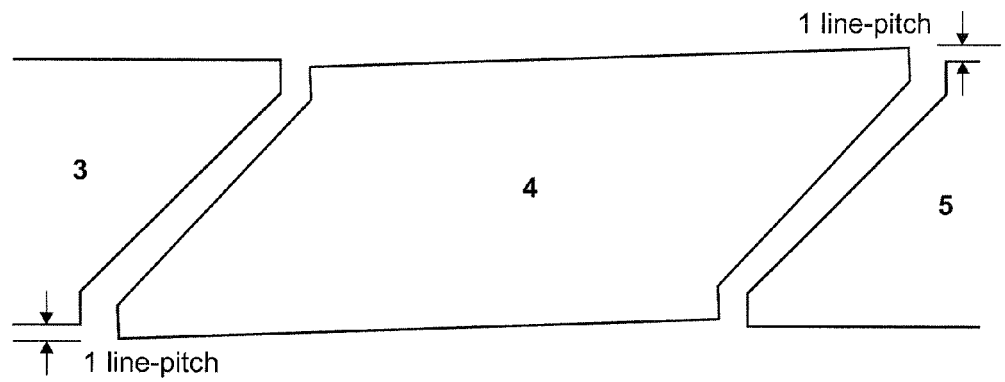
Figure 71:
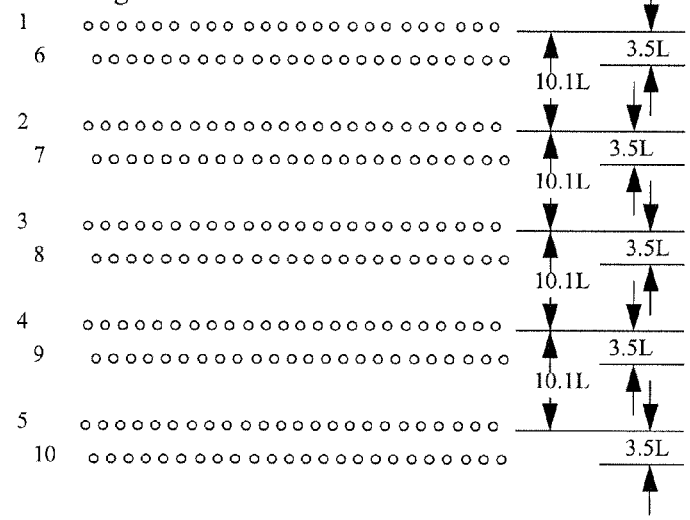
Figure 72:
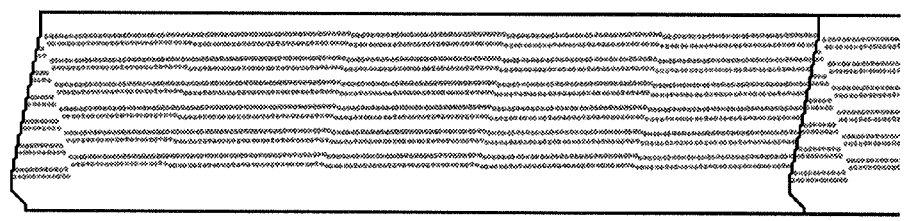
Figure 73:
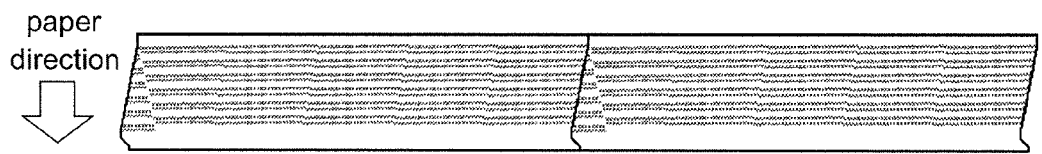
Figure 74:
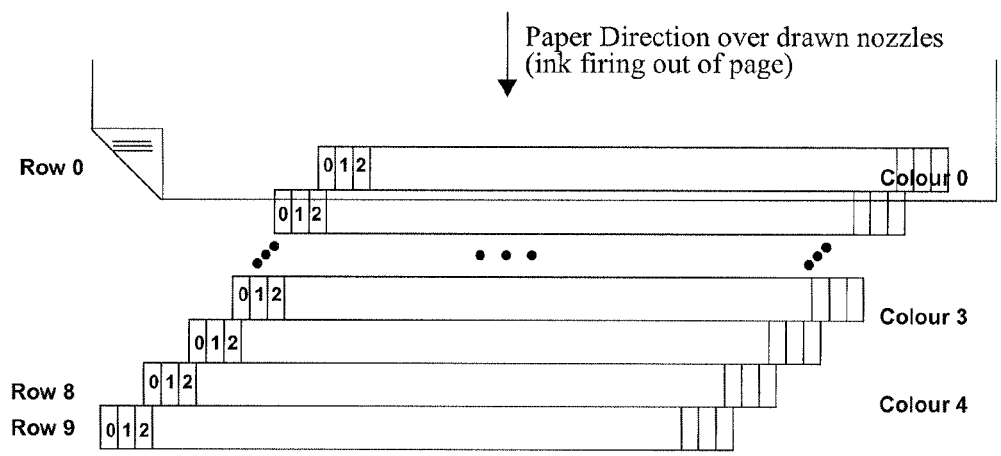
Figure 75:
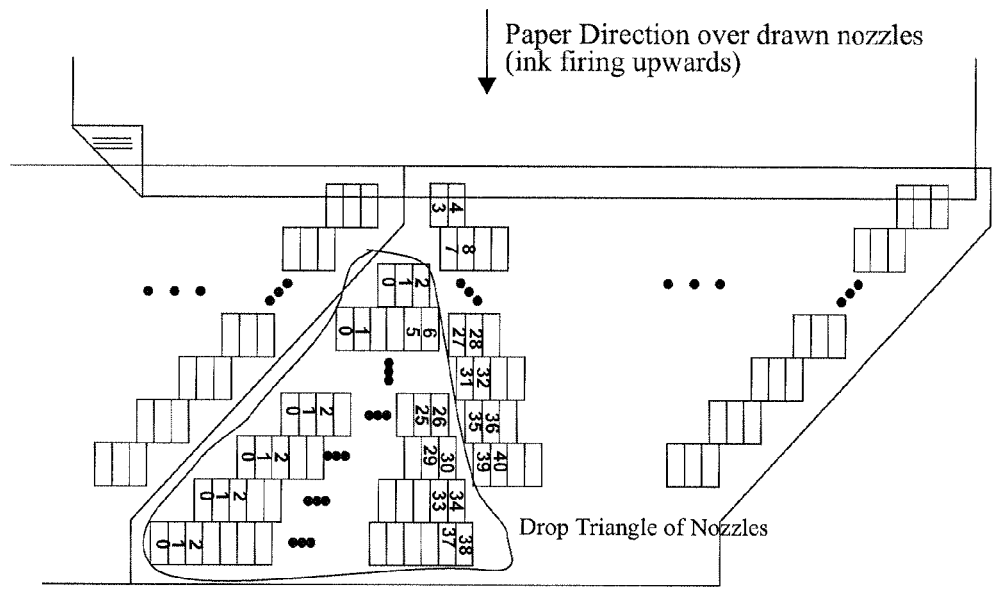

This kind of printhead is where we push the A-B chip discontinuity as far along the printhead segment as possible—right to the edge. This maximises the A part of the chip, and minimizes the B part of the chip. If the B part is small enough, then the compensation for vertical misalignment can be incorporated on the printhead, and therefore the printhead appears to SoPEC as if it was a single typeA chip. This only makes sense if the B part is minimized since printhead real-estate is more expensive at 0.35 microns rather than on SoPEC at 0.18 microns. The arrangement is shown in FIG. 60.

Note that since the compensation is accomplished on the printhead, the direction of paper movement is fixed with respect to the printhead. This is because the printhead is keeping a history of the data to apply at a later time and is only required to keep the small amount of data from the B part of the printhead rather than the A part.

Various Combinations of the Above

Within reason, some of the various linking methods can be combined. For example, we may have a mild slope of 5 over the printhead, plus an on-chip compensation for a further 2 lines for a total of 7 lines between type A chips. The mild slope of 5 allows for a 1 in 128 per half color (a reasonable bandwidth increase), and the remaining 2 lines are compensated for in the printheads so do not impact bandwidth at all.

However we can assume that some combinations make less sense. For example, we do not expect to see an A-B chip with a mild slope.

SoPEC also caters for printheads and printhead modules that have redundant nozzle rows. The idea is that for one print line, we fire from nozzles in row x, in the next print line we fire from the nozzles in row y, and the next print line we fire from row x again etc. Thus, if there are any defective nozzles in a given row, the visual effect is halved since we only print every second line from that row of nozzles. This kind of redundancy requires SoPEC to generate data for different physical lines instead of consecutive lines, and also requires additional dot line storage to cater for the redundant rows of nozzles.

Redundancy can be present on a per-color basis. For example, K may have redundant nozzles, but C, M, and Y have no redundancy.

In the preferred form, we are concerned with redundant row pairs, i.e. rows 0+1 always print odd and even dots of the same colour, so redundancy would require say rows 0+1 to alternate with rows 2+3.

To enable alternating between two redundant rows (for example), two additional registers REDUNDANT_ROWS_0[7:0] and REDUNDANT_ROWS_1[7:0] are provided at addresses 8 and 9. These are protected registers, defaulting to 0x00. Each register contains the following fields:

Bits [2:0]—RowPairA (000 means rows 0+1, 001 means rows 2+3 etc)

Bits [5:3]—RowPairB (000 means rows 0+1, 001 means rows 2+3 etc)

Bit [6]—toggleAB (0 means loadA/fireB, 1 means loadB/fireA)

Bit [7]—valid (0 means ignore the register).

The toggle bit changes state on every FIRE command; SoPEC needs to clear this bit at the start of a page.

The operation for redundant row printing would use similar mechanism to those used when printing less than 5 colours:

with toggleAB=0, the RowPairA rows would be loaded in the DATA_NEXT sequence, but the RowPairB rows would be skipped. The TDC FIFO would insert dummy data for the RowPairB rows. The RowPairA rows would not be fired, while the RowPairB rows would be fired.

with toggleAB=1, the RowPairB rows would be loaded in the DATA_NEXT sequence, but the RowPairA rows would be skipped. The TDC FIFO would insert dummy data for the RowPairA rows. The RowPairB rows would not be fired, while the RowPairA rows would be fired.

In other embodiments, one or more redundant rows can also be used to implement per-nozzle replacement in the case of one or more dead nozzles. In this case, the nozzles in the redundant row only print dots for positions where a nozzle in the main row is defective. This may mean that only a relatively small numbers of nozzles in the redundant row ever print, but this setup has the advantage that two failed printhead modules (ie, printhead modules with one or more defective nozzles) can be used, perhaps mounted alongside each other on the one printhead, to provide gap-free printing. Of course, if this is to work correctly, it is important to select printhead modules that have different defective nozzles, so that the operative nozzles in each printhead module can compensate for the dead nozzle or nozzles in the other.

Whilst probably of questionable commercial usefulness, it is also possible to have more than one additional row for redundancy per color. It is also possible that only some rows have redundant equivalents. For example, black might have a redundant row due to its high visibility on white paper, whereas yellow might be a less likely candidate since a defective yellow nozzle is much less likely to produce a visually objectionable result.

The LLU needs to provide data for up to eleven printhead segments. It will read this data out of fifos written by the DWU, one fifo per half-color.

The PHI needs to send data out over 6 data lines, where each data line may be connected to up to two segments. When printing A4 portrait, there will be 11 segments. This means five of the datalines will have two segments connected and one will have a single segment connected. (I say 'one' and not 'the last', since the singly used line may go to either end, or indeed into the middle of the page.) In a dual SoPEC system, one of the SoPECs will be connected to 5 segments, while the other is connected to 6 segments.

Focusing for a moment on the single SoPEC case. Sopec maintains a data generation rate of 6 bpc throughout the data calculation path. If all six data lines broadcast for the entire duration of a line, then each would need to sustain 1 bpc to match SoPEC's internal processing rate. However, since there are eleven segments and six data lines, one of the lines has only a single segment attached. This dataline receives only half as much data during each print line as the other datalines. So if the broadcast rate on a line is 1 bpc, then we can only output at a sustained rate of 5.5 bpc, thus not matching the internal generation rate. These lines therefore need an output rate of at least 6/5.5 bpc. However, from an earlier version of the plan for the PHI and printheads the dataline is set to transport data at 6/5 bpc, which is also a convenient clock to generate and thus has been retained.

So, the datalines carry over one bit per cycle each. While their bandwidth is slightly more than is needed, the bandwidth needed is still slightly over 1 bpc, and whatever prepares the data for them must produce the data at over 1 bpc. To this end the LLU will target generating data at 2 bpc for each data line.

The LLU will have six data generators. Each data generator will produce the data from either a single segment, or two segments. In those cases where a generator is servicing multiple segments the data for one entire segment is generated before the next segment is generated. Each data generator will have a basic data production rate of 2 bpc, as discussed above. The data generators need to cater to variable segment width. The data generators will also need to cater for the full range of printhead designs currently considered plausible. Dot data is generated and sent in increasing order.

The generators need to be able to cope with segments being vertically offset relative to each other. This could be due to poor placement and assembly techniques, or due to each printhead being placed slightly above or below the previous printhead.

They need to be able to cope with the segments being placed at mild slopes. The slopes being discussed and thus planned for are on the order of 5-10 lines across the width of the printhead.

It is necessary to cope with printhead that have a single internal step of 3-10 lines thus avoiding the need for continuous slope. To solve this we will reuse the mild sloping facility, but allow the distance stepped back to be arbitrary, thus it would be several steps of one line in most mild sloping arrangements and one step of several lines in a single step printhead.

SoPEC should cope with a broad range of printhead sizes. It is likely that the printheads used will be 1280 dots across. Note this is 640 dots/nozzles per half color.

A dot generator will process zero or one or two segments, based on a two bit configuration. When processing a segment it will process the twelve half colors in order, color zero even first, then color zero odd, then color 1 even, etc. The LLU will know how long a segments is, and we will assume all segments are the same length.

To process a color of a segment the generator will need to load the correct word from dram. Each color will have a current base address, which is a pointer into the dot fifo for that color. Each segment has an address offset, which is added to the base address for the current color to find the first word of that colour. For each generator we maintain a current address value, which is operated on to determine the location future reads occur from for that segment. Each segment also has a start bit index associated with it that tells it where in the first word it should start reading data from.

A dot generator will hold a current 256 bit word it is operating on. It maintains a current index into that word. This bit index is maintained for the duration of one color (for one segment), it is incremented whenever data is produced and reset to the segment specified value when a new color is started. 2 bits of data are produced for the PHI each cycle (subject to being ready and handshaking with the PHI).

From the start of the segment each generator maintains a count, which counts the number of bits produced from the current line. The counter is loaded from a start-count value (from a table indexed by the half-color being processed) that is usually set to 0, but in the case of the A-B printhead, may be set to some other non-zero value. The LLU has a slope span value, which indicates how many dots may be produced before a change of line needs to occur. When this many dots have been produced by a dot generator, it will load a new data word and load 0 into the slope counter. The new word may be found by adding a dram address offset value held by the LLU. This value indicates the relative location of the new word; the same value serves for all segment and all colours. When the new word is loaded, the process continues from the current bit index, if bits 62 and 63 had just been read from the old word (prior to slope induced change) then bits 64 and 65 would be used from the newly loaded word.

When the current index reaches the end of the 256 bits current data word, a new word also needs to be loaded. The address for this value can be found by adding one to the current address.

It is possible that the slope counter and the bit index counter will force a read at the same time. In this case the address may be found by adding the slope read offset and one to the current address.

Observe that if a single handshaking is use between the dot generators and the PHI then the slope counter as used above is identical between all 6 generators, i.e. it will hold the same counts and indicate loads at the same times. So a single slope counter can be used. However the read index differs for each generator (since there is a segment configured start value. This means that when a generator encounters a 256-bit boundary in the data will also vary from generator to generator. After all of the generators have calculated data for all of their segments the LLU should advance a line. This involves signalling the consumption to the DWU, and incrementing all the base address pointers for each color. This increment will generally be done by adding an address offset the size of a line of data. However, to support a possible redundancy model for the printheads, we may need to get alternate lines from different offsets in the fifo. That is, we may print alternate lines on the page from different sets of nozzles in the print head. This is presented as only a single line of nozzles to the PHI and LLU, but the offset of that line with respect to the leading edge of the printhead changes for alternating line. To support this incrementing the LLU stores two address offsets. These offsets are applied on alternate lines. In the normal case both these offsets will simply be programmed to the same value, which will equate to the line size.

The LLU allows the current base addresses for each color to be writeable by the CPU. These registers will then be set to point to appropriate locations with respect to the starting location used by the DWU, and the design of the printhead in question.

Each data generator needs
  A 2 bit description indicating how many segments it is dealing with.
  Each segment (allowing for 12) requires:
  A bit index (2 bit aligned)
  A dram address offset. (indicates the relative location of the first address to be loaded to the current base address for that color
  Each page/printhead configuration requires:
  segment width (from the perspective of half colors so eg 640, not 1280)

slope span (dots counted before stepping)
start count [×12] (loaded into the slope counter at the start of the segment), typically 0
slope step dram offset (distance to new word when a slope step occurs)
current color base address [×12] (writeable work registers)
line dram offset [×2] (address offset for current color base address for each alternating line)
Reset
Go
FifoReadThreshold,
FillLevel (work reg)

Note each generator is specifically associated with two entries in the segment description tables. (So generator 0→0&1, 1→2&3, etc.)

The 2 bits indicating how many segments can be a counter, or just a mask. The latter may contribute to load balancing in some cases.

Data generation involves
a current nozzle count
a current slope count
a current data word.
a current index.
a current segment (of the two to choose from)
future data words, pre-loaded by some means.

Firstly a word on bandwidth. The old LLU needed to load the full line of data once, so it needed to process at the same basic rate as the rest of SoPEC, that is 6 bpc. The new LLU loads data based on individual colors for individual segments. A segment probably has 640 nozzles in it. At 256 bits per read, this is typically three reads. However obviously not all of what is read is used. At best we use all of two 256-bit reads, and 128 bits of a third read. This results in a 6/5 wastage. So instead of 6 bpc will would need to average 7.2 bpc over the line. If implemented, mild sloping would make this worse.

Dram reads are not instantaneous. As a result, the next word to be used by a generators should attempt to be loaded in advance. How do we do this?

Consider a state the generator may be in. Say it has the address of the last word we loaded. It has the current index, into that word, as well as the current count versus the segment width and the current count used to handle sloping. By inspecting these variables we can readily determine if the next word to be read for a line we are generating will be read because the slope count was reached or a 256-bit boundary was reached by the index, or both, or because the end of the segment was reached. Since we can make that determination, it is simple to calculate now the next word needed, instead of waiting until it is actually needed. Note with the possibility that the end of the segment will be reached before, or at, either slope or 256-bit effect, in which case the next read in based on the next color (or the next segment).

If that were all we did, it would facilitate double buffering, because whenever we loaded 256 bit data value into the generator we can deduce from the state at that time the next location to read from and start loading it.

Given the potentially high bandwidth requirements for this block it is likely that a significant over-allocation of DIU slots would be needed to ensure timely delivery. This can be avoided by using more buffering as is done for the CFU.

On this topic, if the number of slots allocated is sufficiently high, it may be required that the LLU be able to access every second slot in a particular programming of the DIU. For this to occur, it needs to be able to lodge its next request before it has completed processing the prior request. i.e. after the ack it must be able to request instead of waiting for all the valids like the rest of the PEP units do.

Consider having done the advance load as described above. Since we know why we did the load, it is a simple matter to calculate the new index and slope count and dot count (vs printhead width) that would coincide with it being used. If we calculate these now and store them separately to the ones being used directly by the data generator, then we can use them to calculate the next word again. And continue doing this until we ran out of buffer allocation, at which point we could hold these values until the buffer was free.

Thus if a certain size buffer were allocated to each data generator, it would be possible for it to fill it up with advance reads, and maintain it in that state if enough bandwidth was allocated.

One point not yet considered is the end-of-line. When the lookahead state says we have finished a color we can move to the next, and when it says we have finished the first of two segments, we can move to the next. But when we finished reading the last data of our last segment (whether two or one) we need to wait for the line based values to update before we can continue reading. This could be done after the last read, or before the first read which ever is easier to recognize. So, when the read ahead for a generator realises it needs to start a new line, it should set a bit. When all the non-idle generators have reached this start then the line advance actions take place. These include updating the color base address pointers, and pulsing the DWU.

The above implies a fifo for each generator, of (3-4)×256 bits, and this may be a reasonable solution. It may in fact be smaller to have the advance data read into a common storage area, such as 1×6×256 bit for the generators, and 12×256 bit for the storage area for example.

The PHI has six input data lines and it needs to have a local buffer for this data. The data arrives at 2 bits per cycle, needs to be stored in multiples of 8 bits for exporting, and will need to buffer at least a few of these bytes to assist the LLU, by making its continuous supply constraints much weaker.

The PHI accepts data from the LLU, and transmits the data to the printheads. Each printhead is constructed from a number of printhead segments. There are six transmission lines, each of which can be connected to two printhead segments, so up to 12 segments may be addressed. However, for A4 printing, only 11 segments are needed, so in a single SoPEC system, 11 segments will be connected. In a dual SoPEC system, each SoPEC will normally be connect to 5 or 6 segments. However, the PHI should cater for any arrangement of segments off its data lines.

Each data line performs 8b10b encoding. When transmitting data, this converts 8 bits of data to a 10 bit symbol for transmission. The encoding also support a number of Control characters, so the symbol to be sent is specified by a control bit and 8 data bits. When processing dot data, the control bit can be inferred to be zero. However, when sending command strings or passing on CPU instructions or writes to the printhead, the PHI will need to be given 9 bit values, allowing it to determine what to do with them.

The PHI accepts six 2-bit data lines from the LLU. These data lines can all run off the same enable and if so the PHI will only need to produce a single ready signal (or which fine grained protocol is selected). The PHI collects the 2-bit values from each line, and compiles them into 8-bit values for each line. These 8 bit values are store in a short fifo, and eventually fed to the encoder for transmission to printheads. There is a fixed mapping between the input lines and the output lines. The line are label 0 to 5 and they address segments 0 to 11. (0→[0,1] and 1→[2,3]).

The connection requirements of the printheads are as follows. Each printhead has 1 LVDS clk input, 1 LVDS data input, 1 RstL input and one Data out line. The data out lines will combined to a single input back into the SoPEC (probably via the GPIO). The RstL needs to be driven by the board, so the printhead reset on power-up, but should also be drivable by SoPEC (thus supporting differentiation for the printheads, this would also be handled by GPIOs, and may require 2 of them.

The data is transmitted to each printhead segment in a specified order. If more than one segment is connected to a given data line, then the entire data for one segment will be transmitted, then the data for the other segment.

For a particular segment, a line consists of a series of nozzle rows. These consist of a control sequence to start each color, followed by the data for that row of nozzles. This will typically be 80 bytes. The PHI is not told by the LLU when a row has ended, or when a line has ended, it maintains a count of the data from the LLU and compares it to a length register. If the LLU does not send used colors, the PHI also needs to know which colors aren't used, so it can respond appropriately. To avoid padding issues the LLU will always be programmed to provide a segment width that is a multiple of 8 bits. After sending all of the lines, the PHI will wait for a line sync pulse (from the GPIO) and, when it arrives, send a line sync to all of the printheads. Line syncs handling has changed from PEC1 and will be described further below. It is possible that in addition to this the PHI may be required to tell the printhead the line sync period, to assist it in firing nozzles at the correct rate.

To write to a particular printhead the PHI needs to write the message over the correct line, and address it to the correct target segment on that line. Each line only supports two segments. They can be addressed separately or a broadcast address can be used to address them both. The line sync and if needed the period reporting portion of each line can be broadcast to every printhead, so broadcast address on every active line. The nozzle data portion needs to be line specific.

Apart from these line related messages, SoPEC also needs to send other commands to the printheads. These will be register read and write commands. The PHI needs to send these to specific segments or broadcast them, selected on a case by case basis. This is done by providing a data path from the CPU to the printheads via the PHI. The PHI holds a command stream the CPU has written, and sends these out over the data lines. These commands are inserted into the nozzle data streams being produced by the PHI, or into the gap between line syncs and the first nozzle line start. Each command terminates with a resume nozzle data instruction.

CPU instructions are inserted into the dot data stream to the printhead. Sometimes these instructions will be for particular printheads, and thus go out over single data line. If the LLU has a single handshaking line then the benefit of stalling only on will be limited to the depth of the fifo of data coming from the LLU. However there if a number of short commands are sent to different printheads they could effectively mask each other by taking turns to load the fifo corresponding to that segment. In some cases, the benefit in time may not warrant the additional complexity, since with single handshaking and good cross segment synchronisation, all the fifo logic can be simplified and such register writes are unlikely to be numerous. If there is multiple handshaking with the LLU, then stalling a single line while the CPU borrows it is simple and a good idea.

The data is sent via LVDS lines to the printhead. The data is 8b10b encoded to include lots of edges, to assist in sampling the data at the correct point. The line requires continuous supply of symbols, so when not sending data the PHI must send Idle commands. Additionally the line is scrambled using a self-synchronising scrambler. This is to reduce emissions when broadcast long sequences of identical data, as would be the case when idling between lines. See printhead doc for more info.

It is possible that when a line sync pulse arrives at the PHI that not all the data has finished being sent to the printheads. If the PHI were to forward this signal on then it would result in an incorrect print of that line, which is an error condition. This would indicate a buffer underflow in PEC1. However, in SoPEC the printhead can only receive line sync signals from the SoPEC providing them data. Thus it is possible that the PHI could delay in sending the line sync pulse until it had finished providing data to the printheads. The effect of this would be a line that is printed very slightly after where it should be printed. In a single SoPEC system the this effect would probably not be noticeable, since all printhead would have undergone the same delay. In a multi-SoPEC system delays would cause a difference in the location of the lines, if the delay was great this may be noticeable. So, rather than entering an error state when a line sync arrive prior to sending the line, we will simply record its arrival and send it as soon as possible. If a single line sync is early (with respect to data processing completing) than it will be sent out with a delay, however it is likely the next line sync will arrive early as well. If the reason for this is mechanical, such as the paper is moving too fast, then it is conceivable that a line sync may arrive at a point in which a line sync is currently pending, so we would have two pending.

Whether or not this is an error condition may be printer specific, so rather than forcing it to be an error condition, the PHI will allow a substantial number of pending line syncs. To assist in making sure no error condition has arrived in a specific system, the PHI will be configured to raise an interrupt when the number pending exceeds a programmed value. The PHI continues as normal, handling the pending line sync as before, it is up to the CPU to deal with the possibility this is an error case. This means a system may be programmed to notice a single line sync that is only a few cycles early, or to remain unaware of being several lines behind where it is supposed to be. The register counting the number of pending line syncs should be 10+ bits and should saturate if incremented past that. Given that line syncs aren't necessarily performing any synchronisation it may be preferrable to rename them, perhaps line fire.

As in PEC1 there is a need to set a limiting speed. This could be done at the generation point, but since motor control may be a share responsibility with the OEM, it is safer to place a limiting factor in the PHI. Consequently the PHI will have a register which is the minimum time allowed between it sending line syncs. If this time has not expire when a line sync would have otherwise been sent, then the line remains pending, as above, until the minimum period has passed.

The printhead will support a small range of activities. Most likely these include register reads and writes and line fire actions. The encoding scheme being used between the PHI and the printhead sends 10 bits symbols, which decode to either 8 bit data values or to a small number of non-data symbols. The symbols can be used to form command sequences. For example, a 16-bit register write might take the form of <WRITE SYMBOL><data reg_addr><data value1><data value2>. More generally, a command sequence will be considered to be a string of symbols and data of fixed length, which starts with a non-data symbol and which has a known effect on the printhead. This definition covers write, reads, line syncs, idle indicators, etc.

Unfortunately there are a lot of symbols and data to be sent in a typical page. There is a trade-off that can be made between the lengths of command sequences and their resistance to isolated bit errors. Clearly, resisting isolated bit errors in the communications link is a good thing, but reducing overhead sent with each line is also a good thing. Since noise data for this line is difficult to guess in advance, and the tolerance for print failure may vary from system to system, as will the tolerance for communication overhead, the PHI will try to approach it requirements in a very general way.

The PHI has a bit mask of active segments. It processes the data for the line in two halves: the even segments and then the odd segments. If none of the bits are set for a particular half, then it is skipped.

Processing of segment data involves collecting data from the LLU, collating it, and passing through the encoder, wrapped in appropriate command sequences. If the PHI was required to transmit register addresses of each nozzle line, prior to sending the data, then it would need either storage for twenty four command strings (one for each nozzle row on each segment for a wire), or it would need to be able to calculate the string to send, which would require setting that protocol exactly. Instead, printheads will accept a "start of next nozzle data" command sequence, which instruct the printhead that the following bytes are data for the next nozzle row. This command sequence needs to be printhead specific, so only one of the two printheads on any particular line will start listen for nozzle data. Thus to send a line's worth of data to a particular segment one needs to, for each color in the printhead, send a StartNextNozzleRow string followed by SegmentWidth bytes of data. When sending nozzle data, if the supply of data fails, the IDLE command sequence should be inserted. If necessary this can be inserted many times. After sending all of the data to one segment, data is then sent to the other segment. After all the nozzle data is sent to both printhead the PHI should issue IDLE command sequences until it receives a line sync pulse. At this point it should send the LineSync command sequence and start the next line.

The PHI has six data out lines. Each of these needs a fifo. To avoid having six separate fifo management circuits, the PHI will process the data for each line in synch with the other lines. To allow this the same number of symbols must be placed into each fifo at a time. For the nozzle data this is managed by having the PHI unaware of which segments actually exist, it only needs to know if any have two segments. If any have two segments, then it produces two segments worth of data onto every active line. If adding command data from the CPU to a specific fifo then we insert Idle command sequences into each of the other fifos so that an equal number of byte have been sent. It is likely that the IDLE command sequence will be a single symbol, if it isn't then this would require that all CPU command sequences were a multiple of the length of the IDLE sequence. This guarantee has been given by the printhead designers.

The PHI may need to tell the printheads how long the line syncs are. It is possible that the printheads will determine this for themselves, this would involve counting the time since the last lsync. This would make it difficult to get the first line correct on a page and require that the first line be all zeroes, or otherwise tolerant of being only partially fired.

Other options include:
PHI calculated and transmits a period with each line sync.
the PCU calculates a period and writes it to the printheads occasionally.
the line fire command includes a line sync period (again written by the CPU or perhaps calculated by the PHI.

It will be appreciated by those skilled in the art that the foregoing represents only a preferred embodiment of the present invention. Those skilled in the relevant field will immediately appreciate that the invention can be embodied in many other forms.

We claim:

1. An inkjet printhead comprising:
a plurality of inkjet printhead modules arranged to successively abut one another along a pagewidth;
a first controller configured to receive and process print data to generate first ink dot data; and
a second controller configured to receive and process print data and at least some of the first ink dot data to generate second ink dot data,
wherein the first controller is arranged to output the first ink dot data to at least a first printhead module of the plurality of printhead modules and said at least some of the first ink dot data to the second controller, and
the second controller is arranged to output the second ink dot data to at least a second printhead module of the plurality of printhead modules.

2. A printhead as claimed in claim 1, wherein at least one of the printhead modules is angled with respect to the other printhead modules.

3. A printhead as claimed in claim 2, wherein said at least one printhead module is on a mild slope.

4. A printhead as claimed in claim 3, wherein the angle of the mild slope is dependent on the width of the printhead.

5. A printhead as claimed in claim 1, wherein one or more of the printhead modules have rows of redundant inkjet nozzles.

6. A printhead as claimed in claim 5, wherein the rows of redundant nozzles are arranged so that the redundancy is based on an ink color to be ejected by said nozzles.

7. A printhead as claimed in claim 6, wherein more than one row of redundant nozzles is arranged for each ink color to be ejected.

8. A printhead as claimed in claim 7, wherein the first and second controllers are configured so that the nozzles in the rows of redundant nozzles receive the first or second ink dot data for positions where nozzles in non-redundant rows of nozzles are defective.

* * * * *